US012480907B2

(12) United States Patent
Koester et al.

(10) Patent No.: US 12,480,907 B2
(45) Date of Patent: Nov. 25, 2025

(54) SYSTEMS UTILIZING GRAPHENE VARACTOR HYSTERESIS EFFECTS FOR SAMPLE CHARACTERIZATION

(71) Applicant: REGENTS OF THE UNIVERSITY OF MINNESOTA, Minneapolis, MN (US)

(72) Inventors: Steven Koester, Edina, MN (US); Qun Su, Minneapolis, MN (US); Philippe Pierre Joseph Buhlmann, Minneapolis, MN (US); Xue Zhen, Plymouth Meeting, PA (US); Justin Theodore Nelson, Vadnais Heights, MN (US); Gregory J. Sherwood, White Bear Lake, MN (US)

(73) Assignee: REGENTS OF THE UNIVERSITY OF MINNESOTA, Minneapolis, MN (US)

( * ) Notice: Subject to any disclaimer, the term of this patent is extended or adjusted under 35 U.S.C. 154(b) by 417 days.

(21) Appl. No.: 17/719,760

(22) Filed: Apr. 13, 2022

(65) Prior Publication Data
US 2022/0334075 A1   Oct. 20, 2022

Related U.S. Application Data

(60) Provisional application No. 63/175,670, filed on Apr. 16, 2021.

(51) Int. Cl.
*G01N 27/22* (2006.01)
*G01N 33/497* (2006.01)
(Continued)

(52) U.S. Cl.
CPC ............ *G01N 27/22* (2013.01); *G01N 33/497* (2013.01); *H10D 1/64* (2025.01); *H10D 62/882* (2025.01); *G01N 33/4975* (2024.05)

(58) Field of Classification Search
CPC .................. G01N 27/227; G01N 27/4145
See application file for complete search history.

(56) References Cited

U.S. PATENT DOCUMENTS 3,661,528 A   5/1972   Falk
3,952,730 A   4/1976   Key
(Continued)

FOREIGN PATENT DOCUMENTS

CA   2673142   4/2008
CA   2800887   12/2011
(Continued)

OTHER PUBLICATIONS

Wei, Jinwei, et al. "Understanding asymmetric transfer characteristics and hysteresis behaviors in graphene devices under different chemical atmospheres." Carbon 156 (2020): 67-76.*
(Continued)

*Primary Examiner* — Herbert K Roberts
(74) *Attorney, Agent, or Firm* — Pauly, DeVries Smith & Deffner LLC

(57) ABSTRACT

Embodiments herein relate to systems and methods for utilizing hysteresis as a mechanism of analysis of a sample. A system for analyzing a fluid sample is included having a controller circuit and a chemical sensor element. The chemical sensor element can include one or more discrete binding detectors that can include one or more graphene varactors. The system can include measurement circuitry having an electrical voltage generator configured to generate an applied voltage at a plurality of voltage values to be applied to the one or more graphene varactors. The system can include a measurement circuit having a capacitance sensor configured to measure capacitance of the discrete binding detectors resulting from the applied voltage. The system for analyzing the fluid sample can be configured to measure hysteresis effects related to capacitance versus voltage val- (Continued)

ues obtained from the one or more graphene varactors. Other embodiments are also included herein.

19 Claims, 26 Drawing Sheets

(51) Int. Cl.
  *H10D 1/64* (2025.01)
  *H10D 62/80* (2025.01)

(56) References Cited

U.S. PATENT DOCUMENTS

| | | |
|---|---|---|
| 3,981,297 A | 9/1976 | Dunn et al. |
| 4,820,011 A | 4/1989 | Umegaki et al. |
| 4,901,727 A | 2/1990 | Goodwin |
| 5,174,290 A | 12/1992 | Fiddian-Green |
| 5,186,172 A | 2/1993 | Fiddian-Green |
| 5,357,971 A | 10/1994 | Sheehan et al. |
| 5,423,320 A | 6/1995 | Salzman et al. |
| 5,494,831 A | 2/1996 | Kindler |
| 5,704,368 A | 1/1998 | Asano et al. |
| 5,834,626 A | 11/1998 | De Castro et al. |
| 5,928,155 A | 7/1999 | Eggers et al. |
| 6,006,121 A | 12/1999 | Vantrappen et al. |
| 6,029,076 A | 2/2000 | Fiddian-Greene et al. |
| 6,085,576 A | 7/2000 | Sunshine et al. |
| 6,149,624 A | 11/2000 | McShane |
| 6,170,318 B1 | 1/2001 | Lewis |
| 6,192,168 B1 | 2/2001 | Feldstein et al. |
| 6,238,339 B1 | 5/2001 | Fiddian-Greene et al. |
| 6,248,078 B1 | 6/2001 | Risby et al. |
| 6,312,390 B1 | 11/2001 | Phillips et al. |
| 6,480,734 B1 | 11/2002 | Zhang et al. |
| 6,599,253 B1 | 7/2003 | Baum et al. |
| 6,615,066 B2 | 9/2003 | Huyberechts et al. |
| 6,712,770 B2 | 3/2004 | Lin et al. |
| 6,726,637 B2 | 4/2004 | Phillips et al. |
| 6,733,464 B2 | 5/2004 | Olbrich et al. |
| 6,781,690 B2 | 8/2004 | Armstrong et al. |
| 6,955,652 B1 | 10/2005 | Baum et al. |
| 6,978,182 B2 | 12/2005 | Mazar et al. |
| 7,032,431 B2 | 4/2006 | Baum et al. |
| 7,123,359 B2 | 10/2006 | Armstrong et al. |
| 7,177,686 B1 | 2/2007 | Turcott et al. |
| 7,387,010 B2 | 6/2008 | Sunshine |
| 7,426,848 B1 | 9/2008 | Li et al. |
| 7,459,312 B2 | 12/2008 | Chen et al. |
| 7,704,214 B2 | 4/2010 | Meixner et al. |
| 7,809,441 B2 | 10/2010 | Kane et al. |
| 7,871,572 B2 | 1/2011 | Yang et al. |
| 7,955,562 B2 | 6/2011 | Hong et al. |
| 7,972,277 B2 | 7/2011 | Oki et al. |
| 7,988,917 B2 | 8/2011 | Roesicke et al. |
| 7,992,422 B2 | 8/2011 | Leddy et al. |
| 8,043,860 B2 | 10/2011 | Leznoff et al. |
| 8,052,933 B2 | 11/2011 | Schirmer et al. |
| 8,080,206 B2 | 12/2011 | Leddy et al. |
| 8,124,419 B2 | 2/2012 | Grigorian et al. |
| 8,153,439 B2 | 4/2012 | Zamborini et al. |
| 8,154,093 B2 | 4/2012 | Passmore et al. |
| 8,157,730 B2 | 4/2012 | Tucker et al. |
| 8,222,041 B2 | 7/2012 | Pearton et al. |
| 8,244,355 B2 | 8/2012 | Bennett et al. |
| 8,294,135 B2 | 10/2012 | Lebedev et al. |
| 8,366,630 B2 | 2/2013 | Haick et al. |
| 8,449,824 B2 | 5/2013 | Sun |
| 8,479,731 B2 | 7/2013 | Heinonen et al. |
| 8,481,324 B2 | 7/2013 | Nakhoul et al. |
| 8,494,606 B2 | 7/2013 | Debreczeny et al. |
| 8,529,459 B2 | 9/2013 | Stahl et al. |
| 8,581,262 B2 | 11/2013 | Pan et al. |
| 8,597,953 B2 | 12/2013 | Haick et al. |
| 8,747,325 B2 | 6/2014 | Bacal et al. |
| 8,828,713 B2 | 9/2014 | Ren et al. |
| 8,835,984 B2 | 9/2014 | Ren et al. |
| 8,848,189 B2 | 9/2014 | Goldshtein et al. |
| 8,951,473 B2 | 2/2015 | Wang et al. |
| 8,955,367 B2 | 2/2015 | Gouma et al. |
| 8,961,830 B2 | 2/2015 | Reynolds et al. |
| 9,011,779 B1 | 4/2015 | Anglin, Jr. et al. |
| 9,029,168 B2 | 5/2015 | Mannoor et al. |
| 9,034,170 B2 | 5/2015 | Blackburn et al. |
| 9,085,715 B2 | 7/2015 | Berthelot et al. |
| 9,103,775 B2 | 8/2015 | Bradley et al. |
| 9,138,169 B2 | 9/2015 | Beard |
| 9,147,398 B2 | 9/2015 | White et al. |
| 9,147,851 B1 | 9/2015 | Bartsch et al. |
| 9,267,908 B2 | 2/2016 | Wang et al. |
| 9,299,238 B1 | 3/2016 | Ahmad et al. |
| 9,315,848 B2 | 4/2016 | Haick et al. |
| 9,316,637 B2 | 4/2016 | Ren et al. |
| 9,324,825 B2 | 4/2016 | Ravesi et al. |
| 9,366,664 B2 | 6/2016 | Anglin, Jr. et al. |
| 9,410,040 B2 | 8/2016 | Li et al. |
| 9,513,244 B2 | 12/2016 | Koester |
| 9,528,979 B2 | 12/2016 | Haick et al. |
| 9,618,476 B2 | 4/2017 | Goldsmith |
| 9,638,169 B2 | 5/2017 | Obrecht |
| 9,642,577 B1 | 5/2017 | Li et al. |
| 9,671,392 B2 | 6/2017 | Jeppsen et al. |
| 9,689,836 B2 | 6/2017 | Makaram et al. |
| 9,696,311 B2 | 7/2017 | Haick et al. |
| 9,763,600 B2 | 9/2017 | Van Kesteren et al. |
| 9,765,395 B2 | 9/2017 | Goldsmith |
| 9,775,241 B2 | 9/2017 | Walczak et al. |
| 9,859,034 B2 | 1/2018 | Sjong |
| 9,936,897 B2 | 4/2018 | Carlson et al. |
| 9,977,011 B2 | 5/2018 | Beck et al. |
| 10,034,621 B2 | 7/2018 | Wondka et al. |
| 10,046,323 B2 | 8/2018 | Bos |
| 10,307,080 B2 | 6/2019 | Ssenyange et al. |
| 10,493,276 B2 | 12/2019 | Moffitt et al. |
| 10,543,035 B2 | 1/2020 | Sutermeister et al. |
| 10,545,090 B2 | 1/2020 | Karlsson |
| 10,770,182 B2 | 9/2020 | Sherwood et al. |
| 10,852,264 B2 | 12/2020 | Kelly et al. |
| 11,079,371 B2 | 8/2021 | Zhen et al. |
| 11,085,921 B2 | 8/2021 | Livache et al. |
| 11,172,846 B2 | 11/2021 | Sherwood et al. |
| 11,191,457 B2 | 12/2021 | Sherwood et al. |
| 11,262,354 B2 | 3/2022 | Sherwood |
| 11,662,325 B2 | 5/2023 | Sherwood et al. |
| 11,714,058 B2 | 8/2023 | Kelly et al. |
| 11,835,435 B2 | 12/2023 | Sherwood et al. |
| 2002/0123749 A1 | 9/2002 | Jain et al. |
| 2002/0142477 A1 | 10/2002 | Lewis et al. |
| 2003/0051733 A1 | 3/2003 | Kotmel et al. |
| 2003/0113713 A1 | 6/2003 | Glezer et al. |
| 2004/0039295 A1 | 2/2004 | Olbrich et al. |
| 2004/0128088 A1 | 7/2004 | Laletin et al. |
| 2006/0130557 A1 | 6/2006 | Leddy et al. |
| 2006/0263255 A1 | 11/2006 | Han et al. |
| 2006/0270940 A1 | 11/2006 | Tsukashima et al. |
| 2007/0048181 A1 | 3/2007 | Chang et al. |
| 2007/0083094 A1 | 4/2007 | Colburn et al. |
| 2007/0167853 A1 | 7/2007 | Melker et al. |
| 2007/0229818 A1 | 10/2007 | Duan et al. |
| 2007/0265509 A1 | 11/2007 | Burch et al. |
| 2008/0021339 A1 | 1/2008 | Gabriel et al. |
| 2008/0038154 A1 | 2/2008 | Longbottom et al. |
| 2008/0052122 A1 | 2/2008 | Iliff |
| 2008/0146890 A1 | 6/2008 | LeBoeuf et al. |
| 2008/0161709 A1 | 7/2008 | Bradley |
| 2008/0183910 A1 | 7/2008 | Natoli et al. |
| 2008/0228098 A1 | 9/2008 | Popov et al. |
| 2008/0317636 A1 | 12/2008 | Brahim et al. |
| 2009/0054799 A1 | 2/2009 | Vrtis et al. |
| 2009/0104435 A1 | 4/2009 | Hutchison et al. |
| 2009/0112115 A1 | 4/2009 | Huang et al. |
| 2009/0230300 A1 | 9/2009 | Trevejo et al. |
| 2010/0024533 A1 | 2/2010 | Kimura et al. |
| 2010/0056892 A1 | 3/2010 | Ben-Barak et al. |
| 2010/0085067 A1 | 4/2010 | Gabriel et al. |

(56) References Cited

U.S. PATENT DOCUMENTS

| | | |
|---|---|---|
| 2010/0116021 A1 | 5/2010 | Obrien |
| 2010/0137733 A1 | 6/2010 | Wang et al. |
| 2010/0147303 A1 | 6/2010 | Jafari et al. |
| 2010/0188069 A1 | 7/2010 | Ren et al. |
| 2010/0198521 A1 | 8/2010 | Haick et al. |
| 2010/0216175 A1 | 8/2010 | Melker et al. |
| 2010/0268479 A1 | 10/2010 | Potyrailo et al. |
| 2010/0273665 A1 | 10/2010 | Haick et al. |
| 2011/0015872 A1 | 1/2011 | Haick et al. |
| 2011/0017587 A1 | 1/2011 | Zhamu et al. |
| 2011/0059476 A1 | 3/2011 | Shin et al. |
| 2011/0143962 A1 | 6/2011 | Chaubron et al. |
| 2011/0201956 A1 | 8/2011 | Alferness et al. |
| 2011/0269632 A1 | 11/2011 | Haick et al. |
| 2011/0283770 A1 | 11/2011 | Hok et al. |
| 2012/0100636 A1 | 4/2012 | Johal et al. |
| 2012/0111093 A1 | 5/2012 | Brahim et al. |
| 2012/0126111 A1 | 5/2012 | Chaubron et al. |
| 2012/0156099 A1 | 6/2012 | Zhong et al. |
| 2012/0166095 A1 | 6/2012 | Potyrailo et al. |
| 2012/0203081 A1 | 8/2012 | LeBoeuf et al. |
| 2012/0226111 A1 | 9/2012 | LeBoeuf et al. |
| 2012/0226112 A1 | 9/2012 | LeBoeuf et al. |
| 2012/0245434 A1 | 9/2012 | Haick et al. |
| 2012/0245854 A1 | 9/2012 | Haick et al. |
| 2012/0277794 A1 | 11/2012 | Kountotsis et al. |
| 2012/0306802 A1 | 12/2012 | McCracken |
| 2012/0326092 A1 | 12/2012 | Haick et al. |
| 2013/0034190 A1 | 2/2013 | Tan et al. |
| 2013/0034910 A1 | 2/2013 | Haick et al. |
| 2013/0059758 A1 | 3/2013 | Haick et al. |
| 2013/0100067 A1 | 4/2013 | Dews |
| 2013/0102018 A1 | 4/2013 | Schentag et al. |
| 2013/0143247 A1 | 6/2013 | Haick et al. |
| 2013/0150261 A1 | 6/2013 | Haick et al. |
| 2013/0165810 A1 | 6/2013 | Saatchi et al. |
| 2013/0171733 A1 | 7/2013 | Haick et al. |
| 2013/0178756 A1 | 7/2013 | Suzuki et al. |
| 2013/0211207 A1 | 8/2013 | Joseph et al. |
| 2013/0211852 A1 | 8/2013 | Roizen et al. |
| 2013/0224761 A1 | 8/2013 | Imberty et al. |
| 2013/0236981 A1 | 9/2013 | Haick et al. |
| 2013/0253358 A1 | 9/2013 | Phillips et al. |
| 2013/0267862 A1 | 10/2013 | Jaffe et al. |
| 2013/0289368 A1 | 10/2013 | Covington et al. |
| 2013/0306419 A1 | 11/2013 | Okuda |
| 2013/0331723 A1 | 12/2013 | Hernandez-Silveira et al. |
| 2013/0334579 A1 | 12/2013 | Accardi et al. |
| 2014/0018691 A1 | 1/2014 | McNeill et al. |
| 2014/0041436 A1 | 2/2014 | Knott et al. |
| 2014/0051956 A1 | 2/2014 | Dalene et al. |
| 2014/0094669 A1 | 4/2014 | Jaffe et al. |
| 2014/0122515 A1 | 5/2014 | Lee et al. |
| 2014/0145735 A1 | 5/2014 | Koester et al. |
| 2014/0171817 A1 | 6/2014 | Blanch et al. |
| 2014/0194703 A1 | 7/2014 | Wondka et al. |
| 2014/0275597 A1 | 9/2014 | Zhang et al. |
| 2014/0275854 A1 | 9/2014 | Venkatraman et al. |
| 2014/0276168 A1 | 9/2014 | Satya et al. |
| 2014/0294675 A1 | 10/2014 | Melker et al. |
| 2014/0318535 A1 | 10/2014 | Bullock et al. |
| 2014/0378790 A1 | 12/2014 | Cohen |
| 2015/0013429 A1 | 1/2015 | Atkin et al. |
| 2015/0017735 A1 | 1/2015 | Katta |
| 2015/0031582 A1 | 1/2015 | Cai et al. |
| 2015/0038378 A1 | 2/2015 | Cheng et al. |
| 2015/0044710 A1 | 2/2015 | Dasgupta et al. |
| 2015/0064796 A1 | 3/2015 | Fu et al. |
| 2015/0065365 A1 | 3/2015 | Ahmad |
| 2015/0164373 A1 | 6/2015 | Davis et al. |
| 2015/0196251 A1 | 7/2015 | Outwater et al. |
| 2015/0250408 A1 | 9/2015 | Ssenyange et al. |
| 2015/0257676 A1 | 9/2015 | Fries |
| 2015/0265184 A1 | 9/2015 | Wondka et al. |
| 2015/0289782 A1 | 10/2015 | Peverall et al. |
| 2015/0295562 A1 | 10/2015 | Agarwal et al. |
| 2015/0298115 A1 | 10/2015 | Campidelli et al. |
| 2015/0301021 A1 | 10/2015 | Haick et al. |
| 2015/0307936 A1 | 10/2015 | Goldsmith |
| 2015/0309018 A1 | 10/2015 | Goldsmith |
| 2015/0320338 A1 | 11/2015 | Kane et al. |
| 2015/0335266 A1 | 11/2015 | Cormier |
| 2015/0335267 A1 | 11/2015 | Cormier et al. |
| 2015/0338340 A1 | 11/2015 | Jiang et al. |
| 2015/0338390 A1 | 11/2015 | Anglin et al. |
| 2015/0351699 A1 | 12/2015 | Addison et al. |
| 2016/0025675 A1 | 1/2016 | Goldsmith |
| 2016/0054312 A1 | 2/2016 | Goldsmith |
| 2016/0089089 A1 | 3/2016 | Kakkar et al. |
| 2016/0093806 A1 | 3/2016 | Turchanin |
| 2016/0109440 A1 | 4/2016 | Sherwood et al. |
| 2016/0116431 A1 | 4/2016 | Accardi et al. |
| 2016/0150995 A1 | 6/2016 | Ratto et al. |
| 2016/0157752 A1 | 6/2016 | Cho et al. |
| 2016/0192861 A1 | 7/2016 | Gedeon et al. |
| 2016/0231309 A1 | 8/2016 | Ahmad et al. |
| 2016/0289769 A1 | 10/2016 | Schwartz et al. |
| 2016/0334381 A1 | 11/2016 | King-Smith et al. |
| 2016/0334386 A1 | 11/2016 | Anglin et al. |
| 2016/0356741 A1 | 12/2016 | Makaram et al. |
| 2016/0370337 A1 | 12/2016 | Blackley |
| 2017/0014043 A1 | 1/2017 | McDonnell |
| 2017/0042435 A1 | 2/2017 | Vermeulen et al. |
| 2017/0053068 A1 | 2/2017 | Pillai et al. |
| 2017/0067888 A1 | 3/2017 | Taslim et al. |
| 2017/0082566 A1 | 3/2017 | Koester |
| 2017/0212116 A1 | 7/2017 | Braga et al. |
| 2017/0227491 A1 | 8/2017 | Johnson et al. |
| 2017/0248541 A1 | 8/2017 | Liu |
| 2017/0307562 A1 | 10/2017 | Goldsmith |
| 2017/0307576 A1 | 10/2017 | Anglin, Jr. et al. |
| 2017/0360337 A1 | 12/2017 | Sherwood et al. |
| 2017/0361599 A1 | 12/2017 | Lerner et al. |
| 2017/0365474 A1 | 12/2017 | Pan et al. |
| 2017/0365477 A1 | 12/2017 | Pan et al. |
| 2017/0365562 A1 | 12/2017 | Pan et al. |
| 2018/0035932 A1 | 2/2018 | Massova |
| 2018/0037952 A1 | 2/2018 | Goldsmith |
| 2018/0037985 A1 | 2/2018 | Myers et al. |
| 2018/0048008 A1 | 2/2018 | Johnston et al. |
| 2018/0110444 A1 | 4/2018 | Sherwood et al. |
| 2018/0328841 A1 | 11/2018 | Graham et al. |
| 2018/0336970 A1 | 11/2018 | Sherwood et al. |
| 2019/0025237 A1 | 1/2019 | Kelly et al. |
| 2019/0178837 A1 | 6/2019 | Xu et al. |
| 2019/0254538 A1 | 8/2019 | Erdman et al. |
| 2019/0257825 A1 | 8/2019 | Zhen et al. |
| 2019/0286866 A1 | 9/2019 | Gurt |
| 2019/0331661 A1 | 10/2019 | Zhen et al. |
| 2020/0166435 A1 | 5/2020 | Sherwood et al. |
| 2020/0191737 A1 | 6/2020 | Sherwood et al. |
| 2021/0057526 A1 | 2/2021 | Zhen et al. |
| 2021/0072208 A1 | 3/2021 | Sherwood et al. |
| 2021/0148848 A1 | 5/2021 | Kelly et al. |
| 2021/0341409 A1 | 11/2021 | Rognrud et al. |
| 2022/0365024 A1* | 11/2022 | Aran ................ G01N 27/414 |
| 2023/0393087 A1 | 12/2023 | Sherwood et al. |
| 2024/0255391 A1 | 8/2024 | Sherwood et al. |

FOREIGN PATENT DOCUMENTS

| | | |
|---|---|---|
| CN | 1301342 | 6/2001 |
| CN | 101209218 | 7/2008 |
| CN | 101685077 | 3/2010 |
| CN | 102183557 | 9/2011 |
| CN | 102770069 | 11/2012 |
| CN | 102941042 | 2/2013 |
| CN | 103332678 | 10/2013 |
| CN | 103814294 | 5/2014 |
| CN | 103950920 | 7/2014 |
| CN | 103975237 | 8/2014 |
| CN | 104914138 | 9/2015 |
| CN | 103852505 | 11/2015 |
| CN | 103877574 | 1/2016 |

(56) References Cited

FOREIGN PATENT DOCUMENTS

| | | |
|---|---|---|
| CN | 105445335 | 3/2016 |
| CN | 105527321 | 4/2016 |
| CN | 105688995 | 6/2016 |
| CN | 106152924 | 11/2016 |
| CN | 106456986 | 2/2017 |
| CN | 106483184 | 3/2017 |
| CN | 106687174 | 5/2017 |
| CN | 107180706 | 9/2017 |
| CN | 108534887 | 9/2018 |
| CN | 109270130 | 1/2019 |
| CN | 109862829 | 6/2019 |
| CN | 107076693 | 9/2020 |
| CN | 111788477 | 10/2020 |
| CN | 112041672 | 12/2020 |
| CN | 113167758 | 7/2021 |
| CN | 113196047 | 7/2021 |
| CN | 109310326 | 3/2022 |
| CN | 110769742 | 7/2022 |
| EP | 1764153 | 3/2007 |
| EP | 1806414 | 7/2007 |
| EP | 2542921 | 1/2013 |
| EP | 3093653 | 11/2016 |
| EP | 3210007 | 8/2017 |
| EP | 3439544 | 2/2019 |
| EP | 3528703 | 8/2019 |
| EP | 3431977 | 12/2020 |
| EP | 3755995 | 12/2020 |
| EP | 3785025 | 3/2021 |
| EP | 3825683 | 5/2021 |
| EP | 3861329 | 8/2021 |
| EP | 3899515 | 10/2021 |
| IN | 201627028955 | 10/2016 |
| JP | H07507943 | 9/1995 |
| JP | H11174051 | 7/1999 |
| JP | 2002529694 | 9/2002 |
| JP | 2004081854 | 3/2004 |
| JP | 2005514081 | 5/2005 |
| JP | 2008516209 | 5/2008 |
| JP | 2009244074 | 10/2009 |
| JP | 2011102747 | 5/2011 |
| JP | 2011523363 | 8/2011 |
| JP | 2012122814 | 6/2012 |
| JP | 2012517276 | 8/2012 |
| JP | 2015508175 | 3/2015 |
| JP | 5837058 | 11/2015 |
| JP | 2016022415 | 2/2016 |
| JP | 2016511456 | 4/2016 |
| JP | 2016122249 | 7/2016 |
| JP | 2016154931 | 9/2016 |
| JP | 2017096927 | 6/2017 |
| JP | 2017123912 | 7/2017 |
| JP | 2019020415 | 2/2019 |
| JP | 2019527365 | 9/2019 |
| JP | 2019536013 | 12/2019 |
| JP | 2020521128 | 7/2020 |
| JP | 6868126 | 4/2021 |
| JP | 2021514478 | 6/2021 |
| KR | 20170057001 | 5/2017 |
| KR | 101797737 | 11/2017 |
| WO | 9325142 | 12/1993 |
| WO | 9947905 | 9/1999 |
| WO | 2001070114 | 9/2001 |
| WO | 2008083285 | 7/2008 |
| WO | 2008088780 | 7/2008 |
| WO | 2009020647 | 2/2009 |
| WO | 2009135070 | 11/2009 |
| WO | 2011109736 | 9/2011 |
| WO | 2011158068 | 12/2011 |
| WO | 2012064704 | 5/2012 |
| WO | 2012127213 | 9/2012 |
| WO | 2012135565 | 10/2012 |
| WO | 2012138632 | 10/2012 |
| WO | 2012145247 | 10/2012 |
| WO | 2013036389 | 3/2013 |
| WO | 2013095730 | 6/2013 |
| WO | 2013189502 | 12/2013 |
| WO | 2014064740 | 5/2014 |
| WO | 2014143175 | 9/2014 |
| WO | 2015134895 | 9/2015 |
| WO | 2015179623 | 11/2015 |
| WO | 2015191558 | 12/2015 |
| WO | 2016063148 | 4/2016 |
| WO | 2016064740 | 4/2016 |
| WO | 2016105464 | 6/2016 |
| WO | 2016145300 | 9/2016 |
| WO | 2017066583 | 4/2017 |
| WO | 2017095922 | 6/2017 |
| WO | 2017218464 | 12/2017 |
| WO | 2018053932 | 3/2018 |
| WO | 2018075731 | 4/2018 |
| WO | 2018213564 | 11/2018 |
| WO | 2018215069 | 11/2018 |
| WO | 2019164922 | 8/2019 |
| WO | 2019209918 | 10/2019 |
| WO | 2020102880 | 5/2020 |
| WO | 2020112825 | 6/2020 |
| WO | 2020131567 | 6/2020 |
| WO | 2021034844 | 2/2021 |
| WO | 2021222489 | 11/2021 |

OTHER PUBLICATIONS

"First Office Action," for Chinese Patent Application No. 201980077885.6 mailed Aug. 30, 2023 (10 pages) with English Summary.
"International Preliminary Report on Patentability," for PCT Application No. PCT/US2022/025004 mailed Oct. 26, 2023 (11 pages).
"Summons to Attend Oral Proceedings," for European Patent Application No. 15790739.5 mailed Oct. 13, 2023 (8 pages).
"First Office Action," for Chinese Patent Application No. 201980082446.4 mailed Nov. 6, 2023 (11 pages) with English translation.
"Communication Pursuant to Article 94(3) EPC," for European Patent Application No. 17794832.0 mailed Mar. 16, 2023 (7 pages).
"Non-Final Office Action," for U.S. Appl. No. 16/696,348 mailed Mar. 24, 2023 (22 pages).
"Notice of Allowance," for U.S. Appl. No. 17/101,900 mailed Feb. 28, 2023 (31 pages).
"Response to Final Rejection," mailed on Nov. 3, 2022, for U.S. Appl. No. 16/696,348, submitted via EFS-Web on Mar. 3, 2023, 11 pages.
"Second Office Action," for Chinese Patent Application No. 201810782878.3 mailed Feb. 25, 2023 (4 pages) with English Summary.
Huang, Qing-An. et al. "LC Passive Wireless Sensors Toward a Wireless Sensing Platform: Status, Prospects, and Challenges," Journal of Microelectromechanical Systems, vol. 25, No. 5, Oct. 2016, https://ieeexplore.ieee.org/abstract/document/7558121 (20 pages).
"Notice of Allowance," for U.S. Appl. No. 16/696,348 mailed Jul. 24, 2023 (11 pages).
"Response to Communication Pursuant to Article 94(3) EPC," for European Patent Application No. 20214733.6 filed May 23, 2023 (45 pages).
"Response to Non-Final Rejection," mailed on Mar. 24, 2023 for U.S. Appl. No. 16/696,348, submitted via EFS-Web on Jun. 22, 2023, 9 pages.
"Non-Final Office Action," for U.S. Appl. No. 17/242,750 mailed Apr. 30, 2024 (85 pages).
"Determination of Carbonyl Compounds By High performance Liquid Chromatography (HPLC)," EPA Method 8315A 1996 (34 pages).
"Decision of Rejection" for Chinese Patent Application No. 201780065376.2 mailed Apr. 1, 2022 (9 pages) with English Translation.
"European Search Report," for Dutch Patent Application No. 2019492 dated Apr. 12, 2018 (10 pages).
"FDC1004 4-Channel Capacitance-to-Digital Converter for Capacitive Sensing Solutions," Data Sheet SNOSCY5B Texas Instruments Aug. 2014—Revised 2015 (24 pages).

(56) References Cited

OTHER PUBLICATIONS

"FDC1004EVM User Guide," Literature No. SNAU163C, Texas Instruments Aug. 2014—Revised Oct. 2016 (46 pages).
File History for European Patent Application No. 15790739.5 downloaded Aug. 2, 2022 (243 pages).
File History for U.S. Appl. No. 14/883,895 downloaded Aug. 2, 2022 (576 pages).
File History for European Patent Application No. 17733246.7 downloaded Aug. 2, 2022 (148 pages).
File History for U.S. Appl. No. 15/621,103 downloaded Aug. 2, 2022 (656 pages).
File History for European Patent Application No. 17794832.0 downloaded Aug. 2, 2022 (172 pages).
File History for U.S. Appl. No. 15/787,985 downloaded Aug. 2, 2022 (501 pages).
File History for U.S. Appl. No. 18731579.1 downloaded Aug. 2, 2022 (508 pages).
File History for U.S. Appl. No. 15/982,506 downloaded Aug. 2, 2022 (270 pages).
File History for European Patent Application No. 18180455.0 downloaded Aug. 2, 2022 (352 pages).
File History for European Patent Application No. 20214733.6 downloaded Aug. 2, 2022 (189 pages).
File History for U.S. Appl. No. 17/101,900 downloaded Aug. 2, 2022 (317 pages).
File History for U.S. Appl. No. 16/037,218 downloaded Aug. 2, 2022 (298 pages).
"First Examination Report," for Australian Patent Application No. 2019224011 mailed Apr. 9, 2021 (4 pages).
"First Office Action," for Chinese Patent Application No. 201580056417.2 mailed Feb. 11, 2019 (13 pages) with English summary.
"First Office Action," for Chinese Patent Application No. 201780030595.7 mailed Nov. 2, 2020 (12 pages) with English Summary.
"First Office Action," for Chinese Patent Application No. 201810782878.3 mailed Feb. 9, 2022 (14 pages) with English Summary.
"First Office Action," for Chinese Patent Application No. 201880032911.9 mailed Nov. 3, 2021 (11 pages) with English Summary.
"International Preliminary Report on Patentability," for PCT Application No. PCT/US2015/056243 mailed May 4, 2017 (8 pages).
"International Preliminary Report on Patentability," for PCT Application No. PCT/US2017/057318 mailed May 2, 2019 (11 pages).
"International Preliminary Report on Patentability," for PCT Application No. PCT/US2018/033166 mailed Nov. 28, 2019 (8 pages).
"International Preliminary Report on Patentability," for PCT Application No. PCT/US2018/037144 mailed Dec. 27, 2018 (7 pages).
"International Preliminary Report on Patentability," for PCT Application No. PCT/US2019/018741 mailed Sep. 3, 2020 (11 pages).
"International Preliminary Report on Patentability," for PCT Application No. PCT/US2019/028870 mailed Nov. 5, 2020 (11 pages).
"International Preliminary Report on Patentability," for PCT Application No. PCT/US2019/063324 mailed Jun. 10, 2021 (10 pages).
"International Preliminary Report on Patentability," for PCT Application No. PCT/US2019/065981 mailed Jul. 1, 2021 (8 pages).
"International Search Report and Written Opinion," for PCT Application No. PCT/US2015/056243, mailed Jan. 26, 2016 (12 pages).
"International Search Report and Written Opinion," for PCT Application No. PCT/US2017/037144 mailed Oct. 6, 2017 (11 pages).
"International Search Report and Written Opinion," for PCT Application No. PCT/US2017/057318 mailed Feb. 6, 2018 (14 pages).
"International Search Report and Written Opinion," for PCT Application No. PCT/US2018/033166 mailed Oct. 2, 2018 (12 pages).
"International Search Report and Written Opinion," for PCT Application No. PCT/US2019/018741 mailed May 6, 2019 (17 pages).
"International Search Report and Written Opinion," for PCT Application No. PCT/US2019/028870 mailed Aug. 20, 2019 (17 pages).
"International Search Report and Written Opinion," for PCT Application No. PCT/US2019/063324 mailed Mar. 27, 2020 (17 pages).
"International Search Report and Written Opinion," for PCT Application No. PCT/US2019/065981 mailed Mar. 16, 2020 (14 pages).
"International Search Report and Written Opinion," for PCT Application No. PCT/US2020/046829 mailed Nov. 18, 2020 (15 pages).
"International Search Report and Written Opinion," for PCT Application No. PCT/US2021/026778 mailed Aug. 3, 2021 (11 pages).
"International Search Repot and Written Opinion," for PCT Application No. PCT/US2022/025004 mailed Jul. 25, 2022 (15 pages).
"Mechanical Data," DGS (S-PDSO-G10) DSC0010B Package Outline, Example Board Layout, and Stencil Design. Texas Instruments 2016 (5 pages).
"Nano Mobile Healthcare Inc.," Company Profile on Reuters.com URL <http://www.reuters.com/finance/stocks/companyProfile?symbol=VNTH.PK> accessed Mar. 17, 2017 (2 pages).
"Non-Final Office Action," for U.S. Appl. No. 16/280,635 mailed Feb. 10, 2021 (40 pages).
"Non-Final Office Action," for U.S. Appl. No. 16/393,177 mailed May 25, 2021 (37 pages).
"Non-Final Office Action," for U.S. Appl. No. 16/696,348 mailed Jun. 20, 2022 (68 pages).
"Non-Final Office Action," for U.S. Appl. No. 16/712,255 mailed Jun. 23, 2022 (64 pages).
"Notice of Allowance," for U.S. Appl. No. 16/280,635 mailed Mar. 31, 2021 (14 pages).
"Office Action," for Chinese Patent Application No. 201780065376.2 mailed Apr. 27, 2021 (10 pages) with English Summary.
"Office Action," for Japanese Patent Application No. 2018-133996 mailed Jan. 25, 2022 (7 pages) with English Translation.
"Office Action," for Japanese Patent Application No. 2018-133996 mailed Jul. 12, 2022 (4 pages) with English Translation.
"Office Action," for Japanese Patent Application No. 2019-517196 mailed Feb. 4, 2020 (10 pages) with English Translation.
"Office Action," for Japanese Patent Application No. 2019-520955 mailed Feb. 9, 2021 (11 pages) with English Translation.
"Office Action," for Japanese Patent Application No. 2019-520955 mailed Jul. 14, 2020 (10 pages) with English Translation.
"Office Action," for Japanese Patent Application No. 2019-563876 mailed Nov. 4, 2020 (5 pages) with English Summary.
"Package Materials Information," Tape and Reel Information and Box Dimensions. Texas Instruments Feb. 13, 2016 (2 pages).
"Package Option Addendum," Packaging Information for FDC1004DGSR, DGST, DSCJ, DSCR and DSCT Devices. Texas Instruments May 2015 (2 pages).
"Response to Communication Pursuant to Rules 161(1) and 162 EPC," for European Patent Application No. 19709268.7 filed Apr. 1, 2021 (12 pages).
"Response to Communication Pursuant to Rules 161(1) and 162 EPC," for European Patent Application No. 19733177.0 filed Jun. 4, 2021 (20 pages).
"Response to Communication Pursuant to Rules 161(1) and 162 EPC," for European Patent Application No. 19828373.1 filed Nov. 8, 2021 (22 pages).
"Response to Communication Pursuant to Rules 161(1) and 162 EPC," for European Patent Application No. 19836341.8 filed Jan. 7, 2022 (12 pages).
"Response to Examination Report," for Australian Patent Application No. 2019224011 filed Jul. 23, 2021 (22 pages).
"Response to Non-Final Rejection," mailed on Feb. 10, 2021 for U.S. Appl. No. 16/280,635, submitted via EFS-Web on Mar. 17, 2021, 16 pages.
"Second Office Action," for Chinese Patent Application No. 201580056417.2 mailed Sep. 25, 2019 (8 pages) with English Summary.
"Second Office Action," for Chinese Patent Application No. 201780030595.7 mailed Jun. 17, 2021 (8 pages) with English Summary.
"Second Office Action," for Chinese Patent Application No. 201780065376.2 mailed Nov. 16, 2021 (8 pages) with English Summary.
"Standard Terms and Conditions for Evaluation Modules," Texas Instruments 2016 (5 pages).

(56) References Cited

OTHER PUBLICATIONS

"Third Office Action," for Chinese Patent Application No. 201580056417.2 mailed Feb. 18, 2020 (9 pages) with English Summary.
Agbonlahor, Osazuwa, et al. "Adsorbed Molecules as Interchangeable Dopants and Scatterers with a van der Waals Bonding Memory in Graphene Sensors," ACS Sens. 2020, 5 (7), 2003-2009 (13 pages).
Allen, Matthew J., et al. "Honeycomb Carbon: A Review of Graphene," Chem. Rev. 2010, 110, 132-145 (14 pages).
An, Xiaohong, et al. "Stable Aqueous Dispersions of Noncovalently Functionalized Graphene from Graphite and their Multifunctional High-Performance Applications," Nano Lett. 2010, 10, 4295-4301 (7 pages).
Arasaradnam, R. P., et al. "Review Article: Next Generation Diagnostic Modalities in Gastroenterology—Gas Phase Volatile compound biomarker detection," Alimentary Pharmacology and Therapeutics 2014; 39: 780-789 (10 pages).
Bair, Kenneth W., et al."(1-Pyrenylmethyl)amino Alcohols, a New Class of Antitumor DNA intercalators. Discovery and Initial Amine Side Chain Structure—Activity Studies," J. Med. Chem. 1990, 33, 2385-2393 (9 pages).
Bard, Allen J., et al. "Electrochemical Methods: Fundamentals and Applications," Wiley New York: 1980; vol. 2 (850 pages).
Bartosik, Miroslav, et al. "The mechanism and suppression of physisorbed-water caused hysteresis in graphene FET sensors," ACS Sens., vol. 5, 2940-2949 (2020). (40 pages).
Bhadra, Sharmista, et al. "Non-destructive detection of fish spoilage using a wireless basic volatile sensor," Talanta, vol. 134, Dec. 25, 2014 pp. 718-723 (6 pages).
Biedermann, Frank, et al. "Experimental Binding Energies in Supramolecular Complexes," Chem. Rev. 2016, 116(9), 5216-5300 (85 pages).
Bock, Harald, et al. "Helicenes from Diarylmaleimides," Organic Letters 2014, 16, 1546-1549 (5 pages).
Boeseken, J. "The Use of Boric Acid for the Determination of the Configuration of Carbohydrates," Adv. Carbohydr. Chem. 1949, 4, 189-210 (22 pages).
Boots, Agnes W., et al. "The Versatile Use of Exhaled Volatile Organic Compounds in Human Health and Disease," J. Breath Res. 6 (2012) 027108 (21 pages).
Brust, Mathias, et al. "Novel Gold-Dithiol Nano-Networks with Non-Metallic Electronic Properties," Adv. Mater. 1995, 7, No. 9 795-797 (3 pages).
Brust, Mathias, et al. "Synthesis of Thiol-derivatised Gold Nanoparticles in a Two-phase Liquid-Liquid System," J. Chem. Soc., Chem. Commun., 1994, 801-802 (2 pages).
Cancilla, Devon A., et al. "O-(2,3,4,5,6-Pentafluorophenyl)methylhydroxylamine hydrochloride: a versatile reagent for the determination of carbonyl-containing compounds," Journal of Chromatography, 627 (1992) 1-16 (16 pages).
Cao, Mengmei, et al. "Electrochemical and Theoretical Study of $\pi$-$\pi$ stacking Interactions between Graphitic Surfaces and Pyrene Derivatives," J. Phys. Chem. C 2014, 118(5), 2650-2659 (10 pages).
Capuano, Rosamaria, et al. "Corroles-Porphyrins: A Teamwork for Gas Sensor Arrays," Sensors, 2015, vol. 15, pp. 8121-8130 (10 pages).
Chamberlain Ii, Richard V., et al. "Electrostatically-induced Inclusion of Anions in Cyclodextrin Monolayers on Electrodes," Langmuir 2000, 1388-1396 (9 pages).
Chen, Gugang, et al. "Sub-ppt gas detection with pristine graphene," Applied Physics Letters 101, 053119 (2012) 6 pages.
Cheng, Zengguang, et al. "Suspended Graphene Sensors with Improved Signal and Reduced Noise," Nano Lett. 2010, 10, 1864-1868 (5 pages).
Connors, Kenneth A., et al. "The Stability of Cyclodextrin Complexes in Solution," Chem. Rev. 1997, 97, 1325-1357 (34 pages).
Cui, Menghua, et al. "Graphene-organic two-dimensional charge transfer complexes: inter-molecular electronic transitions and broadband near infrared photoresponse," J. Phys. Chem. C 2018, 122 (13), 7551-7556 (7 pages).
Deen, David A., et al. "Graphene-Based Quantum Capacitance Wireless Vapor Sensors," IEEE Sensors Journal, vol. 14, No. 5, May 2014, pp. 1459-1466 (8 pages).
Di Natale, Corrado, et al. "Lung Cancer Identification by the Analysis of Breath by Means of an Array of Non-Selective Gas Sensors," Biosensors and Bioelectronics 18 (2003) 1209-1218 (10 pages).
Dreyer, Daniel, et al. "The chemistry of graphene oxide," Chem. Soc. Rev. 2010, 39(1), 228-240 (13 pages).
Droscher, S., et al. "Quantum Capacitance and Density of States of Graphene," Phys. Scr. T146 (2012) 014009, pp. 1-5 (5 pages).
Ebrish, M. A., et al. "Dielectric Thickness Dependence of Quantum Capacitance in Graphene Varactors with Local Metal Back Gates," Device Research Conference, 2012 (2 pages).
Ebrish, M. A., et al. "Operation of Multi-Finger Graphene Quantum Capacitance Varactors using Planarized Local Bottom Gate Electrodes," Applied Physics Letters, vol. 100, No. 14, Apr. 2012 (4 pages).
Ebrish, Mona A., et al. "Effect of Noncovalent Basal Plane Functionalization of the Quantum Capacitance in Graphene," ACS Appl. Mater. Interfaces 2014, 6, 10296-10303 (8 pages).
Elemans, Johannes A.A.W., et al. "Molecular Materials by Self-Assembly of Porphyrins, Phthalocyanines, and Perylenes," Adv. Mater. 2006, 18, 1251-1266 (16 pages).
Fan, Xuge, et al. "Humidity and CO2 gas sensing properties of double-layer graphene," Carbon 127 (2018) 576-587 (12 pages).
Fisher, James P., et al. "Central Sympathetic Overactivity: Maladies and Mechanisms," Autonomic Neuroscience 148.1 (2009): 5-15 (11 pages).
Fogel, Yulia, et al. "Graphitic Nanoribons with Dibenzo[e, l]pyrene Repeat Units: Synthesis and Self-Assembly," Macromolecules 2009, 42, 6878-6884 (7 pages).
Fuchs, Patricia, et al. "Breath gas aldehydes as biomarkers of lung cancer," Int. J. Cancer 2010, 126 (11), 2663-70 (8 pages).
Gao, Zhaoli, et al. "Scalable Production of Sensor Arrays Based on High-Mobility Hybrid Graphene Field Effect Transistors," ACS Applied Materials & Interfac. 2016, 8(41), 27546-27552 (8 pages).
Gautam, Madhav, et al. "Gas sensing properites of graphene synthesized by chemical vapor deposition," Materials and Science Engineering C31 (2011) 1405-1411 (7 pages).
Gavartin, J.L., et al. "The role of nitrogen-related defects in high-k dialectric oxides: Density-functional studies.," Journal of Applied Physics. vol. 97, Issue 5. (15 pages).
Geim, A.K., et al. "The rise of graphene," Nat. Mater. 2007, 6, 183-191 (9 pages).
Georgakilas, Vasilios, et al. "Functionalization of Graphene: Covalent and Non-Covalent Approaches, Derivatives and Applications," Chem. Rev. 2012, 112(11), 6156-6214 (59 pages).
Georgakilas, Vasilios, et al. "Functionalization of Graphene: Covalent and Non-Covalent Approaches, Derivatives and Applications," Chemical Reviews, 2012, 14:112(11), pp. 6156-6214.
Georgakilas, Vasilios, et al. "Noncovalent Functionalization of Graphene and Graphene Oxide for Energy Materials, Biosensing, Catalytic, and Biomedical Applications," Chem. Rev. 2016, 116, 5464-5519 (56 pages).
Ghosh, Sujoy, et al. "Effect of 1-Pyrene Carboxylic-Acid Functionalization of Graphene on Its Capacitive Energy Storage," J. Phys. Chem. C 2012, 116, 20688-20693 (6 pages).
Giancane, Gabriele, et al. "State of Art in Porphyrin Langmuir-Blodgett Films as Chemical Sensors," Advances in Colloid and Interface Science, 2012, vol. 171-172, pp. 17-35 (Year: 2012), 19 pages.
Good, Robert J. "Contact angle, wetting, and adhesion: a critical review," J. Adhesion Sci. Technol. 1992, vol. 6, No. 12, pp. 1269-1302 (34 pages).
Gorodetsky, Alon A., et al. "Electrochemistry Using Self-assembled DNA Monolayers on Highly Oriented Pyrolytic Graphite," Langmuir 2006, 22, 7917-7922 (6 pages).

(56) References Cited

OTHER PUBLICATIONS

Groves, William A., et al. "Analysis of Solvent Vapors in Breath and Ambient Air with a Surface Acoustic Wave Sensor Array," Ann. Occup. Hyg., vol. 45, No. 8, pp. 609-623, 2001 (15 pages).
Guo, Yujing, et al. "Cyclodextrin Functionalized Graphene Nanosheets with High Supramolecular Recognition Capability: synthesis and Host-Guest Inclusion for Enhanced Electrochemical Performance," ACS Nano, 2010, abstract only (2 pages).
Guo, Zanru, et al. "Light-Switchable Single-Walled Carbon Nanotubes Based on Host-Guest Chemistry," Adv. Funct. Mater. 2013, 23, 5010-5018 (18 pages).
Hasobe, Taku "Photo- and Electro-Functional Self-Assembled Architectures of Porphyrins," Physics Chemistry Chemical Physics, 2012, 14, pp. 15975-15987 (Year: 2012), 13 pages.
Hayasaka, Takeshi, et al. "The influences of temperature, humidity, and O2 on electrical properties of graphene FETs," Sensors & Actuators: B. Chemical 285 (2019) 116-122 (7 pages).
Hill, Ernie W., et al. "Graphene Sensors," IEEE Sensors Journal, vol. 11, No. 12, Dec. 2011 (10 pages).
Hinnemo, Malkolm, et al. "On Monolayer Formation of Pyrenebutyric Acid on Graphene," Langmuir, 2017, vol. 33, No. 14 pp. 3588-3593 (6 pages).
Hockstein, Neil G., et al. "Diagnosis of Pneumonia with an Electronic Nose: Correlation of Vapor Signature with Chest Computed Tomography Scan Findings," The Laryngoscope 2004, 114 (10), 1701-1705 (5 pages).
Hong Chan, Wing, et al. "Optodes based on a calixarene ester for the determination of aldehydes via in situ generation of the Girard's reagent P derivative," Analyst 1998, 123 (12), 2851-2856 (6 pages).
Hsiao, Min-Chien, et al. "Preparation and properties of a graphene reinforced nanocomposite conducting plate," J. Mater. Chem., 2010, 20, 8496-8505 (10 pages).
Hsieh, Chien-Te, et al. "Field emission from various CuO nanostructures," Applied Physics Letters 2003, vol. 83, No. 6 (3 pages).
Hu, Yuhai, et al. "Chemically Functionalized Graphene and Their Applications in Electrochemical Energy Conversion and Storage," Advances in Graphene Science, Chapter 7, 2013, pp. 161-190 (30 pages).
Huang, Ke-Jing, et al. "Novel electrochemical sensor based on functionalized graphene for simultaneous determination of adenine and guanine in DNA," Colloids and Surfaces B: Biointerfaces 82 (2011) 543-549 (7 pages).
Hunter, Christopher A., et al. "The Nature of π-π Interactions," J. Am. Chem. Soc. 1990, 112, 5525-5534 (10 pages).
Hwang, Michael, et al. "Ultrasensitive detection of nucleic acids using deformed graphene channel field effect biosensors," Nat. Commun. 2020, 11(1) (11 pages).
Iezhokin, I., et al. "Porphyrin molecules boost the sensitivity of epitaxial graphene for NH3 detection," J. Phy.: Condens. Matter 29 (2017) (11 pages).
Ionescu, Radu, et al. "Detection of Multiple Sclerosis from exhaled Breath Using Bilayers of Polycyclic Aromatic Hydrocarbons and Single-Wall Carbon Nanotubes," ACS Chemical Neurosci. 2011, 2(12), 687-693 (7 pages).
Jiao, Dezhi, et al. "Supramolecular Peptide Amphiphile Vesicles through Host—Guest Complexation," Angew. Chem. Int. Ed. 2012, 51, 9633-9637 (5 pages).
Josef, Szejtli "Introduction and General Overview of Cyclodextrin Chemistry," Chem. Rev. 1998, 98, 1743-1753 (12 pages).
Kang, Junmo, et al. "Graphene Transfer: key for applications," Nanoscale, 2012, 4, 5527 (11 pages).
Kang, Xinhuang, et al. "Glucose Oxidase-graphene-chitosan modified electrode for direct electrochemistry and glucose sensing," Biosensors and Bioelectronics 25 (2009) 901-905 (5 pages).
Knipp, Ralph J., et al. "A versatile probe for chemoselective capture and analysis of carbonyl compounds in exhaled breath," Anal Methods, 2015, 7, 6027 (7 pages).
Kobayashi, Keiko, et al. "Gas chromatrographic determination of low-molecular-weight carbonyl compounds in aqueous solution as their O-(2,3,4,5,6-pentafluorobenzyl) oximes," Journal of Chromatography A 1980, 187(2), 413-417 (5 pages).
Koester, Steven J. "High Quality Factor Graphene Varactors for Wireless Sensing Applications," Applied Physics Letters 99, 163105 (2011), 3 pages.
Koester, Steven J. "Using the Quantum Capacitance in Graphene to Enable Varactors for Passive Wireless Sensing Applications," 2011 IEEE Sensors Proceedings, pp. 994-997, 2011 (4 pages).
Kozbial, Andrew, et al. "Study on the surface energy of graphene by contact angle measurement," Langmuir 2014, 30 (28), 8598-8606 (28 pages).
Kuila, Tapas, et al. "Chemical functionalization of graphene and its applications," Progress in Materials Science 57 (2012) 1061-1105 (45 pages).
Lauffer, Peter, et al. "Molecular and electronic structure of PTCDA on bilayer graphene on SiC(0001) studied with scanning tunnerling microscopy," Phys. Stat. Sol. (b) 2008, 245, No. 10, 2064-2067 (4 pages).
Lechner, Christoph, et al. "Adhesive Forces Between Aromatic Molecules and Graphene," The Journal of Physical Chemistry C 2014, 118(36), 20970-20981 (12 pages).
Lecourt, Thomas, et al. "Triisobutylaluminium and Diisobutylaluminium Hydride as Molecular Scalpels: The Regioselective Stripping of Perbenzylate Sugars and Cyclodextrins," Chem. Eur. J. 2004, 10, 2960-2971 (12 pages).
Li, Errui, et al. "Aliphatic Aldehyde Detection and Adsorption by Nonporous Adaptive Pillar[4]arene[1]quinone Crystals with Vapochromic Behavior," ACS Applied Materials & Interfaces, 2018, 10, 23147-23153 (23 pages).
Li, Mingxiao, et al. "Preconcentration and Analysis of Trace Volatile Carbonyl Compounds," Anal Chem 2012, 84(3), 1288-1293 (6 pages).
Li, Xiao, et al. "Digital Health: Tracking Physiomes and Activity Using Wearable Biosensors Reveals Useful Health-Related Information," PLoS Biology 15.1 (2017): e2001402 (30 pages).
Lienerth, Peter et al. "Improving the selectivity to polar vapors of OFET-based sensors by using the transfer characteristics hysteresis response," Sensors and Actuators B 225 (2016) 90-05 (6 pages).
Liu, Sophie F., et al. "Single-walled Carbon Nanotube-Metalloporphyrin Chemiresistive Gas Sensor Arrays for Volatile Organic Compounds," Chemistry of Materials, vol. 27, No. 10 (2015) pp. 3560-3563 (5 pages).
Liu, Yifei M., et al. "Electrochemical Sensing of Nitric Oxide with Functionalized Graphene Electrodes," ACS Applied Materials & Interfaces 2013, 5(23), 12624-12630 (7 pages).
Liu, Yuxin, et al. "Biological and Chemical Sensors based on Graphene Materials," Chem. Soc. Rev. 2012, 41 (6), 2283-2307 (27 pages).
Loh, Kian Ping, et al. "The Chemistry of Graphene," J. Mater. Chem., 2010, 20, 2277-2289 (13 pages).
Long, Brenda, et al. "Non-Covalent Functionalization of Graphene Using Self-Assembly of Alkane-Amines," Adv. Funct. Mater. 2012, 22, 717-725 (9 pages).
Lu, Chun-Hua, et al. "A Graphene Platform for Sensing Biomolecules," Angew. Chem. Int. Ed. 2009, 48, 4785-4787 (3 pages).
Ma, Rui, et al. "Acetone Sensing Using Graphene Quantum Capacitance Varactors," 2016 IEEE Sensors, Orlando, FL, 2016 (3 pages).
Machado, Roberto F., et al. "Detection of Lung Cancer by Sensor Array Analyses of Exhaled Breath," Am J Respir Crit Care Med, vol. 171, 1286-1291 (2005), 6 pages.
MacKin, Charles, et al. "Chemiresistive Graphene Sensors for Ammonia Detection," ACS Appl. Mater. Interfaces 2018, 10, 16169-16176 (8 pages).
Mann, Jason A., et al. "Improving the Binding Characteristics of Tripodal Compounds on Single Layer Graphene," American Chemical Society 2013, vol. 7, No. 8, 7193-7199 (7 pages).
Manochehry, Sepehr, et al. "Optical biosensors utilizing graphene and functional DNA molecules," J. Mater. Res. 2017, 32(15), 2973-2983 (11 pages).
Manolis, Antony "The Diagnostic Potential of Breath Analysis," Clin. Chem. 29/1, 5-15 (1983) (11 pages).

(56) References Cited

OTHER PUBLICATIONS

Mao, Shun, et al. "Specific Protein Detection Using Thermally Reduced Graphene Oxide Sheet Decorated with Gold Nanoparticle-Antibody Conjugates," Adv. Mater. 2010, 22, 3521-3526 (6 pages).
McCulloch, Michael, et al. "Diagnostic Accuracy of Canine Scent Detection in Early-and Late-Stage Lung and Breast Cancers," Integrative Cancer Therapies 2006, 5(1), 30-39 (11 pages).
Moldoveanu, Serban C., et al. "Derivatization Methods in GC and GC/MS," in Gas Chromatography-Derivatization, Sample Preparation, Application, Kusch, P., Ed. IntechOpen:2018 (33 pages).
Muruganathan, Manoharan, et al. "Electrically Tunable van der Waals Interaction in Graphene—Molecule Complex," Nano Lett. 2015, 15(12), 8176-8180 (5 pages).
Nag, Sanada, et al. "Ultrasensitive QRS made by supramolecular assembly of functionalized cyclodextrins and graphene for the detection of lung cancer VOC biomarkers," Journals of Materials Chemistry B 2014, 2, pp. 6571-6579 (9 pages).
Nakhleh, Morad K., et al. "Diagnosis and Classification of 17 Diseases from 1404 Subjects via Pattern Analysis of Exhaled Molecules," ACS Nano 2017, 11, 112-125 (14 pages).
Navaneethan, Udayakumar, et al. "Volatile Organic Compounds in Bile Can Diagnose Malignant Biliary Strictures in the Setting of Pancreatic Cancer: A Preliminary Observation," Gastrointest Endosc. Dec. 2014;80(6):1038-45 (8 pages).
Novoselov, K.S., et al. "Electric Field Effect in Atomically Thin Carbon Films," Science 2004, 306, 666-669 (5 pages).
Ohno, Yasuhide, et al. "Electrolyte-Gated Graphene Field-Effect Transistors for Detecting pH and Protein Adsorption," Nano Letters 2009, vol. 9, No. 9, 3318-3322 (5 pages).
Olson, Eric J., et al. "Capacitive Sensing of Intercalated H2O Molecules Using Graphene," ACS Appl. Mater. Interfaces 2015, 7(46), 25804-25812 (10 pages).
Olson, Eric J., et al. "Getting More out of a Job Plot: Determination of Reactant to Product Stoichiometry in Cases of Displacement Reactions and n:n Complex Formation," J. Org. Chem. 2011, 76, 8406-8412 (7 pages).
Oprea, A., et al. "Integrated Temperature, Humidity and Gas Sensors on Flexible Substrates for Low-Power Applications," 007 IEEE Sensors, Atlanta, GA, 2007, pp. 158-161 (4 pages).
Ou, Baoli, et al. "Covalent functionalization of graphene with poly(methylmethacrylate) by atom transfer radical polymerization at room temperature," Polym. Chem., 2012, 3, 2768 (8 pages).
Park, Eun Uk, et al. "Correlation between the sensitivity and the hysteresis of humidity sensors based on graphene oxides," Sensors and Actuators B 258 (2018) 255-262 (8 pages).
Pathipati, Srinivasa Rao, et al. "Modulation of charge transport properties of reduced graphene oxide by submonolayer physisorption of an organic dye," Organic Electronics 14 (2013) 1787-1792 (6 pages).
Peng, Gang, et al. "Diagnosing lung cancer in exhaled breath using gold nanoparticles," Nature nanotechnology, 2009, 4(10), 669-673 (5 pages).
Peressi, Maria "Surface Functionalization of Graphene," Graphene Chemistry, John Wiley & Sons, Ltd:2013, pp. 233-253 (21 pages).
Planz, B., et al. "The role of urinary cytology for detection of bladder cancer," EJSO (2005) 21, 304-308 (5 pages).
Poli, Diana, et al. "Determination of aldehydes in exhaled breath of patients with lung cancer by means of on-fiber-derivatisation SPME-GC/MS," Journal of Chromatography B, 878 (2010) 2643-2651 (9 pages).
Poulston, S., et al. "Surface Oxidation and Reduction of CuO and Cu2O Studied Using XPS and XAES," Surface and Interface Analysis, vol. 24, 811-820 (10 pages).
Putta, Chandrababu, et al. "Palladium Nanoparticles on Beta-Cyclodextrin Functionalised Graphene Nanosheets: a Supramolecular Based Heterogeneous Catalyst for C-C Coupling Reactions under Green Reaction Conditions," RSC Adv., 2015, 5, 6652-6660 (9 pages).
Pyo, Soonjae, et al. "Improved photo- and chemical-responses of graphene via porphyrin-functionalization for flexible, transparent, and sensitive sensors," Nanotechnology 30 (2019) 215501 (9 pages).
Ramakumar, Sanjay, et al. "Comparison of Screening Methods in the Detection of Bladder Cancer," The Journal of Urology vol. 161, 388-394, Feb. 1999 (7 pages).
Rekharsky, Mikhail V., et al. "Complexation Thermodynamics of Cyclodextrins," Chem. Rev. 1998, 98, 1875-1917 (44 pages).
Reuillard, B., et al. "Non-covalent double functionalization of carbon nanotubes wiht a NADH oxidation Ru(II)-based molecular catalyst and a NAD-dependent glucose dehydrogenase," Chem. Commun. 2014, 50(79), 11731-11734 (5 pages).
Rodner, Marius, et al. "Graphene Decorated with Iron Oxide Nanoparticles for Highly Sensitive Interaction with Volatile Organic Compounds," Sensors 2019, 19, 918-026 (9 pages).
Rojas, Maria T., et al. "Supported Monolayers Containing Preformed Binding-Sites—Synthesis and Interfacial Binding-Properties of a Thiolated Beta-Cyclodextrin Derivative," J. Am. Chem. Soc. 1995, 117, 336-343 (8 pages).
Rushi, A.D., et al. "Exercising Substituents in porphyrins for real time selective sensing of volatile organic compounds," Sensors and Actuators B: Chemical, vol. 257, 2018, pp. 389-397 (9 pages).
Schedin, F., et al. "Detection of Individual Gas Molecules Adsorbed on Graphene," Nat. Mater. 2007, 6(9), 652-655 (11 pages).
Shao, Yuyan "Graphene Based Electrochemical Sensor and Biosensors: A Review," Electroanalysis 2010, 22, No. 10, 1027-1036 (10 pages).
Shao, Yuyan, et al. "Nitrogen-doped graphene and its electrochemical applications," J. Mater. Chem., 2010, 20, 7491-7496 (6 pages).
Song, Nan, et al. "Applications of pillarenes, an emerging class of synthetic macrocycles," Science China Chemistry, 2014, 57(9), 1185-1198 (15 pages).
Su, Qun, et al. "Understanding Sources of Electrical Disorder in Graphene Grown by Chemical Vapor Deposition for Wafer-Scale Device Applications," ACS Appl. Nano Mater., vol. 2 (2019) 3426-3433 (26 pages).
Suk, Ji Won, et al. "Transfer of CVD-Grown Monolayer Graphene onto Arbitrary Substrates," ACS Nano 2011, 5(9), 6916-6924 (10 pages).
Swanson, Emily, et al. "Self Assembly of Monolayers on Graphene with Pyrene and Cyclodextrin Derivatives," Research Poster. Elon University, Lando program, Research Experience for Undergraduates Program of the National Science Foundation, Council of Undergraduate Research Experiences for Undergraduates symposium in Washington, D.C., Oct. 23-24, 2016 (1 page).
Terse-Thakoor, Trupti, et al. "Graphene based biosensors for healthcare," J. Mater. Res. 2017, 32(15), 2905-2929 (25 pages).
Tripathi, Kumud Malika, et al. "Recent Advances in Engineered Graphene and Composites for Detection of Volatile Organic Compounds (VOCs) and Non-Invasive Diseases Diagnosis," Carbon 110 (2016)97-129 (34 pages).
Turkevich, John, et al. "A study of the nucleation and growth processes in the synthesis of colloidal gold," Discuss. Faraday Soc., 1951, 11, 55-75 (23 pages).
Vincent, Mark A., et al. "Accurate Prediction of Adsorption Energies on Graphene, Using a Dispersion-Corrected Semiempirical Method Including Solvation," J. Chem. Inf. Model. 2014, 54, 2225-2260 (6 pages).
Wang, David "FDC1004: Basics of Capacitive Sensing and Applications," Application Report SNOA927, Texas Instruments Dec. 2014 (12 pages).
Wang, Lihua "A novel [beta]-cyclodextrin Functionalized Reduced Graphene Oxide Electrochemical Sensor for Blood Glucose Detection," International Journal of Electrochemical Science, Dec. 28, 2017 pp. 1594-1602 (9 pages).
Wang, Qing Hua, et al. "Room-temperature molecular-resolution characterization of self-assembled organic monolayers on epitaxial graphene," Nature Chemistry 2009 vol. 1 (3), 206-211 (6 pages).
Wayu, Mulugeta B., et al. "Electropolymerization of Beta-Cyclodextrin onto Multi-Walled Carbon Nanotube Composite Films for Enhanced Selective Detection of Uric Acid," Journal of Electroanalytical Chemistry 783 (2016), 192-200 (9 pages).

(56) References Cited

OTHER PUBLICATIONS

Wei, Jinwei, et al. "Understanding asymmetric transfer characteristics and hysteresis behaviors in graphene devices under different chemical atmospheres," Carbon 156 (2020) 67-76 (10 pages).

Wu, Ting, et al. "Quantitative principles for precise engineering of sensitivity in carbon-based electrochemical sensors," Adv. Mater. 2018, 1805752 (27 pages).

Xi, Yuxi, et al. "Flexible Graphene Films via te Filtration of Water-Soluble Noncovalent Functionalized Graphene Sheets," J. Am. Chem. Soc. 2008, 130, 5856-5857 (2 pages).

Xu, Huifeng, et al. "Direct Electrochemixtry and electrocatalysis of hemoglobin protein entrapped in graphene and chitosan composite film," Talanta 81 (2010) 334-338 (5 pages).

Xu, Mengjian, et al. "Gate-polarity-dependent doping effects of $H_2O$ adsorption on graphene/$SiO_2$ field-effect transistors," J. Phys. D: Appl. Phys. 53 455301 (8 pages).

Xu, Shicai, et al. "Real-time reliable determination of binding kinetics of DNA hybridization using a multi-channel graphene biosensor," Nat. Commun. 2017, 8(1) 11 pages.

Yavari, Fazel, et al. "Graphene-Based Chemical Sensors," J. Phys. Chem. Lett. 2012, 3, 1746-1753 (8 pages).

Yildiz, Ibrahim "A DFT Approach to the Mechanistic Study of Hydrozone Hydrolysis," J. Phys. Chem. A 2016, 120 (20), 3683-92 (25 pages).

Zhang, Xu, et al. "A Wide Measurement Range and Fast Update Rate Integrated Interface for Capacitive Sensors Array," IEEE Transactions on Circuits and Systems—1: Regular Papers, Vo. 61, No. 1, Jan. 2014, pp. 2-11 (10 pages).

Zhang, Yao, et al. "Capacitive Sensing of Glucose in Electrolytes using Graphene Quantum Capacitance Varactors," ACS Appl. Mater. Interfaces 2017, 9, 38863-38869 (7 pages).

Zhang, Yao, et al. "Glucose Sensing with Graphene Varactors," IEEE Sensors, Sensors 2016—Proceedings, Orlando, FL 2016 (3 pages).

Zhang, Yiheng, et al. "Direct Measurements of the Interaction between Pyrene and Graphite in Aqueous Media by Single Molecule Force Spectroscopy: Understanding the π-π Interactions," Langmuir 2007, 23, 7911-7915 (5 pages).

Zhao, Yan-Li, et al. "Noncovalent Functionalization of Single-Walled Carbon Nanotubes," Accounts of Chemical Research 2009, vol. 42, No. 8. 1161-1171 (12 pages).

Zhen, Xue, et al. "Noncovalent Monolayer Modification of Graphene Using Pyrene and Cyclodextrin Receptors for Chemical Sensing," ACS Applied Nano Materials 2018, vol. 1, No. 6 pp. 2718-2726 (9 pages).

Zheng, Peiru, et al. "Oxidation of graphene with variable defects: alternately symmetrical escape and self-restructuring of carbon rings," Nanoscale 2020, 12 (18), 10140-10148 (10 pages).

Zhu, Congzhi, et al. "Mingling Electronic Chemical Sensors with Supramolecular Host-Guest Chemistry," Current Organic Chemistry, 2014, 18, 1957-1964 (8 pages).

Zhu, Yanwu, et al. "Graphene and Graphene Oxide: Synthesis, Properties, and Applications," Adv. Mater. 2010, 22, 3906-3924 (19 pages).

"Communication Pursuant to Article 94(3) EPC," for European Patent Application No. 20214733.6 mailed Jan. 16, 2023 (5 pages).

"Final Office Action," for U.S. Appl. No. 16/696,348 mailed Nov. 3, 2022 (39 pages).

"International Preliminary Report on Patentability," for PCT Application No. PCT/US2021/026778 mailed Nov. 10, 2022 (7 pages).

"Non-Final Office Action," for U.S. Appl. No. 17/101,900 mailed Nov. 4, 2022 (19 pages).

"Notice of Allowance," for U.S. Appl. No. 16/712,255 mailed Jan. 20, 2023 (31 pages).

"Response to Communication Pursuant to Article 94(3) EPC," for European Patent Application No. 15790739.5 filed Oct. 12, 2022 (35 pages).

"Response to Non-Final Rejection," mailed on Jun. 20, 2022 for U.S. Appl. No. 16/696,348, submitted via EFS-Web on Sep. 20, 2022, 9 pages.

"Response to Non-Final Rejection," mailed on Jun. 23, 2022 for U.S. Appl. No. 16/712,255, submitted via EFS-Web on Sep. 22, 2022, 7 pages.

"Response to Non-Final Rejection," mailed on Apr. 30, 2024, for U.S. Appl. No. 17/242,750, submitted via EFS-Web on Jul. 30, 2024, 11 pages.

"Final Office Action," for U.S. Appl. No. 17/242,750 mailed Nov. 20, 2024 (27 pages).

"Non-Final Office Action," for U.S. Appl. No. 18/144,506 mailed Dec. 19, 2024 (66 pages).

"Communication pursuant to Article 94(3)," for European Patent Application No. 22721582.9 mailed Mar. 17, 2025 (5 pages).

"Non-Final Office Action," for U.S. Appl. No. 17/242,750 mailed Mar. 7, 2025 (27 pages).

"Response to Final Rejection," mailed on Nov. 20, 2024, for U.S. Appl. No. 17/242,750, submitted via Patent Center on Feb. 13, 2025, 13 pages.

"Response to Non Final Office Action," for U.S. Appl. No. 18/144,506, filed Mar. 12, 2025 (10 pages).

Olson, Eric J., et al. "Capacitive Sensing of Intercalated $H_2O$ Molecules Using Graphene," Published date: 2015.

"Non-Final Office Action," for U.S. Appl. No. 18/144,506 mailed May 30, 2025 (15 pages).

"Response to Communication pursuant to Article 94(3)," for European Patent Application No. 22721582.9 filed Jul. 9, 2025 (10 pages).

"Response to Non-Final Rejection," mailed on Mar. 7, 2025, for U.S. Appl. No. 17/242,750, submitted via Patent Center on May 29, 2025, 11 pages.

\* cited by examiner

SYSTEMS UTILIZING GRAPHENE VARACTOR HYSTERESIS EFFECTS FOR SAMPLE CHARACTERIZATION This application claims the benefit of U.S. Provisional Application No. 63/175,670, filed Apr. 16, 2021, the content of which is herein incorporated by reference in its entirety.

FIELD

Embodiments herein relate to systems and methods for utilizing hysteresis as a mechanism of analysis of a sample. In particular, embodiments herein related to systems and methods for utilizing hysteresis as a mechanism for detection of different volatile organic compounds in a sample.

BACKGROUND

Early and accurate detection of diseases can allow clinicians to provide appropriate therapeutic interventions and can lead to better treatment outcomes. Diseases can be detected using many different techniques including analyzing tissue samples, analyzing various bodily fluids, diagnostic scans, genetic sequencing, and the like.

Some disease states result in the production of specific chemical compounds, including volatile organic compounds (VOCs), that can be released into a sample of a patient and that can be hallmarks of certain diseases.

However, characterizing patient samples and/or sensing individual VOCs in complex gaseous samples can be a difficult task when using chemical sensors. Chemical sensors involve intricate environments that can produce multiple response signals produced by the chemical sensors themselves and the binding of particular analytes to the chemical sensors.

SUMMARY

In a first aspect, a system for analyzing a fluid sample is included. The system can include a controller circuit, and a chemical sensor element, where the chemical sensor element can include one or more discrete binding detectors and the one or more discrete binding detectors can include one or more graphene varactors. The system can include measurement circuitry, where the measurement circuitry can include an electrical voltage generator and the electrical voltage generator is configured to generate an applied voltage at a plurality of voltage values to be applied to the one or more graphene varactors. The voltage values can fall within a range from a lower bound to an upper bound. The system can include a measurement circuit can include a capacitance sensor, where the capacitance sensor is configured to measure capacitance of the discrete binding detectors resulting from the applied voltage. The system for analyzing the fluid sample can be configured to measure hysteresis effects related to capacitance versus voltage values obtained from the one or more graphene varactors.

In a second aspect, in addition to one or more of the preceding or following aspects, or in the alternative to some aspects, the applied voltage includes voltage values starting at one of the lower or upper bounds and moving to the other bound as part of a sweep across different voltage values falling within the range from the lower bound to the upper bound.

In a third aspect, in addition to one or more of the preceding or following aspects, or in the alternative to some aspects, the hysteresis effects reflecting differences in measurable values relating to capacitance of the graphene varactors resulting from a sweep in a first direction between the lower bound and upper bound versus a sweep in a second direction between the lower bound and the upper bound, wherein the second direction is opposite the first direction.

In a fourth aspect, in addition to one or more of the preceding or following aspects, or in the alternative to some aspects, the first direction is a sweep from the lower voltage bound to the upper voltage bound and the second direction is a sweep from the upper voltage bound to the lower voltage bound.

In a fifth aspect, in addition to one or more of the preceding or following aspects, or in the alternative to some aspects, the first direction is a sweep from the upper voltage bound to the lower voltage bound and the second direction is a sweep from the lower voltage bound to the upper voltage bound.

In a sixth aspect, in addition to one or more of the preceding or following aspects, or in the alternative to some aspects, the applied voltage can be represented as a sum of an AC voltage component superimposed on a DC bias voltage component.

In a seventh aspect, in addition to one or more of the preceding or following aspects, or in the alternative to some aspects, the AC voltage component includes a sinusoidal waveform, a square waveform, a sawtooth waveform, a ramp waveform, or a triangular waveform.

In an eighth aspect, in addition to one or more of the preceding or following aspects, or in the alternative to some aspects, the AC voltage component has an amplitude of 25 mV to 300 mV.

In a ninth aspect, in addition to one or more of the preceding or following aspects, or in the alternative to some aspects, the DC bias voltage component falls within the range of voltages the lower bound to the upper bound.

In a tenth aspect, in addition to one or more of the preceding or following aspects, or in the alternative to some aspects, where a sweep in the first direction is immediately followed by a sweep in the second direction.

In an eleventh aspect, in addition to one or more of the preceding or following aspects, or in the alternative to some aspects, where a sweep in the first direction is followed by a pause and then sweep in the second direction.

In a twelfth aspect, in addition to one or more of the preceding or following aspects, or in the alternative to some aspects, where the pause is from 1 millisecond to 5 seconds in length.

In a thirteenth aspect, in addition to one or more of the preceding or following aspects, or in the alternative to some aspects, where the lower voltage bound and the upper voltage bound are preset values.

In a fourteenth aspect, in addition to one or more of the preceding or following aspects, or in the alternative to some aspects, where the lower voltage bound and the upper voltage bound are dynamically determined values.

In a fifteenth aspect, in addition to one or more of the preceding or following aspects, or in the alternative to some aspects, where a sweep in the first direction followed by a sweep in the second direction constitutes a hysteresis measurement cycle, wherein the upper voltage bound and the lower voltage bound remain static between successive cycles.

In a sixteenth aspect, in addition to one or more of the preceding or following aspects, or in the alternative to some aspects, where a sweep in the first direction followed by a sweep in the second direction constitutes a hysteresis measurement cycle, wherein the upper voltage bound and the lower voltage bound change between successive cycles.

In a seventeenth aspect, in addition to one or more of the preceding or following aspects, or in the alternative to some aspects, where the hysteresis effects include a change in one or more of capacitance at a particular voltage, a maximum slope of capacitance to voltage, a minimum slope of capacitance to voltage, a minimum capacitance, a voltage at minimum capacitance (Dirac voltage), full/half width at half maximum of a capacitance-voltage curve, area of a capacitance-voltage curve, a difference between maximum capacitance and minimum capacitance, a maximum capacitance, and a ratio of maximum capacitance to minimum capacitance.

In an eighteenth aspect, in addition to one or more of the preceding or following aspects, or in the alternative to some aspects, where the system is configured to characterize a fluid test sample based on determined hysteresis effects.

In a nineteenth aspect, in addition to one or more of the preceding or following aspects, or in the alternative to some aspects, where the system is configured to utilize determined hysteresis effects as a data input in a pattern matching operation, wherein results of the pattern matching operation characterize the fluid test sample and/or a patient providing the fluid test sample.

In a twentieth aspect, in addition to one or more of the preceding or following aspects, or in the alternative to some aspects, where the system is configured to calculate a first Dirac point voltage for a sweep of the discrete binding detectors in the first direction and a second Dirac point voltage for a successive sweep of the discrete binding detectors in the second direction.

In a twenty-first aspect, in addition to one or more of the preceding or following aspects, or in the alternative to some aspects, where the controller circuit is configured to measure a difference between a forward Dirac point voltage and a reverse Dirac point voltage.

In a twenty-second aspect, in addition to one or more of the preceding or following aspects, or in the alternative to some aspects, where the system for measuring analyte presence in a fluid sample is configured to apply a sweep across the range of voltages to multiple discrete binding detectors at the same time.

In a twenty-third aspect, in addition to one or more of the preceding or following aspects, or in the alternative to some aspects, where the controller circuit is configured to calculate a rate of change of measured capacitance over a time period at multiple discrete applied voltages.

In a twenty-fourth aspect, in addition to one or more of the preceding or following aspects, or in the alternative to some aspects, where the controller circuit is configured to calculate an average hysteresis change value of a measured property over a plurality of hysteresis measurement cycles.

In a twenty-fifth aspect, in addition to one or more of the preceding or following aspects, or in the alternative to some aspects, where the chemical sensor element is pretreated under vacuum at a temperature from 50° C. to 150° C. for at least 3 hours.

In a twenty-sixth aspect, in addition to one or more of the preceding or following aspects, or in the alternative to some aspects, where the chemical sensor element is maintained under a controlled gas environment until being exposed to a fluid test sample.

In a twenty-seventh aspect, in addition to one or more of the preceding or following aspects, or in the alternative to some aspects, where the system further can include a flow control valve, wherein the flow control valve controls fluid communication between an upstream flow path and the chemical sensor element.

In a twenty-eighth aspect, in addition to one or more of the preceding or following aspects, or in the alternative to some aspects, where the system is configured to determine an identity of one or more analytes present in a fluid sample by evaluating hysteresis effects on one or more properties of the one or more discrete binding detectors.

In a twenty-ninth aspect, in addition to one or more of the preceding or following aspects, or in the alternative to some aspects, where the system is configured to measure analyte presence in a fluid sample by evaluating hysteresis change in one or more parameters of capacitance-voltage data.

In a thirtieth aspect, in addition to one or more of the preceding or following aspects, or in the alternative to some aspects, where the system further includes a temperature controller configured to control a temperature of the graphene varactors.

In a thirty-first aspect, in addition to one or more of the preceding or following aspects, or in the alternative to some aspects, where the system is configured to expose the graphene varactors to one or more temperature set points for a predetermined time. In a thirty-second aspect, a method for evaluating a fluid sample is included.

The method can include contacting a chemical sensor element including one or more discrete binding detectors with the fluid sample, where each discrete binding detector can include a graphene varactor. The method can include applying a voltage to the graphene varactors as part of a series of hysteresis measurement cycles over a time period, wherein each hysteresis measurement cycle includes applying the voltage to the graphene varactors as part of a sweep across a range of voltages in a first direction and then in a second direction that is opposite the first direction. The method can include measuring capacitance of each of the discrete binding detectors resulting from the applied voltage, and determining hysteresis effects on measured capacitance values over the time period.

In a thirty-third aspect, in addition to one or more of the preceding or following aspects, or in the alternative to some aspects, the method can further include distinguishing a first unique fluid mixture from a second unique fluid mixture based on the measured hysteresis effects exhibited by each of the first and second unique fluid mixtures.

In a thirty-fourth aspect, in addition to one or more of the preceding or following aspects, or in the alternative to some aspects, where applying a voltage includes applying a voltage to the graphene varactors at multiple discrete voltages across a range of voltages by stepping through the range of voltages in increments from 5 mV to 100 mV.

In a thirty-fifth aspect, in addition to one or more of the preceding or following aspects, or in the alternative to some aspects, where the applied voltage can be represented as including an AC excitation component and a DC bias component.

In a thirty-sixth aspect, in addition to one or more of the preceding or following aspects, or in the alternative to some aspects, where the range of voltages for the DC bias component is from −3 V to 3 V.

In a thirty-seventh aspect, in addition to one or more of the preceding or following aspects, or in the alternative to some aspects, where the method can further include characterizing the fluid sample at least in part based on determined hysteresis effects on one or more parameters.

In a thirty-eighth aspect, in addition to one or more of the preceding or following aspects, or in the alternative to some aspects, where the hysteresis effects in one or more parameters can include one or more of a capacitance at a particular voltage, a maximum slope of capacitance to voltage, a minimum slope of capacitance to voltage, a minimum capacitance, a voltage at minimum capacitance (Dirac point), a maximum capacitance, full/half width at half maximum of a capacitance-voltage curve, area of a capacitance-voltage curve, a difference between maximum capacitance and minimum capacitance, and a ratio of maximum capacitance to minimum capacitance.

In a thirty-ninth aspect, in addition to one or more of the preceding or following aspects, or in the alternative to some aspects, where the method can further include identifying a disease state of an individual providing the fluid sample based at least in part on determined hysteresis effects.

In a fortieth aspect, in addition to one or more of the preceding or following aspects, or in the alternative to some aspects, where the method can further include identifying a disease state of an individual by matching data gathered from analyzing the fluid sample, including data regarding hysteresis effects, against predetermined data patterns corresponding to disease states.

In a forty-first aspect, in addition to one or more of the preceding or following aspects, or in the alternative to some aspects, where the method can further include determining one or more parameters of capacitance-voltage data of each of the discrete binding detectors resulting from the applied voltage and, classifying discrete analytes within the fluid sample based on the determined hysteresis effects and the one or more parameters capacitance-voltage data in combination.

In a forty-second aspect, in addition to one or more of the preceding or following aspects, or in the alternative to some aspects, wherein determining the one or more parameters capacitance-voltage data includes determining a forward Dirac point voltage for each of the discrete binding detectors resulting from the applied voltage.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
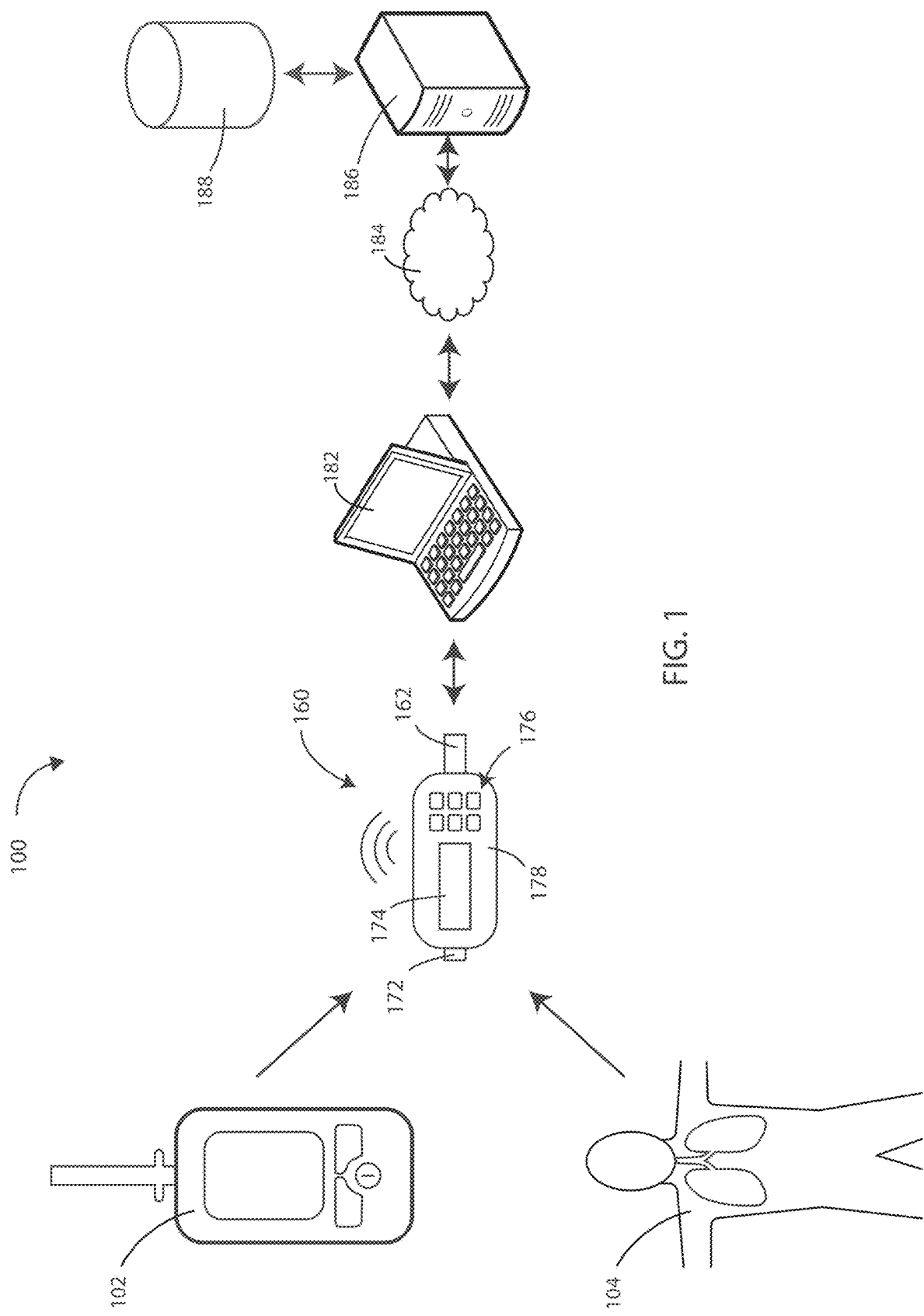
FIG. 1 is a schematic view of various components of a system in accordance with various embodiments herein.

While embodiments are susceptible to various modifications and alternative forms, specifics thereof have been shown by way of example and drawings and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

In embodiments herein chemical sensor elements having one or more discrete binding detectors can be configured to bind one or more analytes, such as volatile organic compounds (VOCs), in a complex sample mixture, such as a gaseous sample mixture. The discrete binding detectors can include graphene-based quantum capacitance varactors ("graphene varactors") that can exhibit a change in capacitance in response to an applied voltage as a result of the presence of one or more analytes, such as volatile organic compounds (VOCs) on a surface of the graphene varactor. In this way, gas samples can be analyzed by contacting them with a graphene varactor-based sensor element, providing a bias voltage, and measuring capacitance or voltage values.

In many cases, the graphene varactor-based sensor elements can be exposed to a range of bias voltages in order to discern features such as the Dirac point (or the bias voltage at which the varactor exhibits the lowest capacitance). The response signal generated by the discrete binding detectors in the presence or absence of one or more analytes can be used to characterize the content of the gaseous mixture. As such, each gaseous mixture can exhibit a unique set of response signals, or "fingerprint," for any given array.

While graphene varactors show high sensitivity toward various analytes and provide the ability to characterize the content of a gaseous mixture, the response signals can also be impacted by hysteresis effects. Broadly, hysteresis is the dependence of the state of a system based on its history. It has been found herein that graphene varactors can exhibit significant hysteresis effects based on previously applied voltages. Hysteresis or hysteretic effects herein can include lags, shifts, or other measurable changes in one or more properties of a graphene varactor and can be influenced by analyte binding, temperature changes, and/or by patterns of applied voltages such as voltage sweeps over various voltage ranges. Without being bound by any particular theory, it is believed that hysteresis has been considered to be a bothersome background noise in various signals caused by the system. However, in this case it is demonstrated that the benefits of measuring hysteresis alone, or in combination with one or more parameters of capacitance-voltage data can offer a distinct advantage for the classification of analytes within a fluid sample.

In accordance with embodiments herein, the hysteresis effects can be a specific characteristic that is useful in characterizing a sample and/or identifying the type and concentration of VOCs present in a sample both independently and in combination with other types of data.

Referring now to FIG. 1, a schematic view of a system 100 for measuring analyte presence in a gaseous sample is shown in accordance with various embodiments herein. The system 100 can include a sensing device 160 that includes a chemical sensor element with a plurality of discrete binding detectors for sensing analytes in a gaseous mixture. The discrete binding detectors can include graphene-based variable capacitors (or graphene varactors), as will be described in more detail in reference to FIGS. 3-5 below. The terms "discrete binding detector" and "graphene varactor" can be used interchangeably herein unless otherwise specified or the context dictates otherwise.

In the embodiment shown in FIG. 1, the sensing device 160 of system 100 is depicted in a hand-held format that can be used in the field, medical clinic, workplace, and the like. It will be appreciated that the system herein can further include a table-top system for use in a medical clinic, hospital, laboratory, etc. However, it will be appreciated that many other formats for the sensing device 160 and system 100 are also contemplated herein.

The sensing device 160 can include a housing 178 and an air intake port 162. In some embodiments, air intake port 162 can be in fluid communication with one or more gas sampling devices 102. In other embodiments, air intake port 162 can be configured as a mouthpiece into which a subject 104 to be evaluated can blow a breath sample. In yet other embodiments, the air intake port 162 can itself act as a gas sampling device. The sensing device 160 can be configured to actively draw a gas into housing 178 or it can be configured to receive a gas passively from a subject 104 or a gas sampling device 102. In some embodiments, the sensing device 160 can include a flow control valve in fluid communication with an upstream flow path relative the chemical sensor element. In various embodiments, the flow control valve can control fluid communication between an upstream flow path and the chemical sensor element.

The sensing device 160 can also include a display screen 174 and a user input device 176, such as a keyboard. The sensing device 160 can also include a gas outflow port 172. Aspects of sensing systems and devices are described in U.S. Patent Application Publication No. 2016/0109440A1, the content of which is herein incorporated by reference. While FIG. 1 shows a sensing device 160 adapted to receive gas from a subject or gas sampling device, it will be appreciated that other types of gas sampling systems can also be used herein. For example, gas sampling devices for use with catheters and endoscopy systems can also be used. An exemplary gas sampling device in the context of a catheter or endoscopy device is described in U.S. Patent Application Publication No. 2017/0360337A1, the content of which is herein incorporated by reference.

In some embodiments, the system 100 can include a local computing device 182 that can include a microprocessor, input and output circuits, input devices, a visual display, a user interface, and the like. In some embodiments, the sensing device 160 can communicate with the local computing device 182 in order to exchange data between the sensing device 160 and the local computing device 182. The local computing device 182 can be configured to perform various processing steps with the data received from the sensing device 160, including, but not limited to, calculating various parameters of the graphene varactors described herein. However, it should be appreciated that in some embodiments the features associated with the local computing device 182 can be integrated into the sensing device 160. In some embodiments, the local computing device 182 can be a laptop computer, a desktop computer, a server (real or virtual), a purpose dedicated computer device, or a portable computing device (including, but not limited to, a mobile phone, tablet, wearable device, etc.). The local computing device 182 and/or the sensing device 160 can communicate with computing devices in remote locations through a data network 184, such as the Internet or another network for the exchange of data as packets, frames, or otherwise.

In some embodiments, the system 100 can also include a computing device such as a server 186 (real or virtual). In some embodiments, the server 186 can be located remotely from the sensing device 160. The server 186 can be in data communication with a database 188. The database 188 can be used to store various subject information, such as that described herein. In some embodiments, the database can specifically include an electronic medical database containing data regarding the health status of a subject, patterns of data associated with various conditions and diseases (such as that generated from machine learning analysis of large sets of subject data), demographic data and the like. In some embodiments, the database 188 and/or server 186, or a combination thereof, can store the data generated by the chemical sensor elements(s) as well as data output generated by machine learning analysis.

Figure 2:
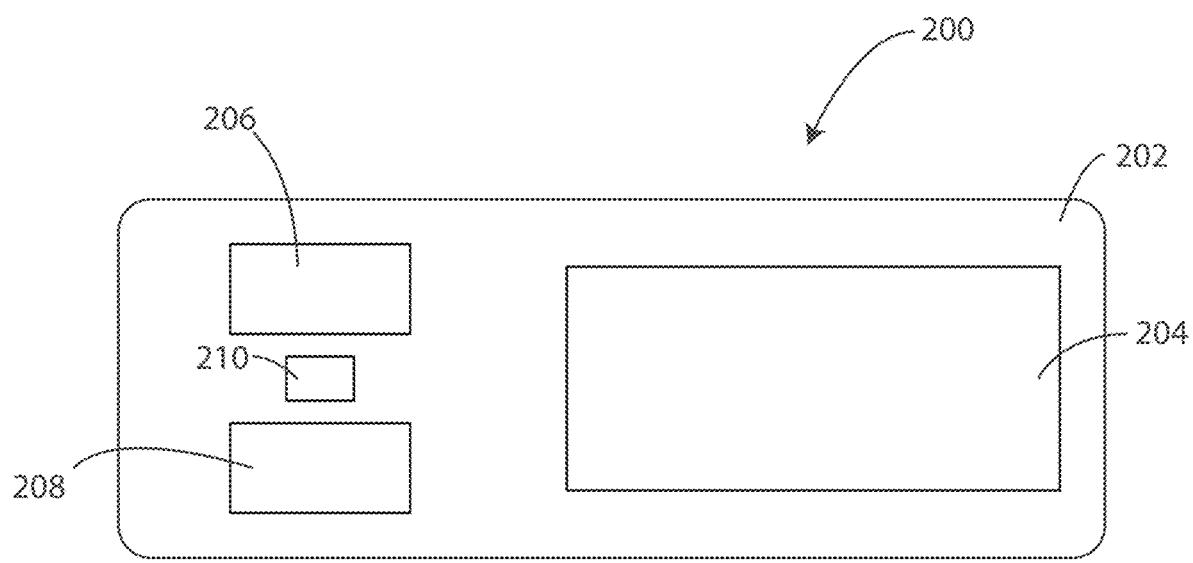
FIG. 2 is a schematic top plan view of a chemical sensor element in accordance with various embodiments herein.

Referring now to FIG. 2, a schematic top plan view of a chemical sensor element 200 is shown in accordance with various embodiments herein. The chemical sensor element 200 can include a substrate 202. It will be appreciated that the substrate can be formed from many different materials, including silicon, glass, quartz, sapphire, polymers, metals, glasses, ceramics, cellulosic materials, composites, metal oxides, and the like. The thickness of the substrate can vary. In some embodiments, the substrate has sufficient structural integrity to be handled without undue flexure that could damage components thereon.

The chemical sensor elements herein can include a first measurement zone 204, and second measurement zone 206, and a third measurement zone 208 that can be disposed on the substrate 202. It will be appreciated that more than three measurement zones can be present on the chemical sensor elements herein. In some embodiments, the first measurement zone 204 can define at least a portion of a first gas flow path. The first measurement zone 204 can include a plurality of discrete binding detectors that can sense analytes in a gaseous sample, such as a breath sample. The second measurement zone 206 can define at least a portion of a second gas flow path. In some embodiments, the second gas flow path can be entirely separate from the first gas flow path, while in other embodiments the second gas flow path can include a portion of the first gas flow path.

The second measurement zone 206 can also include a plurality of discrete binding detectors. The chemical sensor element can include a component 210 to store reference data. The component 210 to store reference data can be an electronic data storage device, an optical data storage device, a printed data storage device (such as a printed code), or the like. The chemical sensor elements described herein can be as described in more detail in U.S. Publ. No. U.S. 2016/0109440 A1, which is herein incorporated by reference in its entirety.

Figure 3:
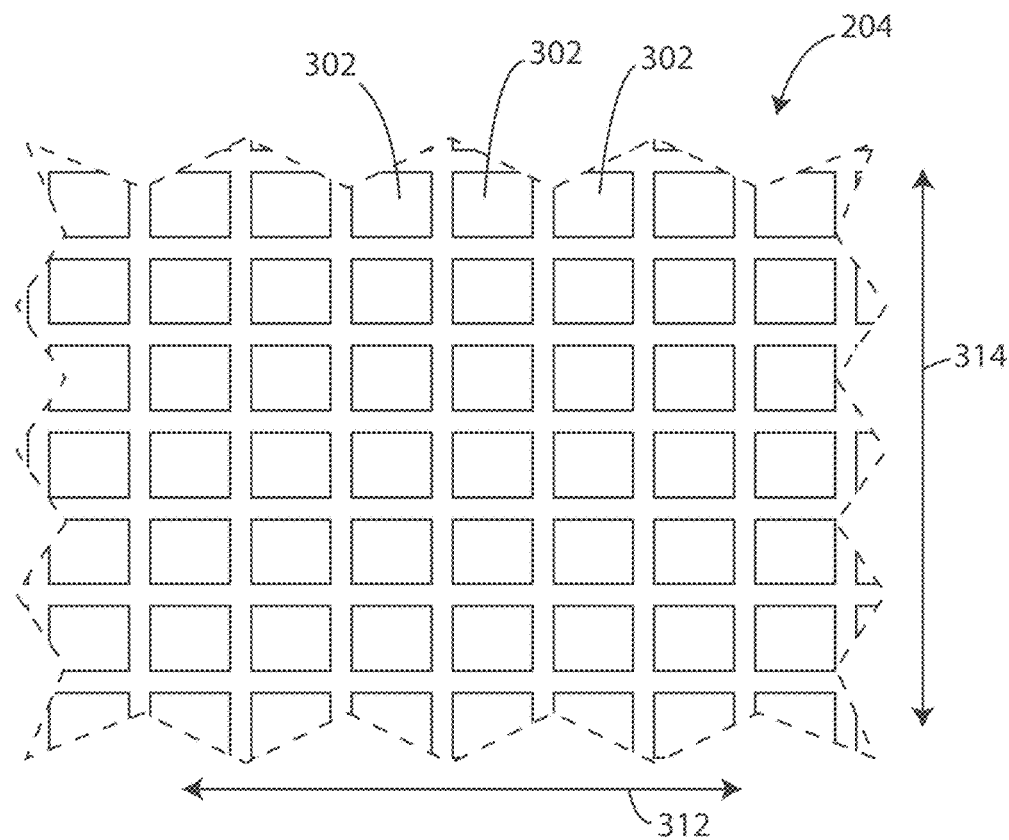
FIG. 3 is a schematic diagram of a portion of a measurement zone in accordance with various embodiments herein.

Each chemical sensor element herein can include one or more discrete binding detectors in an array throughout the measurement zones. Referring now to FIG. 3, a schematic diagram of a portion of a chemical sensor element is shown in accordance with various embodiments herein. A plurality of graphene varactors 302 can be disposed on the first measurement zone 204 in an array within the measurement zones. In some embodiments, a chemical sensor element can include a plurality of graphene varactors configured in an array. In some embodiments, the plurality of graphene varactors can include identical surface chemistries, while in other embodiments the plurality of graphene varactors can include different surface chemistries from one another. In some embodiments, graphene varactors having the same surface chemistries can be present in duplicate, triplicate, or more, such that data obtained during hysteresis measurement cycles can be averaged together to further refine the change observed in the response signals. The graphene varactors herein can be as described in more detail in U.S. Pat. No. 9,513,244, which is herein incorporated by reference in its entirety. It will be appreciated that any of the first measurement zone, the second measurement zone, the third measurement zone, and the like can include one or more arrays of a plurality of graphene varactors as described herein.

In some embodiments, the graphene varactors can be heterogeneous in that they are different (in groups or as individual graphene varactors) from one another in terms of their binding behavior or specificity with regard a particular analyte. In some embodiments, some graphene varactors can be duplicated, triplicated, or more, for validation purposes but are otherwise heterogeneous from other graphene varactors. Yet in other embodiments, the graphene varactors can be homogeneous. While the graphene varactors 302 of FIG. 3 are shown as boxes organized into a grid, it will be appreciated that the graphene varactors can take on many different shapes (including, but not limited to, various polygons, circles, ovals, irregular shapes, and the like) and, in turn, the groups of graphene varactors can be arranged into many different patterns (including, but not limited to, star patterns, zig-zag patterns, radial patterns, symbolic patterns, and the like).

In some embodiments, the order of specific graphene varactors 302 across a length 312 and width 314 of the measurement zone can be substantially random. In other embodiments, the order can be specific. For example, in some embodiments, a measurement zone can be ordered so that the specific graphene varactors 302 configured to bind to analytes having a lower molecular weight are located farther away from the incoming gas flow relative to specific graphene varactors 302 configured to bind to analytes having a higher molecular weight which are located closer to the incoming gas flow. As such, chromatographic effects which may serve to provide separation between chemical compounds of different molecular weight can be taken advantage of to provide for optimal binding of chemical compounds to corresponding graphene varactors.

The number of graphene varactors can be from about 1 to about 100,000. In some embodiments, the number of graphene varactors can be from about 1 to about 10,000. In some embodiments, the number of graphene varactors can be from about 1 to about 1,000. In some embodiments, the number of graphene varactors can be from about 2 to about 500. In some embodiments, the number of graphene varactors can be from about 10 to about 500. In some embodiments, the number of graphene varactors can be from about 50 to about 500. In some embodiments, the number of graphene varactors can be from about 1 to about 250. In some embodiments, the number of graphene varactors can be from about 1 to about 50.

In some embodiments, each of the graphene varactors suitable for use herein can include at least a portion of one or more electrical circuits. By way of example, in some embodiments, each of the graphene varactors can include all or a portion of one or more passive electrical circuits or active electrical circuits. In some embodiments, the graphene varactors herein can include two-terminal graphene varactors. In some embodiments, the two-terminal graphene varactors can be adapted to each receive independent signals from an electrical signal generator. In some embodiments, the graphene varactors can be formed such that they are integrated directly on an electronic circuit. In some embodiments, the graphene varactors can be formed such that they are wafer bonded to the circuit. In some embodiments, the graphene varactors can include integrated readout electronics, such as a readout integrated circuit (ROIC). The electrical properties of the electrical circuit, including resistance or capacitance, can change upon binding, such as specific and/or non-specific binding, with a compound from a biological sample. Many different types of circuits can be used to gather data from chemical sensor elements and will be discussed below in reference to FIGS. 9 and 10.

Figure 4:
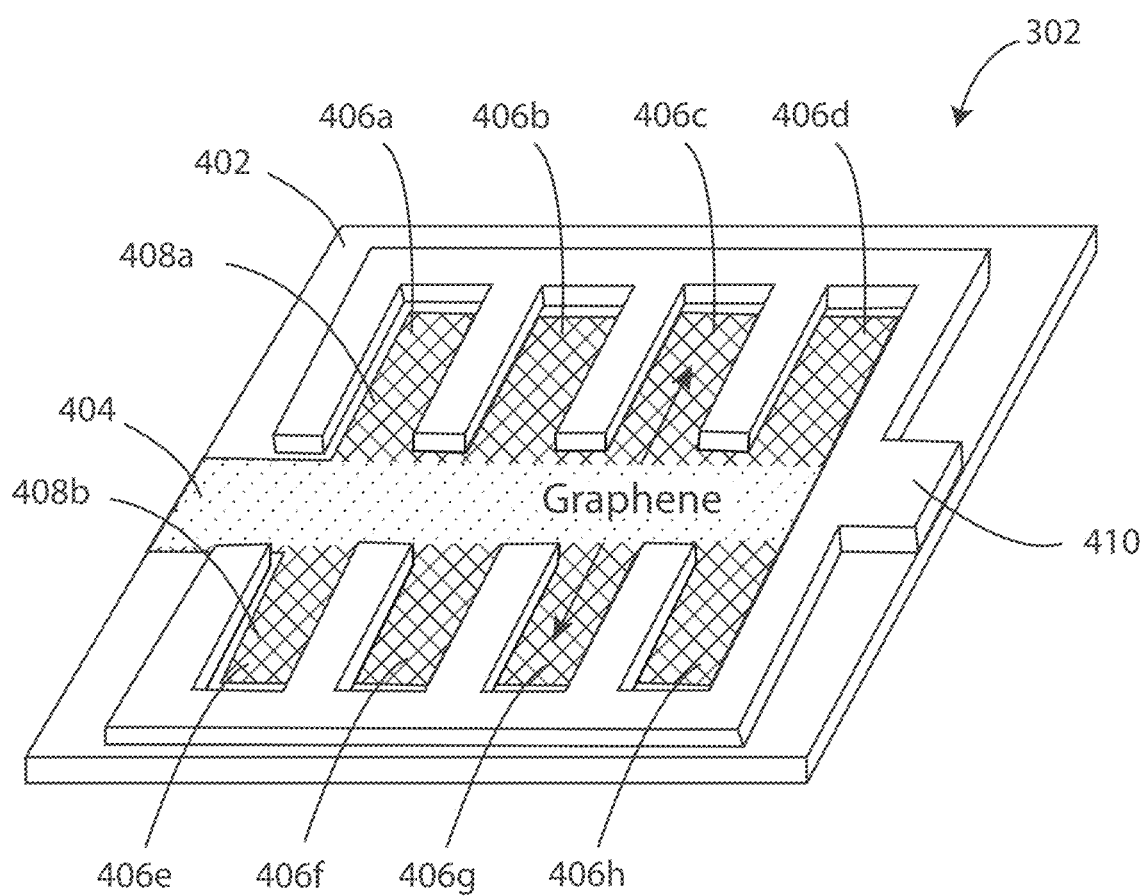
FIG. 4 is a schematic perspective view of a graphene varactor in accordance with various embodiments herein.

Referring now to FIG. 4, a schematic view of a graphene varactor 302 having two terminals is shown in accordance with the embodiments herein. It will be appreciated that graphene varactors can be prepared in various ways with various geometries, and that the graphene varactor shown in FIG. 4 is just one example in accordance with the embodiments herein.

Graphene varactor 302 can include an insulator layer 402, a gate electrode 404 (or "gate contact"), a dielectric layer (item 504 in FIG. 5), one or more graphene layers, such as graphene layers 408a and 408b, and a contact electrode 410 (or "graphene contact"). In some embodiments, the graphene layer(s) 408a-b can be contiguous, while in other embodiments the graphene layer(s) 408a-b can be non-contiguous. Gate electrode 404 can be deposited within one or more depressions formed in insulator layer 402. Insulator layer 402 can be formed from an insulative material such as silicon dioxide, formed on a substrate (item 502 in FIG. 5), such as a silicon substrate (wafer), and the like. Gate electrode 404 can be formed by an electrically conductive material such as chromium, copper, gold, silver, tungsten, aluminum, titanium, palladium, platinum, iridium, and any combinations or alloys thereof, which can be deposited on top of or embedded within the insulator layer 402. The dielectric layer (not shown in FIG. 4) can be disposed on a surface of the insulator layer 402 and the gate electrode 404, as shown in more detail in FIG. 5. The graphene layer(s) 408a-b can be disposed on the dielectric layer.

Graphene varactor 302 includes eight gate electrode fingers 406a-406h. It will be appreciated that while graphene varactor 302 shows eight gate electrode fingers 406a-406h, any number of gate electrode finger configurations can be contemplated. In some embodiments, an individual graphene varactor can include fewer than eight gate electrode fingers. In some embodiments, an individual graphene varactor can include more than eight gate electrode fingers. In other embodiments, an individual graphene varactor can include two gate electrode fingers. In some embodiments, an individual graphene varactor can include 1, 2, 3, 4, 5, 6, 7, 8, 9, 10, or more gate electrode fingers.

Graphene varactor 302 can include one or more contact electrodes 410 disposed on portions of the graphene layers 408a and 408b. Contact electrode 410 can be formed from an electrically conductive material such as chromium, copper, gold, silver, tungsten, aluminum, titanium, palladium, platinum, iridium, and any combinations or alloys thereof. Further aspects of exemplary graphene varactors can be found in U.S. Pat. No. 9,513,244, the content of which is herein incorporated by reference in its entirety.

Figure 5:
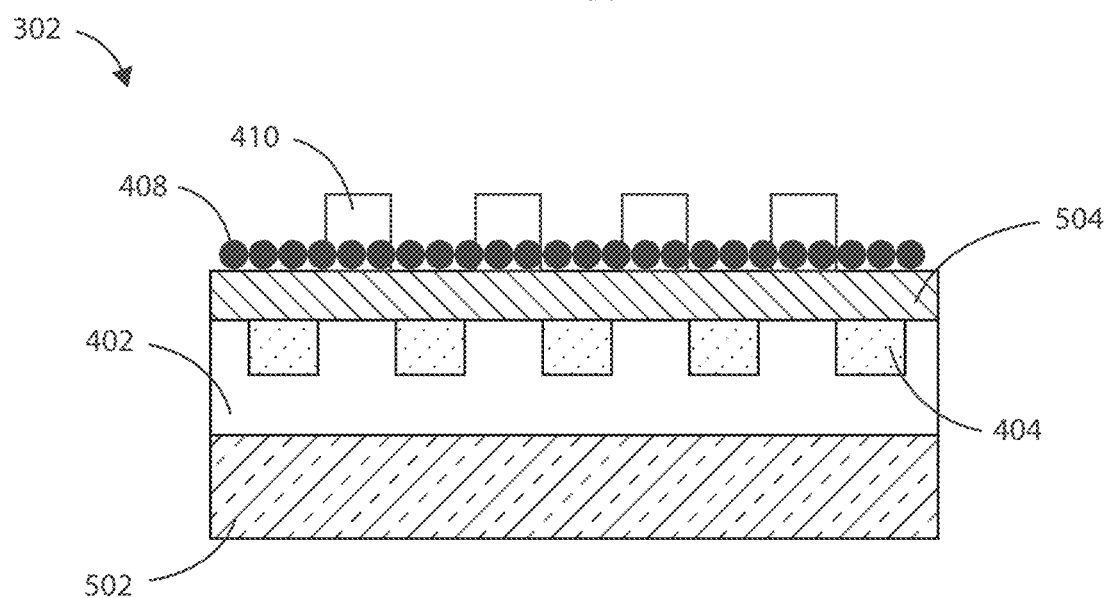
FIG. 5 is a schematic cross-sectional view of a portion of a graphene varactor in accordance with various embodiments herein.

Referring now to FIG. 5, a schematic diagram of a portion of a cross-sectional view of an exemplary graphene varactor is shown in accordance with various embodiments herein. The graphene varactor can include a substrate 502, such as a silicon substrate (wafer). An insulator layer 402 can be disposed on the substrate 502, and a gate electrode 404 can be recessed into the insulator layer 402. The gate electrode 404 can be formed by depositing an electrically conductive material in the depression in the insulator layer 402, as discussed above in reference to FIG. 4. A dielectric layer 504 can be formed on a surface of the insulator layer 402 and the gate electrode 404. In some examples, the dielectric layer 504 can be formed of a material, such as, silicon dioxide, aluminum oxide, hafnium dioxide, zirconium dioxide, hafnium silicate, or zirconium silicate. The graphene layer 408 is disposed on the dielectric layer 504 and the contact electrode 410 can be disposed in contact with the graphene layer 408. In some examples, the dielectric layer 504 can include multiple layers of the dielectric materials listed herein. In some embodiments, the dielectric layer 504 can include alternating layers of different dielectric materials. In some embodiments, the dielectric layer 504 can include alternating layers of aluminum oxide and hafnium dioxide.

In some embodiments herein, to maintain the stability of the graphene varactors herein, the chemical sensor elements can be pretreated under a vacuum at a temperature from 50° C. to 150° C. for at least 3 hours. In various embodiments, the chemical sensor elements can be pretreated under vacuum at a temperature from 120° C. to 150° C. for 10 to 20 hours. In various embodiments, the chemical sensor elements can be pretreated under a vacuum at a temperature can be greater than or equal to 50° C., 60° C., 70° C., 80°

C., 90° C., 100° C., 110° C., 120° C., 130° C., 140° C., 150° C., 160° C., 170° C., 180° C., 190° C., or 200° C., or can be an amount falling within a range between any of the foregoing. It will be appreciated that in some embodiments, one or more hysteresis effects can be temperature dependent. In some embodiments, the graphene varactors described herein can be held at a constant temperature for a constant period of time to reduce the impact that a change in temperature has on the one or more hysteresis effects.

In addition, the chemical sensor elements herein can be maintained under a controlled gas environment until it is exposed to a gaseous test sample. By way of example, the chemical sensor element can be maintained under a controlled gas environment including oxygen gas, nitrogen gas or an inert gas such as, for example, argon, helium, xenon, krypton, or neon.

Without wishing to be bound by any particular theory, it is believed that the graphene varactors herein exhibit hysteresis effects in one or more measurable parameters such as the capacitance versus voltage values as influenced by various factors. The factors that can contribute to measurable hysteresis effects can include a change in the voltage scan rate and/or range of a voltage sweep applied to the graphene varactors, the binding of an analyte to the graphene varactors, a change in the temperature applied to the graphene varactors, a change in the background and/or baseline gas environment, a change in the total number of voltage sweeps during a measurement, surface chemistries on graphene, composition/configuration of the dielectric layer, surface chemistries on the dielectric layer, or a combination of any of these factors. In some embodiments, one or more of these factors can be manipulated in order to enhance sensed hysteresis effects. For example, in some embodiments, the voltage scan rate, the speed of a voltage sweep, the range of a voltage sweep, and/or the temperature of the graphene varactor, as well as other factors can be manipulated or otherwise controlled in order to enhance sensed hysteresis effects.

In various embodiments, the system herein can be configured to measure one or more hysteresis effects on the properties of the system including changes in measured values between a sweep in the first direction (such as low to high applied voltages or high to low applied voltages) and a successive sweep in the second direction which can be a direction that is opposite the first direction. Some of the hysteresis effects determined in the system can include hysteresis in one or more of the following parameters: a capacitance at a particular voltage, a maximum slope of capacitance to voltage, a minimum slope of capacitance to voltage, a minimum capacitance, a voltage at minimum capacitance (Dirac voltage), a forward Dirac voltage, a reverse Dirac voltage, a maximum capacitance, full/half width at half maximum of a capacitance-voltage curve, area of a capacitance-voltage curve, a difference between maximum capacitance and minimum capacitance, and a ratio of maximum capacitance to minimum capacitance.

The system herein can be configured to characterize a test sample, such as a fluid test sample, based on the determined hysteresis effects. The fluid test sample can include, but not be limited to a liquid sample and a gaseous sample. The fluid test sample can include a liquid sample and a gaseous sample from a human body. It will be appreciated that the term "fluid test sample" and "fluid sample" can be used interchangeably. In various embodiments, the system can be configured to utilize the determined hysteresis effects as a data input in a pattern matching operation, wherein the results of the pattern matching operation characterizes the fluid test sample and/or a patient providing the fluid test sample. In various embodiments, the system can determine the identity of one or more analytes present in a gaseous sample by determining the hysteresis effects on one or more properties of the one or more discrete binding detectors. Hysteresis effects described herein are referred to in more detail below.

A change in the parameters of the capacitance versus voltage values of the graphene varactors can be measured by delivering an applied voltage over a range of voltages to the graphene varactors, the range of voltages starting at one bound and moving to the other bound as part of a sweep across the voltages. Moving from one bound to the other bound can include moving continuously or in multiple discrete steps as part of a sweep across the voltages. By way of example, measuring a response can include measuring differences in various parameters of the resulting capacitance versus voltage values of a capacitance-voltage (i.e., $C-V_g$; where $V_g$ is a gate voltage applied to the graphene varactor) curve as will be discussed in more detail with reference to FIGS. 6-8. In various embodiments, measuring analyte presence in a gaseous sample can include measuring a response in a resulting capacitance versus voltage curve. In other embodiments, measuring analyte presence in a fluid sample can include evaluating a hysteresis change in one or more parameters of capacitance-voltage data.

Figure 6:
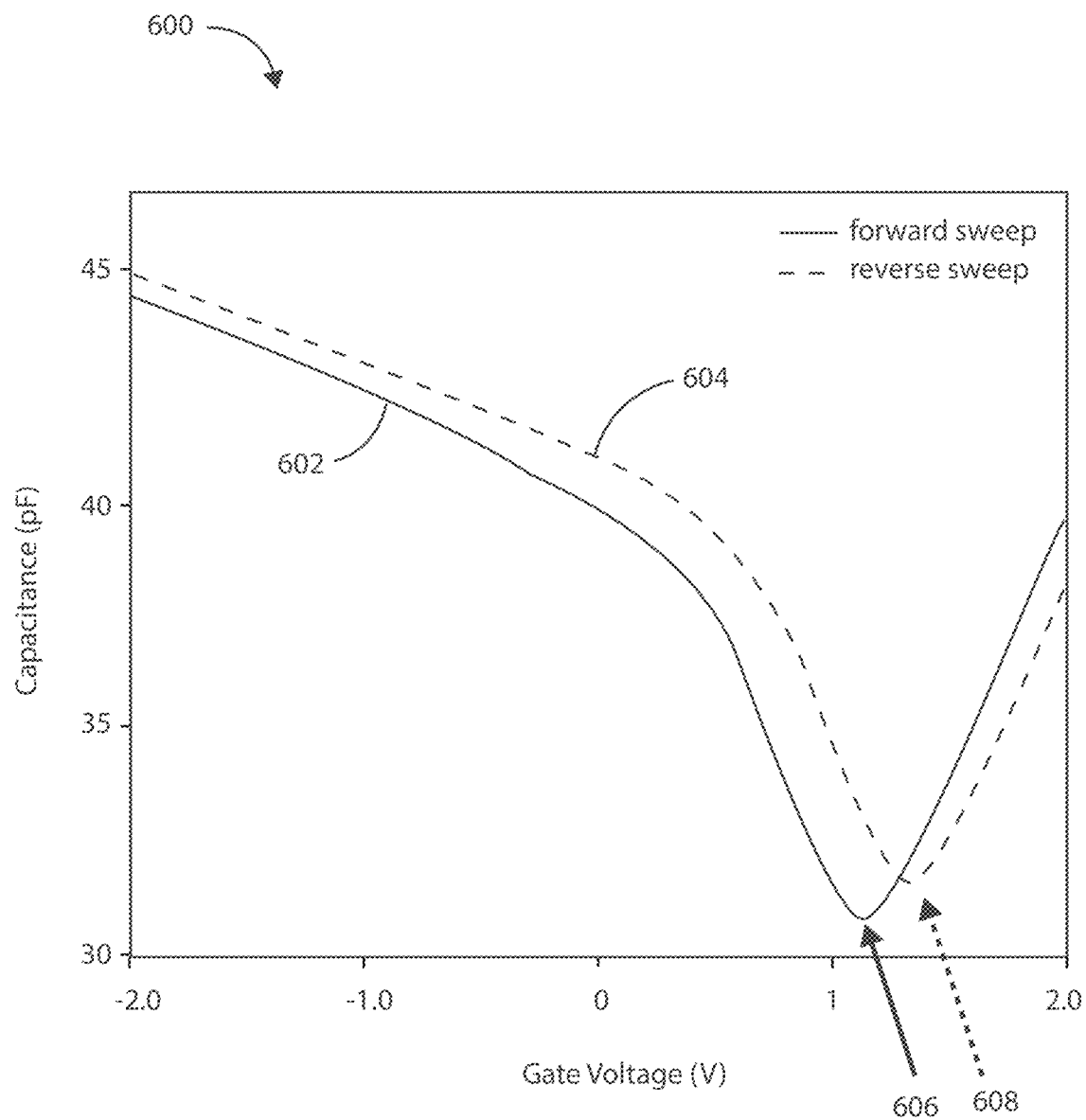
FIG. 6 is a graph showing capacitance versus gate voltage for a graphene varactor in accordance with various embodiments herein.

Various voltage sweeps of the graphene varactors described herein can be used to determine a hysteresis effect influenced by a change in the voltage scan rate and/or range of a voltage sweep applied to the graphene varactors. Referring now to FIG. 6, an exemplary plot 600 of capacitance versus voltage (i.e., $C-V_g$) is shown in accordance with various embodiments herein. Plot 600 can include a forward sweep $C-V_g$ curve 602 and a reverse sweep $C-V_g$ curve 604, where the sweeping range includes a range of voltages from −2.0 V to 2.0 V. Additional values for sweeping ranges and sweeping times are discussed in more detail below. In the example plot 600, the gate voltages can be swept across the range of voltages in either direction between each bound, as described elsewhere herein. In the forward sweep $C-V_g$ curve 602, the capacitance of a varactor reaches a minimum capacitance, $C_{min}$, at the forward Dirac voltage 606 (i.e., $V_{DF}$, or the voltage at which the varactor exhibits the lowest capacitance during the forward sweep). In the reverse sweep $C-V_g$ curve 604, the capacitance of a varactor reaches a minimum capacitance, $C_{min}$, at the reverse Dirac voltage 608 (i.e., $V_{DR}$, or the voltage at which the varactor exhibits the lowest capacitance during the forward sweep). The difference between the value for $V_{DF}$ and $V_{DR}$ can be characteristic of the sample being analyzed. For example, the difference between the value for $V_{DF}$ and $V_{DR}$ can be dependent on the concentration of certain analytes and on analyte type. The difference between the value for $V_{DF}$ and $V_{DR}$ can also be dependent on the range of the voltage sweep, the voltage scan rate, the temperature applied to the graphene varactor and other factors. The difference between value for $V_{DF}$ and $V_{DR}$ is merely one example of a hysteresis effect herein.

It will be appreciated that the hysteresis effects can be affected by a voltage sweep applied to the graphene varactors. In some embodiments, a larger sweeping window between voltage bounds can be used to increase the magnitude of one or more hysteresis effects. In some embodiments, a smaller sweeping window between voltage bounds can be used to decrease the magnitude of one or more hysteresis effects. In other embodiments, a slower sweep between voltage bounds can reduce an amount of a drift present in one or more hysteresis effects.

Figure 7:
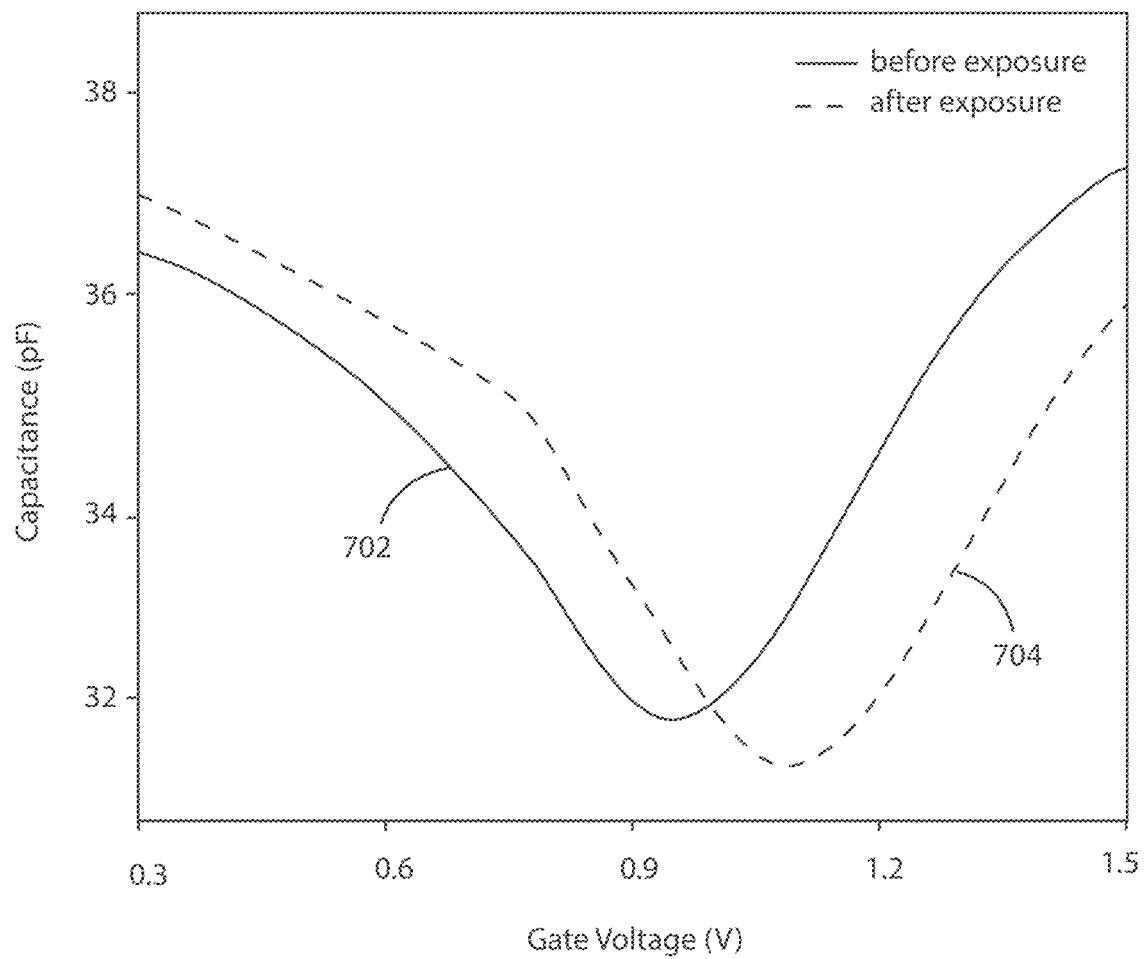
FIG. 7 is a graph showing capacitance versus gate voltage for a graphene varactor in accordance with various embodiments herein.

The data gathered from voltage sweeps of the graphene varactors described herein can be used to characterize a sample and/or determine concentration of an analyte and to differentiate between analyte types in a sample. Referring now to FIG. 7, response signals for an individual graphene varactor before and after exposure to an exemplary gaseous mixture are shown on a plot of capacitance versus gate voltage in accordance with various embodiments herein. The response signal for the graphene varactor before exposure to a gaseous mixture is shown in $C-V_g$ curve 702. The response signal for the same graphene varactor after exposure to a gaseous mixture is shown in $C-V_g$ curve 704. Response signals, such the capacitance versus voltage curve shown in FIG. 7, can be established by measuring capacitance over a range of voltages, both before and after exposing a graphene varactor to a gaseous mixture.

Figure 8:
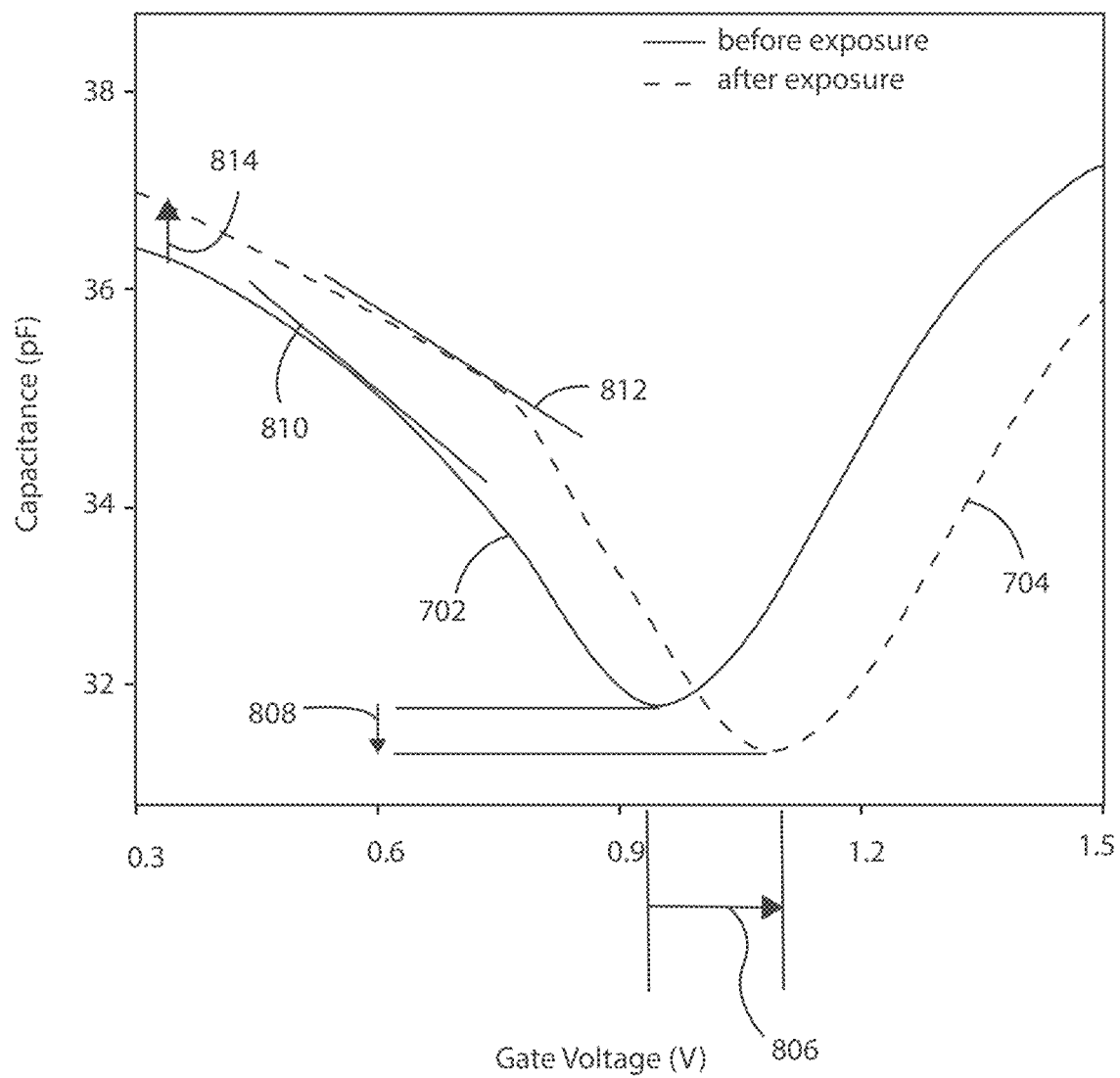
FIG. 8 is a graph showing capacitance versus gate voltage for a graphene varactor in accordance with various embodiments herein.

As analytes within the sample mixture are sensed by the graphene varactors upon binding, several different parameters of the graphene varactor response signal can change from a baseline value to a higher or a lower value, and the shape of the response signal can change, both due to the interaction between the graphene and the analyte and the hysteresis introduced into the system by previously applied voltages as influenced by the specific analyte or conditions. Referring now to FIG. 8, the same response signals for an individual graphene varactor before and after exposure to a gaseous mixture are shown that were shown in FIG. 7, but with various annotations provided to highlight the change in the different parameters of the graphene varactor response signal that can be analyzed to characterize the content of a gaseous mixture. By way of example, these different parameters can include, but are not to be limited to, a shift in the Dirac voltage (i.e., the voltage when the capacitance of a graphene varactor is at a minimum), a change in the minimum capacitance of the graphene varactor, a change in the slope of the response signal, or the change in the maximum capacitance of the graphene varactor, change in capacitance at a particular bias voltage, or the like (other examples of parameters are described below). It will be appreciated that one or more hysteresis effects are affected by the baseline hysteresis of the graphene varactor itself. In some embodiments, one or more hysteresis effects can be a function of the starting baseline hysteresis of each graphene varactor in the system. A baseline hysteresis can be measured in a controlled gas environment. It will be further appreciated that in various embodiments, a sweeping range can be delayed until all of the graphene varactors are in the presence of a gaseous sample of interest (e.g., a breath sample from the alveoli of the lungs) to allow the graphene varactors to equilibrate in the gaseous sample of interest before the graphene varactors respond to undesired gaseous samples (e.g., a breath sample from the mouth).

In FIG. 8, the response signal for the graphene varactor before exposure to a gaseous mixture is shown as $C-V_g$ curve 702, while the response signal for the same graphene varactor after exposure to a gaseous mixture is shown as $C-V_g$ curve 704. The shift in the Dirac voltage before and after exposure is indicated as arrow 806. The change in the minimum capacitance of the graphene varactor before and after exposure is indicated as arrow 808. The change in the slope of the response signal can be obtained by comparison of the slope 810 of $C-V_g$ curve 702 for the graphene varactor before exposure to a gaseous mixture with the slope 812 of $C-V_g$ curve 704 for the graphene varactor after exposure to a gaseous mixture. The change in the maximum capacitance of the graphene varactor is indicated as arrow 814.

In some embodiments, a ratio of the maximum capacitance to minimum capacitance can be used to characterize the content of a gaseous mixture. In some embodiments, a ratio of the maximum capacitance to the shift in the Dirac point can be used to characterize the content of a gaseous mixture. In other embodiments, a ratio of the minimum capacitance to the shift in the slope of the response signal can be used to characterize the content of a gaseous mixture. In some embodiments, a ratio of any of the parameters including a shift in the Dirac point, a change in the minimum capacitance, a change in the slope of the response signal, or the change in the maximum capacitance can be used to characterize the content of a sample mixture. In accordance with embodiments herein, hysteresis effects observed with respect to any of these values (as well as other types of values discussed) can be used to characterize the content of sample mixtures.

In many cases, each graphene varactor can be interrogated using a number of different applied voltages (a plurality of voltages) with the resulting data forming a $C-V_g$ curve. The plurality of voltages can fall within a range from a lower voltage bound to an upper voltage bound. To observe hysteresis effects, in many cases the voltages may start at the lower bound and then be increased progressing up to the upper bound, thus sweeping across the range in a first direction followed by a sweep in the opposite (or second) direction (e.g., from the upper bound to the lower bound). Thus, in various embodiments, a first direction can include a sweep from the lower voltage bound to the upper voltage bound and a second direction is a sweep from the upper voltage bound to the lower voltage bound. However, in other embodiments, the first direction can include a sweep from the upper voltage bound to the lower voltage bound and the second direction is a sweep from the lower voltage bound to the upper voltage bound. In various embodiments, a sweep in the first direction followed by a sweep in the second direction constitutes a hysteresis measurement cycle.

The values for the lower voltage bound and the upper voltage bounds can be predetermined or can be determined dynamically. In various embodiments, the lower voltage bound and the upper voltage bound are preset values and can be selected from values such as $-3.0$ V or less, $-2.9$ V, $-2.8$ V, $-2.7$ V, $-2.6$ V, $-2.5$ V, $-2.4$ V, $-2.3$ V, $-2.2$ V, $-2.1$ V, $-2.0$ V, $-1.9$ V, $-1.8$ V, $-1.7$ V, $-1.6$ V, $-1.5$ V, $-1.4$ V, $-1.3$ V, $-1.2$ V, $-1.1$ V, $-1.0$ V, $-0.9$ V, $-0.8$ V, $-0.7$ V, $-0.6$ V, $-0.5$ V, $-0.4$ V, $-0.3$ V, $-0.2$ V, $-0.1$ V, 0 V, 0.1 V, 0.2 V, 0.3 V, 0.4 V, 0.5 V, 0.6 V, 0.7 V, 0.8 V, 0.9 V, 1.0 V, 1.1 V, 1.2 V, 1.3 V, 1.4 V, 1.5 V, 1.6 V, 1.7 V, 1.8 V, 1.9 V, 2.0 V, 2.1 V, 2.2 V, 2.3 V, 2.4 V. 2.5 V, 2.6 V, 2.7 V, 2.8 V, 2.9 V, or 3.0 V or more, or a voltage value falling between any of the foregoing values. In various embodiments, the lower voltage bound and the upper voltage bound are preset values and can be selected from values ranging from $-5$ V to 5 V; from $-4$ V to 4 V; from $-3$ V to 3 V; from $-2$ V to 2 V; from $-1.5$ V to 1.5V; or from $-1$ V to 1 V.

While an instantaneous applied voltage herein can be thought of as the sum of a DC bias component and an AC component, it will be appreciated that specific applied voltages values as referenced herein typically represent the DC voltage bias or offset value. This is because the average value of an AC component over a non-instantaneous time period will be zero. As such, unless otherwise stated to the contrary or the context dictates otherwise, voltage value references herein shall refer to the DC bias or offset component of an applied voltage, understanding that corresponding instantaneous voltage values can vary based on the AC component. The waveforms of the AC component can take many different forms. For example, they can be sinusoidal, square, triangular, trapezoidal, ramped, sawtooth, complex, or the like.

In some embodiments, the lower voltage bound and the upper voltage bound are dynamically determined values. For example, the bounds can be changed based on previously applied excitation voltages and/or previously observed values related to the graphene sensor and/or previously observed hysteresis effects.

In some embodiments the upper voltage bound and the lower voltage bound is static between successive hysteresis measurement cycles. In other embodiments, the upper voltage bound and the lower voltage bound may change between successive hysteresis measurement cycles. For example, in some embodiments, the first hysteresis measurement cycle can include the use of the widest range of excitation voltages and successive hysteresis measurement cycles may utilize a narrower range of excitation voltages.

Various timing schemes can be used for the sweep across a range of voltages. In some embodiments, a sweep in the first direction can be immediately followed by a sweep in the second direction. In other embodiments, a sweep in the first direction can be followed by a pause and then a sweep in the second direction. The duration of a pause between sweeps can include those from 1 millisecond (ms) to 5 seconds in length. In some embodiments, the duration of the pause between sweeps can be greater than or equal to, 10 ms, 20 ms, 30 ms, 40 ms, 50 ms, 60 ms, 70 ms, 80 ms, 90 ms, 100 ms, 200 ms, 300 ms, 400 ms, 500 ms, 600 ms, 700 ms, 800 ms, 900 ms, or 1 sec, 2 sec, 3 sec, 4 sec, or 5 sec, or can be an amount falling within a range between any of the foregoing.

In some embodiments, the duration of a pause between sweeps can be greater than 5 seconds in length. In various embodiments, the duration of a pause between sweeps can greater than or equal to 6 sec, 7 sec, 8 sec, 9 sec, 10 sec, 11 sec, 12 sec, 13 sec, 14 sec, 15 sec, 16 sec, 17 sec, 18 sec, 19 sec, 20 sec, 21 sec, 22 sec, 23 sec, 24 sec, 25 sec, 26 sec, 27 sec, 28 sec, 29 sec, 30 sec, 31 sec, 32 sec, 33 sec, 34 sec, 35 sec, 36 sec, 37 sec, 38 sec, 39 sec, 40 sec, 41 sec, 42 sec, 43 sec, 44 sec, 45 sec, 46 sec, 47 sec, 48 sec, 49 sec, 50 sec, 51 sec, 52 sec, 53 sec, 54 sec, 55 sec, 56 sec, 57 sec, 58 sec, 59 sec, or 60 sec, or can be an amount falling within a range between any of the foregoing. In other embodiments, the duration of a pause between sweeps can be greater than 1 minute.

A change in any one of the parameters of the capacitance versus voltage values provides data that can reflect the binding status of analytes to the graphene varactor(s), and can be used to characterize a sample and/or distinguish various analytes and analyte concentrations in the sample. Various measurement circuitry (discussed in reference to FIGS. 9 and 10) can be used to measure the changes in the parameters of the capacitance-voltage curve of the graphene varactor(s).

Figure 9:
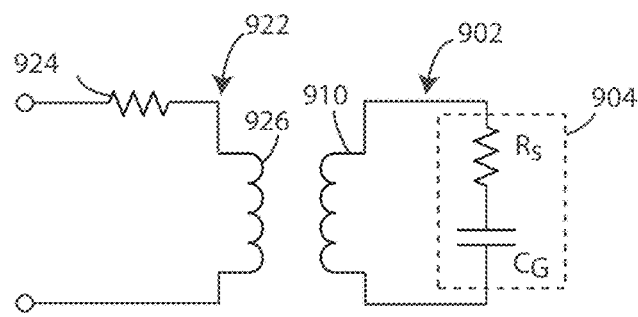
FIG. 9 is a schematic diagram of a passive sensor circuit and a portion of a reading circuit in accordance with various embodiments herein.

Measurement circuitry suitable for use herein can include active and passive sensing circuits. Such circuitry can implement wired (direct electrical contact) or wireless sensing techniques. Referring now to FIG. 9, a schematic diagram of a passive sensor circuit 902 and a portion of a reading circuit 922 is shown in accordance with various aspects herein. In some embodiments, the passive sensor circuit 902 can include a metal-oxide-graphene varactor 904 (wherein RS represents the series resistance and CG represents the varactor capacitor) coupled to an inductor 910. In some embodiments, the reading circuit 922 can include a reading coil having a resistance 924 and an inductance 926.

Measurement circuitry herein can also include active sensing circuits. In various embodiments, the measurement circuitry can include an electrical signal generator configured to generate a series of hysteresis measurement cycles over a time period. The measurement circuitry can include an electrical signal generator configured to generate and deliver an applied voltage that can be represented as an alternating voltage (or excitation voltage) superimposed on a bias voltage. It will be appreciated that there are many ways to generate such an applied voltage.

In some embodiments, measurement circuitry can include an electrical signal generator configured to generate and deliver an applied voltage that includes a sinusoidal, square, triangular, trapezoidal, ramped, sawtooth, or complex waveform alternating voltage superimposed on a bias voltage. In some embodiments, the electrical signal generator can be configured to generate an applied voltage at a plurality of voltages to be applied to the one or more graphene varactors, the voltages falling within a range from a lower voltage bound and an upper voltage bound, the voltages starting at one bound and moving to the other bound as part of a sweep across the voltages. In some embodiments, the electrical signal generator can be configured to generate an excitation current at a plurality of voltages to be applied to the one or more graphene varactors, the voltages falling within a range from a lower bound and an upper bound, the voltages starting at one bound and moving to the other bound as part of a sweep across the voltages.

Figure 10:
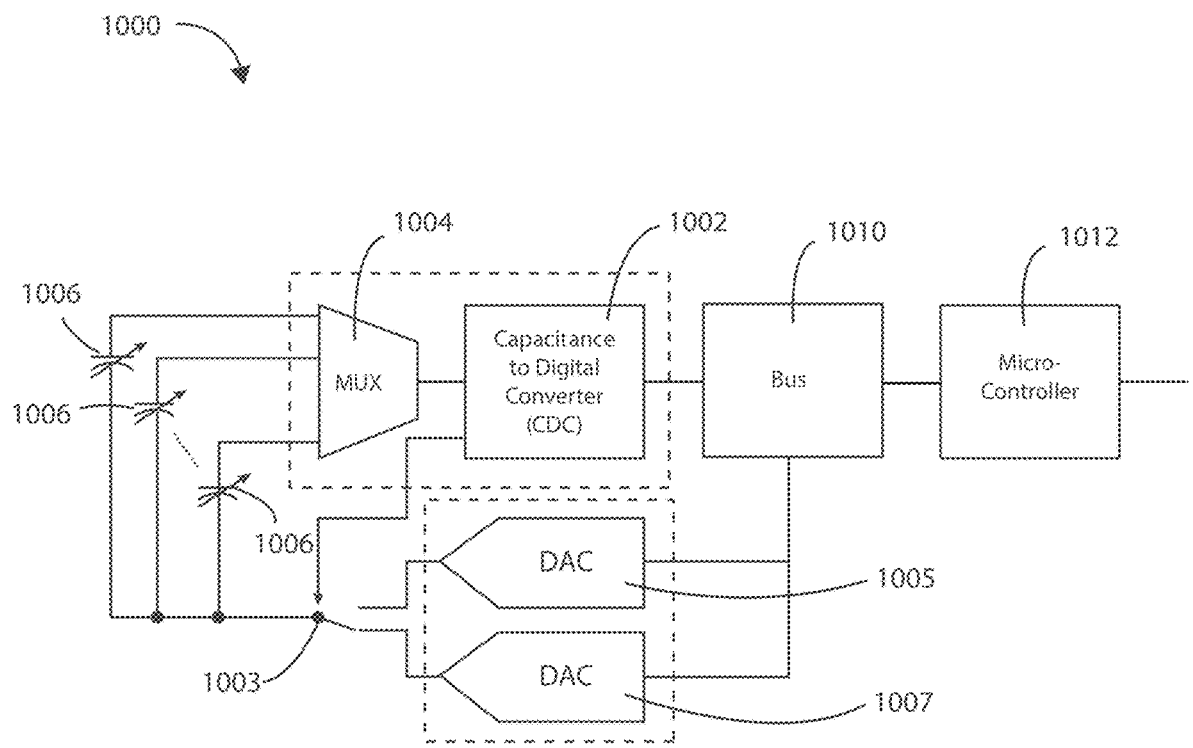
FIG. 10 is a schematic diagram of circuitry to measure the capacitance of a plurality of discrete graphene varactors in accordance with various embodiments herein.

Referring now to FIG. 10, a schematic diagram is shown of an example of measurement circuitry 1000 to measure the capacitance of a plurality of graphene sensors in accordance with various embodiments herein. The measurement circuitry 1000 can include a capacitance to digital converter (CDC) 1002 in electrical communication with a multiplexor 1004. The multiplexor 1004 can provide selective electrical communication with a plurality of graphene varactors 1006. The connection to the other side of the graphene varactors 1006 can be controlled by a switch 1003 (as controlled by the CDC) and can provide selective electrical communication with a first digital to analog converter (DAC) 1005 and a second digital to analog converter (DAC) 1007. The other side of the DACs 1005, 1007 can be connected to a bus device 1010, or in some cases, the CDC 1002. The circuitry can further include a microcontroller 1012 (or controller circuit), which will be discussed in more detail below.

In this case, a signal from the CDC controls the switch 1003 between the output voltages of the two programmable Digital to Analog Converters (DACs) 1005 and 1007. The programmed voltage difference between the DACs determines an excitation amplitude (and represents the AC component of the applied voltage), providing an additional programmable scale factor to the measurement and allowing measurement of a wider range of capacitances than specified by the CDC. The bias voltage at which the capacitance is measured is equal to the difference between the bias voltage at the CDC input (via the multiplexor, usually equal to VCC/2, where VCC is the supply voltage) and the average voltage of the excitation signal, which is programmable. In some embodiments, buffer amplifiers and/or bypass capacitance can be used at the DAC outputs to maintain stable voltages during switching. It will be appreciated that the circuits of FIGS. 9 and 10 are merely exemplary. Many different approaches are contemplated herein.

The measurement circuitry can include a capacitance sensor configured to measure capacitance of the discrete binding detectors resulting from the excitation voltage. The measurement circuitry can also include a controller circuit configured to determine a change in at least one of a measured capacitance versus voltage value and a calculated value based on the measured capacitance or voltage over the time period. In various embodiments, the measured capacitance versus voltage values can include one or more of a capacitance at a particular voltage, a maximum slope of capacitance to voltage, a minimum slope of capacitance to voltage, a minimum capacitance, a voltage at minimum capacitance (Dirac voltage), a maximum capacitance, and a ratio of maximum capacitance to minimum capacitance. In various embodiments, the controller circuit is configured to measure a difference between a forward Dirac point voltage and a reverse Dirac point voltage. In some embodiments, the controller circuit is configured to calculate a rate of change of measured capacitance over the time period at multiple discrete DC bias voltages. In some embodiments, the controller circuit is configured to calculate an average hysteresis change value of a measured property over a plurality of hysteresis measurement cycles. In various embodiments, the controller circuit is configured to determine the forward Dirac point voltage and/or the reverse Dirac point voltage.

In some embodiments, the measurement circuitry or another part of the system herein can include a temperature controller configured to control a temperature of the graphene varactors. In some embodiments, the temperature controller can include a thermistor, thermocouple, resistive thermal device (RTD) and the like. In various embodiments, controlling the temperature of the graphene varactors comprises exposing the graphene varactor to one or more temperature set points for a predetermined time. In some embodiments, a sequence involving increasing the temperature set points over a course of a predetermined time can be used. In other embodiments, a sequence involving decreasing the temperature set points over a course of a predetermined time can be used. In other embodiments, a sequence involving increasing the temperature set points followed by decreasing the temperature set points can be used.

The system for measuring analyte presence in a gaseous sample can be configured to measure differences in a capacitance versus voltage value when an applied voltage is swept in a first direction between the lower voltage bound and upper voltage bound versus a second direction between the between the upper voltage bound and lower voltage bound. In various embodiments, the first direction is a sweep from the lower voltage bound to the upper voltage bound and the second direction is a sweep from the upper voltage bound to the lower voltage bound. In various embodiments, the first direction is a sweep from the upper voltage bound to the lower voltage bound and the second direction is a sweep from the lower voltage bound to the upper voltage bound.

Various values for the voltages suitable for use within a range from a lower bound to an upper bound as contemplated herein are described further below. In various embodiments, each hysteresis measurement cycle includes delivering a DC bias voltage to the discrete binding detectors at multiple discrete DC bias voltage values across a range of DC bias voltages as discussed in greater detail below.

The above calculated values can be used for various diagnostic purposes. In some cases, the above calculated values can be indicative of the identity and/or concentrations of specific volatile organic components of a gas sample. As such, each of the calculated values above can serve as a distinct piece of data that forms part of a pattern for a given subject and/or given gas sample. As also described elsewhere herein, the pattern can then be matched against preexisting patterns, or patterns identified in real-time, derived from large, stored data sets through techniques such as machine learning or other techniques, wherein such patterns are determined to be characteristic of various conditions or disease states. The above calculated aspects can also be put to other purposes, diagnostic and otherwise.

In some embodiments, calculations such as those described above can be performed by a controller circuit. The controller circuit can be configured to receive an electrical signal reflecting the capacitance or voltage of the graphene varactors. In some embodiments, the controller circuit can include a microcontroller to perform these calculations. In some embodiments, the controller circuit can include a microprocessor in electrical communication with the measurement circuitry. The microprocessor system can include components such as an address bus, a data bus, a control bus, a clock, a CPU, a processing device, an address decoder, RAM, ROM and the like. In some embodiments, the controller circuit can include a calculation circuit (such as an application specific integrated circuit—ASIC) in electrical communication with the measurement circuitry.

In addition, in some embodiments, the system can include a nonvolatile memory. In some embodiments, the nonvolatile memory can be configured to store measured capacitance values for the discrete binding detectors across a range of DC bias voltages. In other embodiments, the nonvolatile memory can be configured to store a baseline capacitance for the discrete binding detectors across a range of DC bias voltages. In some embodiments, the nonvolatile memory can be where sensitivity calibration information for the graphene varactors is stored.

By way of example, the graphene varactors can be tested in a production facility, where sensitivity to various analytes such as VOC's can be determined and then stored on an EPROM or similar component. In addition, or alternatively, sensitivity calibration information can be stored in a central database and referenced with a chemical sensor element serial number when subject data is sent to a central location for analysis and diagnosis. These components can be included with any of the pieces of hardware described herein.

In some embodiments herein, components can be configured to communicate over a network, such as the internet or a similar network. In various embodiments, a central storage and data processing facility can be included. In some embodiments, data gathered from sensors in the presence of the subject (local) can be sent to the central processing facility (remote) via the internet or a similar network, and the pattern from the particular subject being evaluated can be compared to those of thousands or millions of other subjects, many of whom have been previously diagnosed with various conditions and wherein such condition data has been stored.

Pattern matching algorithms can be used to match the current subject's pattern against predetermined patterns that correlate with (and can therefore indicate) other subjects or classes of health statuses (for example disease or condition specific classes). Each predetermined pattern can include a predetermined likelihood of having a given condition or disease state. Thus, in various embodiments herein, the system can compare a data set reflecting a particular patient/individual, the data set including hysteresis data, against one or more previously determined patterns using a pattern matching or pattern recognition algorithm to determine the pattern that is the best match, wherein the specific previously determined pattern that is the best match indicates the health status of the patient.

By way of example, pre-determined patterns reflecting specific health statuses or specific disease states can be identified through machine learning analysis or another similar algorithmic technique by evaluating large sets of patient data wherein health statuses and/or disease states are indicated so as to facilitate a supervised machine learning approach. For example, a training set of data for generating pre-determined patterns herein can include: 1.) information regarding hysteresis data and/or other characterizing data for fluid test samples for a set of patients, 2.) information regarding specific diagnoses or other health statuses for the same set of patients, and/or 3.) other types of data described herein. Such a training set of data can be processed with a machine learning algorithm or similar algorithmic technique in order to generate one or more patterns of hysteresis data reflecting volatile organic compounds as well as other data that can be used to identify certain diagnoses or health statuses.

Algorithms can be used herein to create new patterns/models using any of numerous machine learning techniques, or apply the results of previously calculated models using these techniques, such as logistic regression, random forest, or an artificial neural network. Many different pattern matching or pattern recognition algorithms can be used. By way of example, in some embodiments a least squares algorithm can be used to identify a particular pre-determined pattern that a combined data set most closely matches. In various embodiments, standard pattern classification methods can be used including, but not limited to, Gaussian mixture models, clustering, hidden Markov models, as well as Bayesian approaches, neural network models, and deep learning.

After a pattern matching operation herein, a likelihood of having a given condition or disease state can be generated. For example, in some embodiments this can be performed remotely and provided back across the data network to the facility where the subject is currently located. In other embodiments, such operations can be performed locally on a device of the system.

Figure 11:
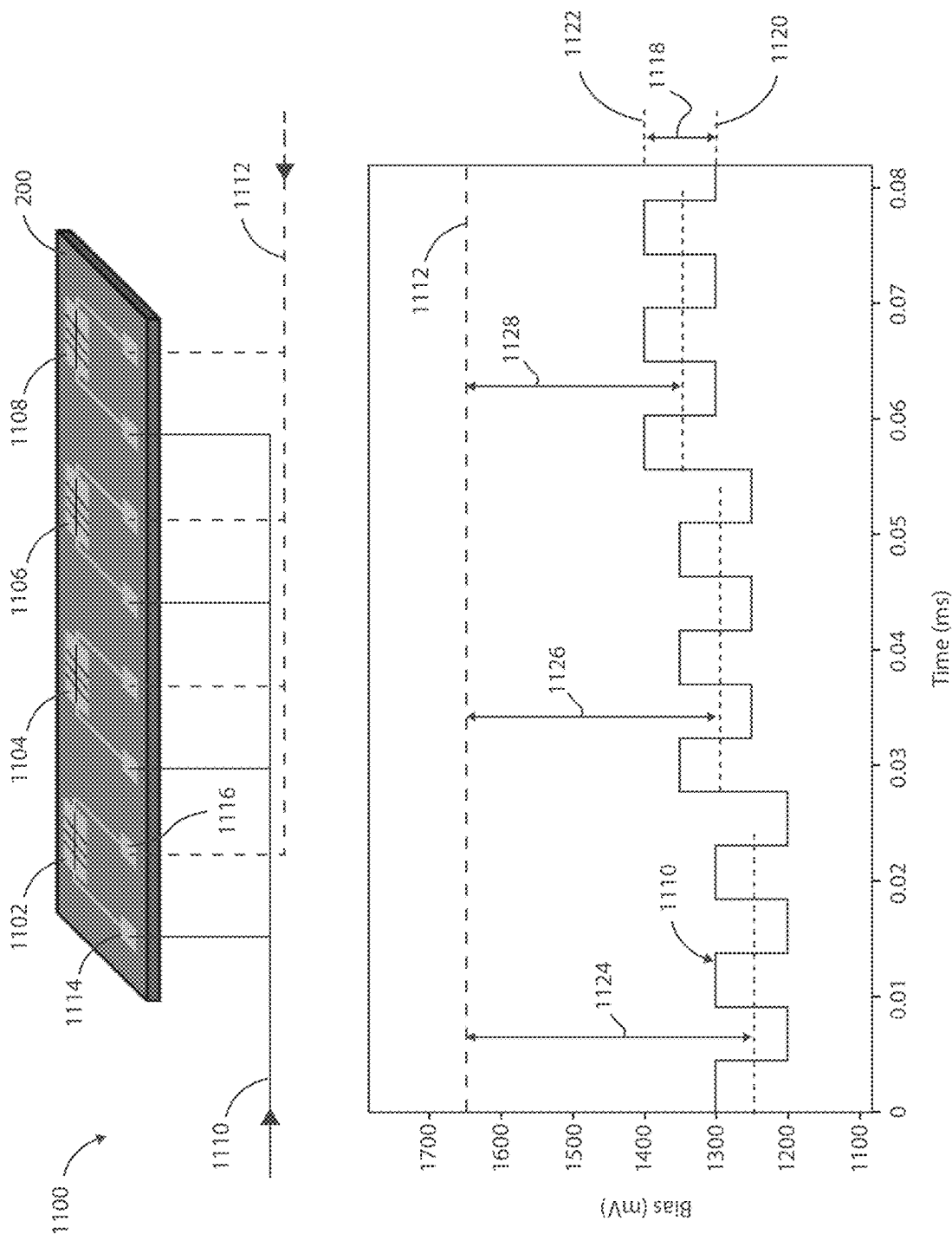
FIG. 11 is a schematic of an exemplary portion of a measurement system and voltage sweep experiment in accordance with various embodiments herein.

Referring now to FIG. 11, a schematic diagram of an exemplary portion of a measurement system 1100 and an example of a DC voltage sweep experiment in accordance with various embodiments herein. The measurement system 1100 shows a plurality of graphene varactors 1102, 1104, 1106, and 1108 as part of a chemical sensor element 200. An applied voltage signal can be applied to each of the graphene varactors 1102, 1104, 1106, and 1108 and a capacitance versus voltage value can be measured. The voltage signal shown in FIG. 11 includes two independent signals, including an alternating voltage superimposed on a first input voltage 1110, and a second input voltage 1112. It will be appreciated that the second input voltage 1112 does not alternate. The first input voltage 1110 can be applied to a first terminal 1114 of each of the graphene varactors, and the second input voltage 1112 can be applied to a second terminal 1116 of each of the graphene varactors.

The difference between the offset of the applied second input voltage 1112, which is held at a constant during the time of a measurement sweep, and the offset of the alternating voltage superimposed on the first input voltage 1110 is the DC bias voltage. In FIG. 11, three DC bias voltages are shown and are represented as a first DC bias voltage 1124, a second DC bias voltage 1126, and a third DC bias voltage 1128. It will be appreciated that while only three DC biases are shown in FIG. 11, any number of DC bias voltages can be contemplated herein. It will be appreciated that the DC bias voltages during the course of a measurement sweep can increase or decrease depending on the value of the applied input voltage and the applied alternating voltage. The value of the DC bias voltage can change over the course of a measurement sweep by increasing the DAC high and low of the alternating voltage superimposed on a first input voltage 1110 while maintaining a constant difference between the DAC high and low in order to maintain a constant excitation amplitude 1118. It will be appreciated that while the example presented in FIG. 11 shows three AC cycles per DC bias voltage, the actual number of AC cycles applied at each DC bias voltage can include from 1 to 10,000 or more cycles. It will be appreciated that the frequency shown in FIG. 11 is set to 205 kHz, however, the frequency can include those falling in a range from 10 kHz to 1 MHz as discussed below.

It will be appreciated that in the schematic shown in FIG. 11, the CDC of the measurement circuitry controls the switch between the output voltages of two programmable DACs (not shown). The programmed voltage difference between the DACs determines the excitation amplitude 1118 of the alternating voltage superimposed on a first input voltage 1110, providing an additional programmable scale factor to the measurement and allowing measurement of a wider range of capacitances than specified by the CDC. The alternating voltage superimposed on a first input voltage 1110 applied to the first terminal 1114 can include an alternating voltage having a waveform with a sinusoidal waveform shape. In various embodiments, the waveform can include a square waveform, a sawtooth waveform, a ramp waveform, a triangular waveform, a trapezoidal waveform, and the like. A lower voltage bound 1120 and an upper voltage bound 1122 define the magnitude of the excitation amplitude 1118.

The excitation amplitude of the alternating voltage superimposed on a first input voltage 1110 applied to the first terminal 1114 of the graphene varactors can include an excitation amplitude of 5 mV, 10 mV, 15 mV, 20 mV, 25 mV, 50 mV, 75 mV, 100 mV, 125 mV, 150 mV, 175 mV, 200 mV, 225 mV, 250 mV, 275 mV, or 300 mV.

It will be appreciated that the excitation amplitude of the voltages used in the methods herein can include an excitation amplitude within a range, wherein any of the forgoing voltages can serve as the lower voltage bound or upper voltage bound of the range, provided that the lower voltage bound of the range is a value less than the upper voltage bound of the range. It will be appreciated that the lower voltage bound and the upper voltage bound of the applied alternating voltage can be set independently by each of the two DACs. It will be further appreciated that the lower voltage bound and the upper voltage bound on the applied alternating voltage can change over the course of a measurement by dynamically increasing the value of the lower voltage bound and the upper voltage bound, but maintaining a constant excitation amplitude between the bounds. In some embodiments, the excitation amplitude can be held at 100 mV over the course of an applied voltage sweep at a plurality of voltage values.

The second input voltage 1112 applied to the second terminal 1116 of the graphene varactors can include a constant voltage held at 500 mV, 1.0 V, 1.1 V, 1.2 V, 1.3 V, 1.4 V, 1.5 V, 1.6 V, 1.65 V, 1.7 V, 1.8 V, 1.9 V, 2.0 V, 2.1 V, 2.2 V, 2.3 V, 2.4 V, 2.5 V, 2.6 V, 2.7 V, 2.8 V, 2.9 V, or 3.0 V for the duration of the measurements. It will be appreciated that the input voltages used in the methods herein can include delivering an input voltage within a range, wherein any of the forgoing voltages can serve as the lower or upper bound of the range, provided that the lower bound of the range is a value less than the upper bound of the range. It will be appreciated that the second input voltage 1112 applied to the second terminal 1116 of the graphene varactors can include a constant voltage held at 3V or greater depending on the thickness of the dielectric layer.

Many different ranges of input voltages can be used for each hysteresis measurement cycle. In some embodiments, the input voltages used in the methods herein can include from −6 V, −5 V, −4 V, −3 V, −2.5 V, −2.0 V, −1.5 V, −1.0 V, −0.5 V, 0.5 V, 1.0 V, 1.5 V, 2.0 V, 2.5 V, 3.0 V, 4 V, 5 V, or 6 V. It will be appreciated that the input voltages used in the methods herein can include delivering an input voltage within a range, wherein any of the forgoing voltages can serve as the lower or upper bound of the range, provided that the lower bound of the range is a value less than the upper bound of the range. In various embodiments, the voltage sweeping range suitable for use herein can include a plurality of voltages in a range of from −6 V to 6 V. In various embodiments, the voltage sweeping range can include from −5 V to 5 V; from −4 V to 4 V; from −3 V to 3 V; from −2 V to 2 V; from −1.5 V to 1.5V; or from −1 V to 1 V.

The excitation signal can be applied to the graphene varactors at a frequency as dictated by the CDC. The frequency of the applied excitation signal can include a frequency that can be greater than or equal to 10 kHz, 20 kHz, 30 kHz, 40 kHz, 50 kHz, 60 kHz, 70 kHz, 80 kHz, 90 kHz, or 100 kHz, 125 kHz, 150 kHz, 175 kHz, 200 kHz, 225 kHz, 250 kHz, 275 kHz, 300 kHz, 325 kHz, 350 kHz, 375 kHz, 400 kHz, 425 kHz, 450 kHz, 475 kHz, 500 kHz, 525 kHz, 550 kHz, 575 kHz, 600 kHz, 625 kHz, 650 kHz, 675 kHz, 700 kHz, 725 kHz, 750 kHz, 775 kHz, 800 kHz, 825 kHz, 850 kHz, 875 kHz, 900 kHz, 925 kHz, 950 kHz, 975 kHz, or 1000 MHz or can be an amount falling within a range, wherein any of the foregoing frequencies can serve as the lower or upper bound of the range, provided that the lower bound of the range is a value less than the upper bound of the range.

Applied Voltages/Hysteresis Measurement Cycles

A hysteresis measurement cycle herein can include a sweep through voltages in a first direction followed by a sweep through voltages in the opposite direction to observe a change in a measurable parameter (as hysteresis effect). Many different ranges of applied voltages can be used for each hysteresis measurement cycle. In some embodiments, the applied voltages used in the methods herein can include from −6.0 V, −5.0 V, −4.0 V, −3.0 V, −2.5 V, −2.0 V, −1.5 V, −1.0 V, −0.5 V, 0.5 V, 1.0 V, 1.5 V, 2.0 V, 2.5 V, 3.0 V, 4.0 V, 5.0 V, and 6.0V. It will be appreciated that the applied voltages used in the methods herein can include delivering an applied voltage within a range, wherein any of the forgoing voltages can serve as the lower or upper bound of the range, provided that the lower bound of the range is a value less than the upper bound of the range.

In various embodiments, a "sweep" across a voltage range can include a number of discrete measurements being made during the sweep at a number of discrete bias voltages across the voltage range. In some embodiments, a hysteresis measurement cycle herein can include a forward sweep (from low applied voltages to high applied voltages).

In some embodiments, a hysteresis measurement cycle herein can include a backward sweep (from high applied voltages to low applied voltages). In some embodiments, a hysteresis measurement cycle herein can include both a forward and backward sweep. In some embodiments, a hysteresis measurement cycle herein can include both a forward and backward sweep or any combination thereof.

In some embodiments, a voltage of 0 V or 0.5 V (or other "reset" voltage) can be applied at the end of a hysteresis measurement cycle and before the next hysteresis measurement cycle or at the end of all testing.

The length of time for each hysteresis measurement cycle can depend on various factors including the total number of measurements made of capacitance during the cycle, the total bias voltage range being covered, the voltage step size for each measurement, the time for each measurement, etc. In some embodiments, the time period for each hysteresis measurement cycle can be about 0.1, 0.5, 1, 2, 3, 4, 5, 6, 7, 8, 9, 10, 12, 15, 20, 30, 45, 60, 120 seconds or more. It will be appreciated that the time period for each hysteresis measurement cycle can include a range, wherein any of the forgoing time points can serve as the lower or upper bound of the range, provided that the lower bound of the range is a value less than the upper bound of the range.

In some embodiments, the total time for all hysteresis measurement cycles can be configured to match the total amount of time for testing of a gaseous sample. In some embodiments, the total time for all hysteresis measurement cycles can be configured to be equal to a predetermined time that covers a period of interest. In some embodiments, the total time for all hysteresis measurement cycles can be configured to be equal or greater than the total amount of time for a non-steady state phase (or kinetic phase). In some embodiments, the controller circuit can be configured to determine the start of a non-steady state response phase from each of the discrete binding detectors by assessing a rate of change of measured capacitance over time and initiate hysteresis measurement cycles at that point. In some embodiments, the controller circuit can be configured to initiate hysteresis measurement cycles when a signal is received indicating the start of a particular test of gaseous sample, such as receiving a sign from a flow sensor that a sample gas is starting to flow to the discrete binding detectors. In some embodiments, the controller circuit can be configured to determine the end of a non-steady state phase by assessing a rate of change of measured capacitance over time and terminating hysteresis measurement cycles at that point or reducing the frequency of hysteresis measurement cycles at that point.

In various embodiments, the total time period for generating a series of hysteresis measurement cycles (the total time for all hysteresis measurement cycles) can include from 10 seconds to 1200 seconds. In some embodiments, the time period for generating a series of hysteresis measurement cycles can include from 30 seconds to 180 seconds. In some embodiments, the time period for generating a series of hysteresis measurement cycles can include from 10, 15, 20, 25, 30, 40, 45, 60, 90, 120, 150, 180, 360, 540, 720, 1080, 1200 seconds or more. It will be appreciated that the time period for generating a series of hysteresis measurement cycles can include a range, wherein any of the forgoing time points can serve as the lower or upper bound of the range, provided that the lower bound of the range is a value less than the upper bound of the range.

In some embodiments, stepping through the range of applied voltages can include stepping through the range of applied voltages in predetermined increments, such as 50 mV increments. In some embodiments, stepping through the range of applied voltages can include stepping through the range of applied voltages in 10 mV increments. Stepping through the range of applied voltages can be performed at voltage increments of 1 mV, 5 mV, 10 mV, 25 mV, 50 mV, 75 mV, 100 mV, 125 mV, 150 mV, 200 mV, 300 mV, 400 mV, or 500 mV, or by a stepped amount falling within a range between any of the foregoing. In various embodiments, stepping through the range of applied voltages can include stepping through the range of applied voltages in increments from 1 mV to 500 mV. In various embodiments, stepping through the range of applied voltages can include stepping through the range of applied voltages in increments from 5 mV to 300 mV.

Hysteresis Effects and Capacitance/Voltage Parameters

Many different capacitance versus voltage related parameters can be calculated based on the measured capacitance data. The parameters of a resulting capacitance versus voltage curve can include, but not be limited to a capacitance at a particular voltage, a maximum slope of capacitance to voltage, a minimum slope of capacitance to voltage, a minimum capacitance, a voltage at minimum capacitance (Dirac point), a maximum capacitance, full/half width at half maximum of a capacitance-voltage curve, area of a capacitance-voltage curve, a difference between maximum capacitance and minimum capacitance, a forward Dirac point voltage, a reverse Dirac point voltage, and a ratio of maximum capacitance to minimum capacitance.

Changes in any one of the parameters can be measured as a hysteresis effect due to analyte binding. For example, the hysteresis effects can include a change in any of the following parameters: maximum slope of capacitance to voltage, change in maximum slope of capacitance to voltage over a baseline value, minimum slope of capacitance to voltage, change in minimum slope of capacitance to voltage over a baseline value, minimum capacitance, change in minimum capacitance over a baseline value, voltage at minimum capacitance (Dirac voltage), change in voltage at minimum capacitance, maximum capacitance, change in maximum capacitance, ratio of maximum capacitance to minimum capacitance, response time constants, and ratios of any of the foregoing between different graphene sensors and particularly between different graphene sensors having specificity for different analytes.

Without wishing to be bound to any particular theory, it is believed that various mechanisms affect the capacitance versus voltage values depending on whether or not the bonded molecules are weakly bonded or tightly bonded. In the case of weakly bonded molecules, an instantaneous and reversible signal is observed in the measured data. This reversible signal is believed to be due to a charge distribution of the bonded molecules that is shifted in response to the applied voltages during a voltage sweep. As the voltage is swept, the charge distribution of the weakly bonded molecules shifts following a fringing field and thus contributes to an increase in hysteresis in the system. In various embodiments, the reversible signal can be recovered during a voltage sweep by introducing a nitrogen purge between excitation signals.

In the case of tightly bound molecules, a slow, accumulating drift signal is observed in the measured data. It is believed that the molecular orbitals of the molecules directly interact with the graphene and dielectric layer to enable charge transfer with graphene. During the course of a voltage sweep, the drift signal can accumulate over time. As the voltage is swept, a net flow of charge can occur into or out of the graphene. In various embodiments, the drift signal is slow to recover to baseline values.

Various analytes can produce distinct responses with respect to both the reversible and drift signals, and thus contribute to hysteresis in the measured parameters. The response signals can also change in response to the range of the applied gate voltage sweep, the duration of the gate voltage sweep, and an applied temperature.

Methods

Many different methods are contemplated herein, including, but not limited to, methods of making, methods of using, and the like. Aspects of system/device operation described elsewhere herein can be performed as operations of one or more methods in accordance with various embodiments herein.

In an embodiment, a method for evaluating a fluid test sample is included, the method can include contacting a chemical sensor element can include one or more discrete binding detectors with the fluid test sample, each discrete binding detector can include a graphene varactor, generating an applied voltage as part of a series of hysteresis measurement cycles over a time period, wherein each hysteresis measurement cycle includes delivering a voltage to the discrete binding detectors as a sweep across a range of voltages in a first direction and then in a second direction that is opposite the first direction, measuring capacitance of each of the discrete binding detectors resulting from the hysteresis measurement cycles, and determining hysteresis effects on measured capacitance values over the time period.

In an embodiment, the method can further include distinguishing a first unique fluid mixture from a second unique fluid mixture based on the hysteresis profile of each of the first and second unique fluid mixtures. It will be appreciated that the method can further include distinguishing between a third unique fluid mixture, fourth unique fluid mixture, fifth unique fluid mixture, sixth unique fluid mixture, seventh unique fluid mixture, eighth mixture unique fluid mixture, and so on.

In an embodiment, the method can further include delivering an applied voltage to the graphene varactors at multiple discrete voltages across a range of voltages comprises stepping through the range of voltages in 50 mV increments.

In an embodiment of the method, the range of voltages comprises from −6 V to 6 V.

In an embodiment of the method, the range of voltages comprises from −3 V to 3 V.

In an embodiment of the method, the range of voltages comprises from −1.5 V to 1.5 V.

In an embodiment, the method can further include determining an identity of one or more analytes present in the fluid test sample.

In an embodiment, the method can further include identifying a disease state of an individual providing the fluid test sample based at least in part on the determined hysteresis effects on measured capacitance values.

In an embodiment, the method can further include evaluating the fluid test sample at least in part by determining the hysteresis effects in one or more parameters of the one or more discrete binding detectors.

In an embodiment of the method, the hysteresis effects in one or more parameters can include one or more of capacitance at a particular voltage, a maximum slope of capacitance to voltage, a minimum slope of capacitance to voltage, a minimum capacitance, a voltage at minimum capacitance (Dirac voltage), a maximum capacitance, and a ratio of maximum capacitance to minimum capacitance.

Aspects may be better understood with reference to the following examples.

These examples are intended to be representative of specific embodiments, but are not intended as limiting the overall scope of embodiments herein.

EXAMPLES

Example 1: Laboratory Gas Measurement System

Figure 12:
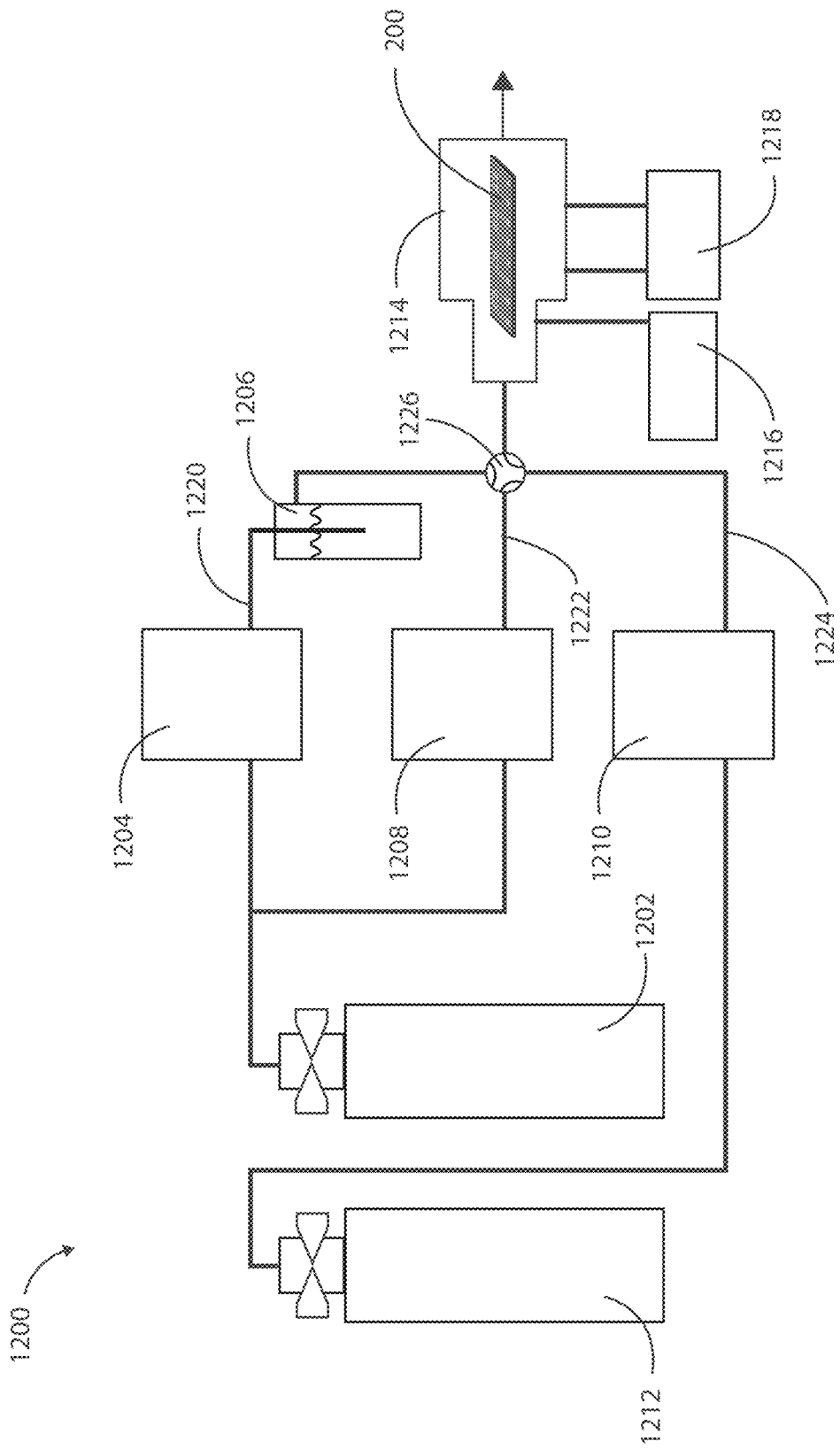
FIG. 12 is a schematic view of an exemplary gas measurement system in accordance with various embodiments herein.

An exemplary laboratory-based gas measurement system 1200 is shown in FIG. 12. Gas measurement system 1200 includes a nitrogen ($N_2$) tank 1202 (99.9998% purity) connected to two mass flow controllers (MFCs) to form two independent gas flow channels. The first MFC 1204 is configured to deliver $N_2$ into a bubbler 1206 via a first gas flow channel 1220, and can generate water vapor or VOC-containing vapor depending on the bubbler contents. The second MFC 1208 is configured as a dilution channel to control the flow rate of a carrier $N_2$ gas via a second gas flow channel 1222. The third MFC 1210 is connected to an oxygen tank 1212 (industrial grade) and is configured to form a third gas flow channel 1224.

The first, second, and third gas flow channels converge in mixing chamber 1226 to form a gaseous mixture containing an analyte at a point just before sending the gaseous mixture into the gas flow chamber 1214. The gas flow chamber 1214 is configured to receive a chemical sensor element 200, the chemical sensor element 200 containing a plurality of graphene varactors. The upstream side of the flow into the gas flow chamber 1214 is connected to a proportional-integral-derivative (PID) heater 1216 that controls the temperature of the gaseous sample. An inductance, capacitance, resistance meter 1218 (e.g., Agilent 4284A LCR meter) is connected to the gas flow chamber 1214 and is used to measure any number of capacitance vs. gate voltage (C–Vg) curves as used to monitor the behavior of the one or more graphene varactors present on the chemical sensor element.

Example 2: Electrical Response of Bare Graphene Varactors in the Presence of Ethanol and Oxygen The electrical response of various graphene varactors was evaluated in the presence of ethanol and oxygen using the gas measurement system as described in Example 1. Before experimentation, bare graphene varactors were baked-out in a high vacuum ($10^{-6}$ Torr) at 120° C. for 12-18 hours to remove any possible adsorbates from the graphene surface. To eliminate the effect of residual air in the system, the gas flow channels and flow chamber of the gas measurement system were pre-purged with 400 standard cubic centimeters per minute (sccm) $N_2$ flow for 10 min. Before recording any data, the graphene varactors were swept between −2 V to 2 V for 80-120 cycles for stabilization.

To separately observe an instantaneous response from the graphene varactors and any possible memory effect due to exposure to various analytes, the chemical sensor element was repeatedly exposed to 10,000 parts per million (ppm) oxygen for twenty cycles and 2105 ppm volatilized ethanol (4% saturation, diluted in $N_2$) for forty cycles. Each full hysteresis measurement cycle consisted of a series of forward and sweeps with exposure of the chemical sensor element to either oxygen or ethanol for 400-600 seconds in an $N_2$ background, followed by a series of forward and reverse sweeps of the same length in pure $N_2$. The total flow rate was kept at a constant level of 1000 sccm for all conditions. In each gas exposure, ten C–$V_g$ curves were measured from −2 V to 2 V with step of 20 mV. All flow switching between the forward sweep in a first direction and reverse sweep in a second direction occurred at $V_g = -2$ V.

Figure 13:
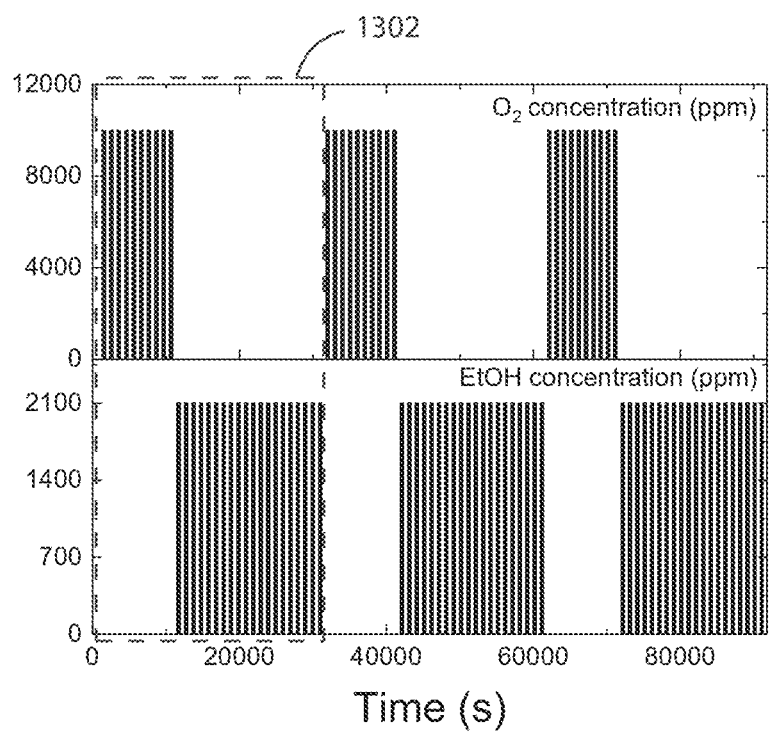
FIG. 13 is a plot of gas concentration versus time as applied to a graphene varactor in accordance with various embodiments herein.
Figure 14:
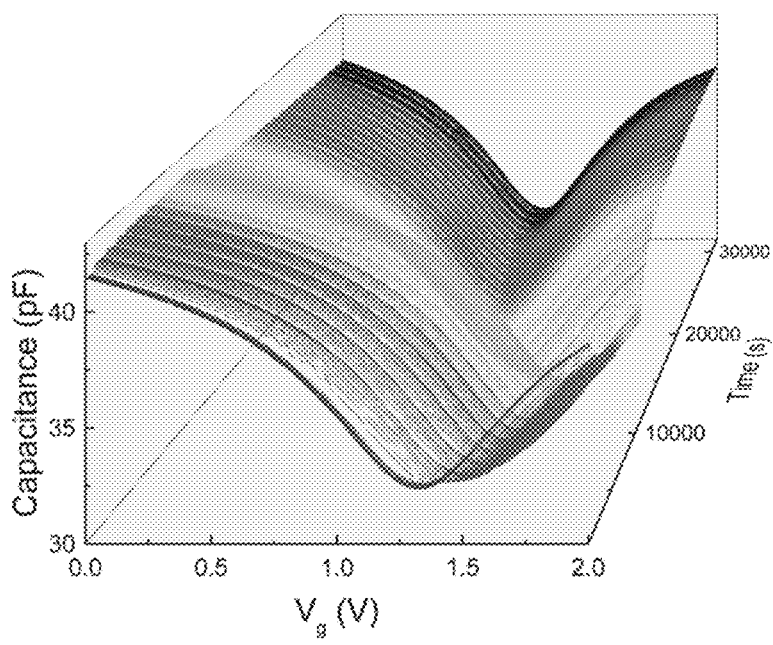
FIG. 14 is graph showing capacitance versus gate voltage for a graphene varactor in accordance with various embodiments herein.

Referring now to FIG. 13 a plot of analyte concentration of the gas (oxygen top panel, ethanol bottom panel) delivered to the flow chamber as a function of time is shown. Within this time, the LCR meter measured the chemical sensor element capacitance with $V_g$ being swept from −2 V to 2 V and back to −2 V on a continuous basis. The forward C–$V_g$ curves (See FIG. 14) collected during the time frame marked by the dotted box 1302 in FIG. 13, suggest that repetitive $O_2$ exposure shifts $V_{DF}$ dramatically in the positive direction and repetitive ethanol exposure shifts $V_{DF}$ dramatically in the negative direction. For simplicity, only the 0 to 2 V part of the forward sweep was plotted in FIG. 14.

Figure 15:
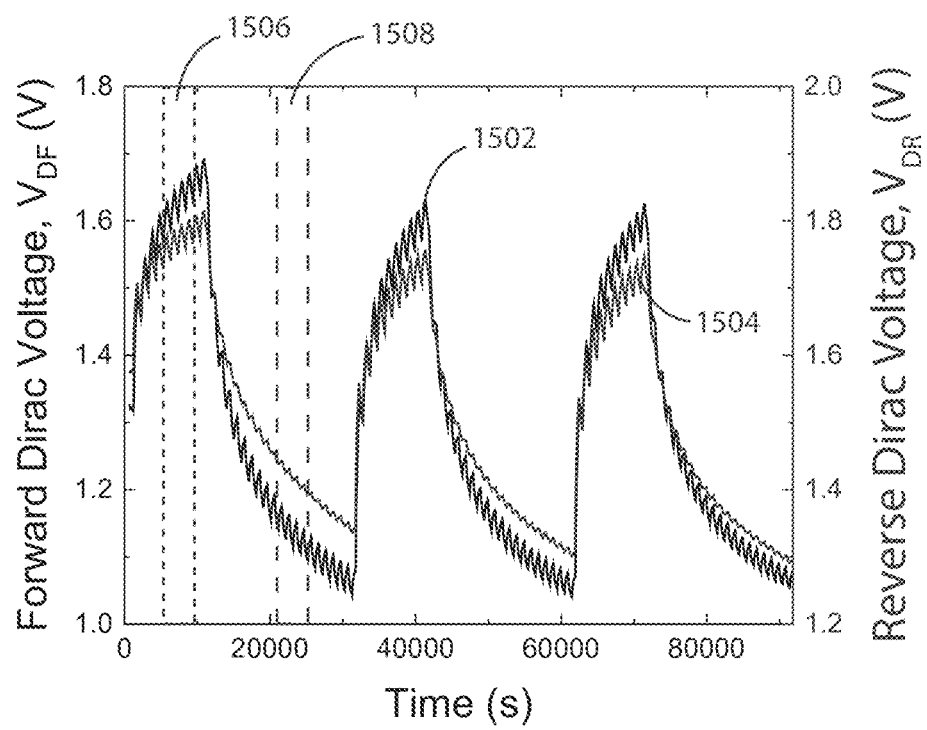
FIG. 15 is a graph showing forward and reverse Dirac voltages versus time for a graphene varactor in accordance with various embodiments herein.
Figure 16:
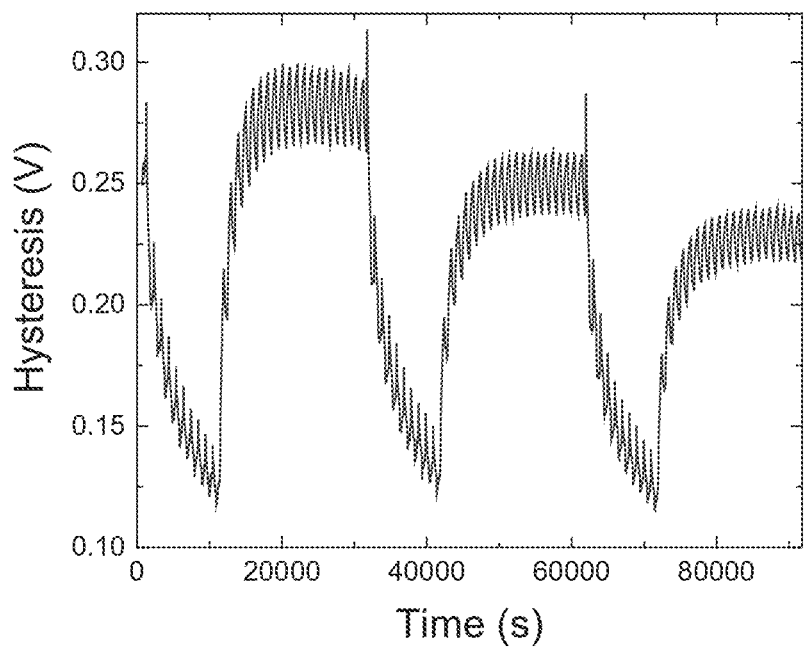
FIG. 16 is a graph showing hysteresis versus time for a graphene varactor in accordance with various embodiments herein.

The $V_{DF}$, $V_{DR}$, and hysteresis values were extrapolated for the entire experiment and plotted against time. Referring now to FIG. 15, the extrapolated $V_{DF}$ and $V_{DR}$ values are plotted over time. ($V_{DF}$—1502; $V_{DR}$—1504). Referring now to FIG. 16, the extrapolated hysteresis values are plotted over time. Noticeably, both oxygen and ethanol produced two sets of signals in superposition: a reversible signal that is instantaneous and recoverable by the subsequent nitrogen purge, and a drift signal that accumulates over each exposure cycle but is much larger in magnitude. The oxygen-induced drift shifts both $V_{DF}$ and $V_{DR}$ in the positive direction. Oxygen exposure gradually decreases the hysteresis of the chemical sensor element. In contrast, drift from ethanol shifts $V_{DR}$ negative and simultaneously increases the hysteresis.

Figure 17:
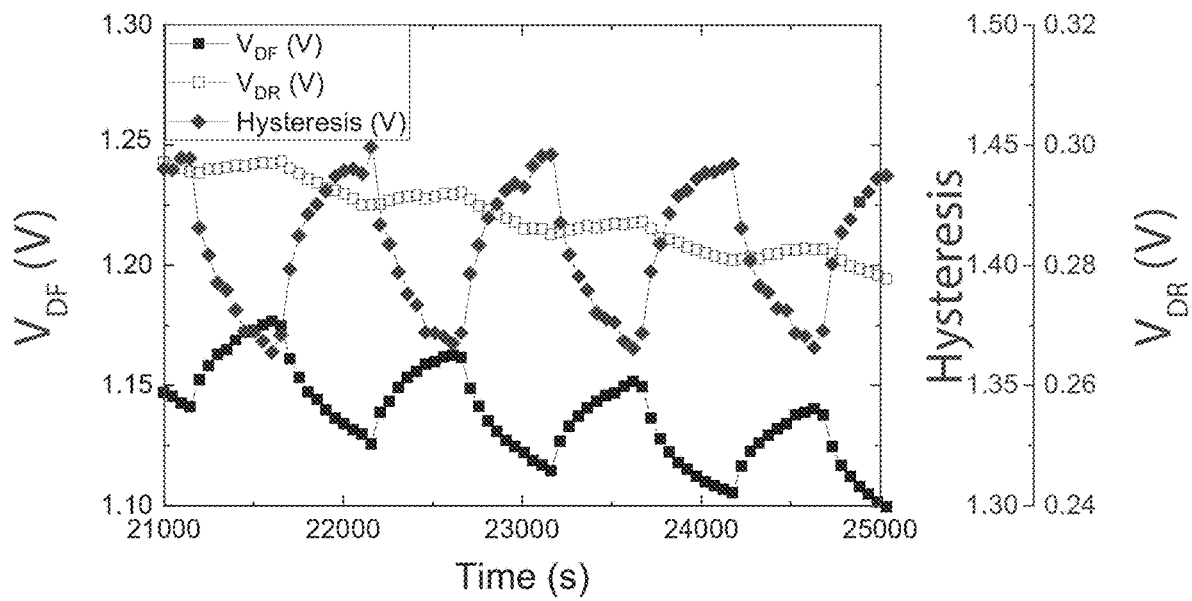
FIG. 17 is a graph showing a zoomed view of the forward and reverse Dirac voltages and hysteresis versus time as presented in FIG. 15 for ethanol binding to a graphene varactor in accordance with various embodiments herein.
Figure 18:
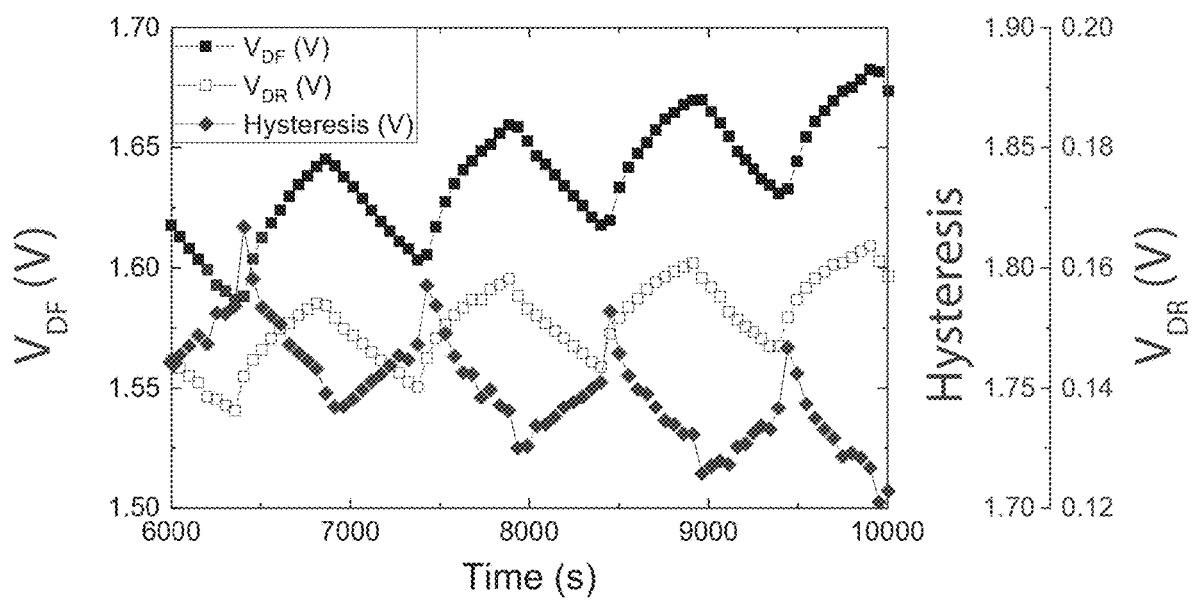
FIG. 18 is a graph showing a zoomed view of the forward and reverse Dirac voltages and hysteresis versus time as presented in FIG. 15 for oxygen binding to a graphene varactor in accordance with various embodiments herein.

Referring now to FIG. 17, a detailed plot of ethanol reversible signals is shown as taken during a first time 1506 as shown in FIG. 15. As shown in FIG. 17, both $V_{DF}$ and $V_{DR}$ shift in the negative direction, but the magnitude of the shift is larger for $V_{DF}$ than for $V_{DR}$, indicating ethanol induces an increasing chemical sensor element hysteresis. Referring now to FIG. 18, a detailed plot of oxygen reversible signals is shown as taken during a second time 1508 as shown in FIG. 15. As shown in FIG. 18, the magnitude of the shift is almost the same for $V_{DF}$ and $V_{DR}$, indicating that the hysteresis signal in response to oxygen is therefore small.

Example 3: Electrical Response of Bare Graphene Varactors in the Presence of Methanol or Water, and Oxygen The $V_{DF}$ and $V_{DR}$ experiment described in Example 2 was repeated using methanol or water in place of ethanol as the volatile organic compound. As described in Example 2, before experimentation, bare graphene varactors were baked-out in a high vacuum ($10^{-6}$ Torr) at 120° C. for 12-18 hours to remove any possible adsorbates from the graphene surface. To eliminate the effect of residual air in the system, the gas flow channels and flow chamber of the gas measurement system were pre-purged with 400 standard cubic centimeters per minute (sccm) $N_2$ flow for 10 min. Before taking any data, the chemical sensor element was swept between −2 V to 2 V for 80-120 cycles for stabilization.

Figure 19:
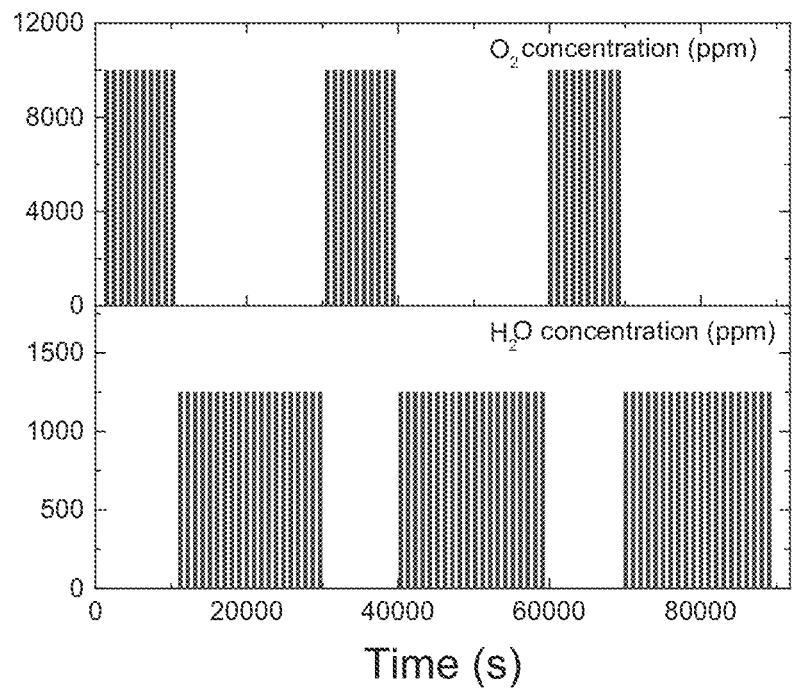
FIG. 19 is a plot of gas concentration versus time as applied to a graphene varactor in accordance with various embodiments herein.
Figure 20:
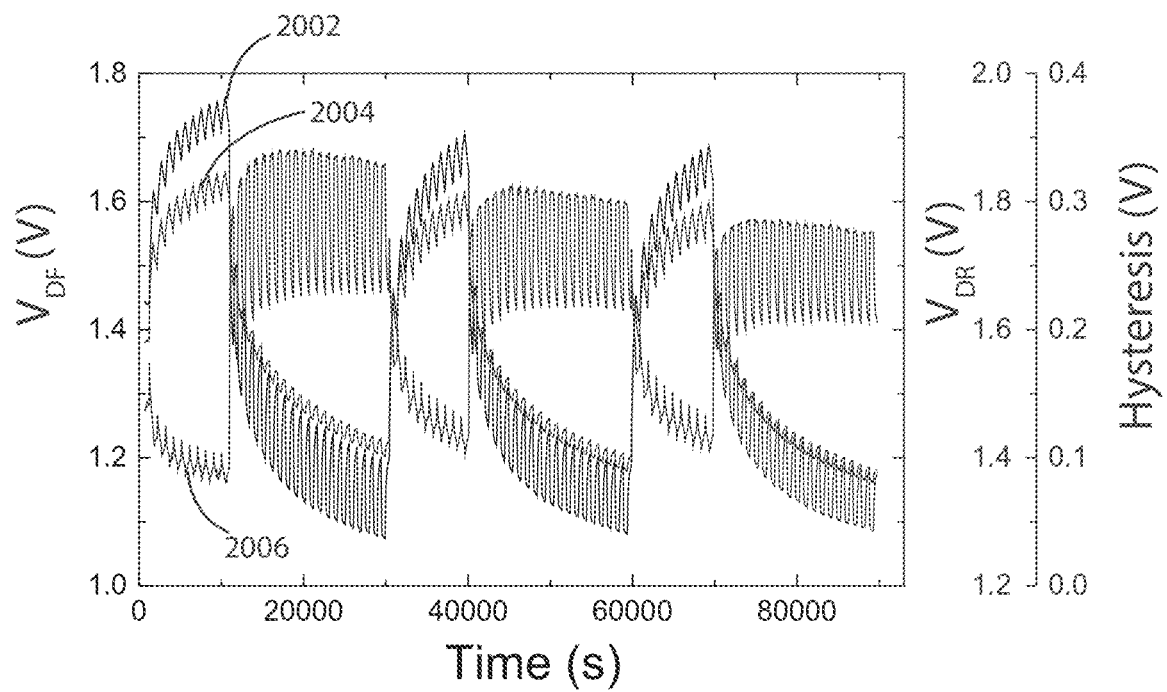
FIG. 20 is a graph showing forward Dirac voltage, reverse Dirac voltage, and hysteresis versus time for a graphene varactor in accordance with various embodiments herein.

Referring now to FIG. 19, a plot of analyte concentration of the gas (oxygen top panel, water bottom panel) delivered to the flow chamber as a function of time is shown. The graphene varactors were repeatedly exposed to $O_2$ (10,000 ppm) and $H_2O$ (1251 ppm, 4% saturation) and cycled as in Example 2. Plots presented in FIG. 20 show the resulting extrapolated $V_{DF}$ 2002, $V_{DR}$ 2004, and hysteresis 2006 responses of a bare graphene varactor exposed to oxygen and water.

Figure 21:
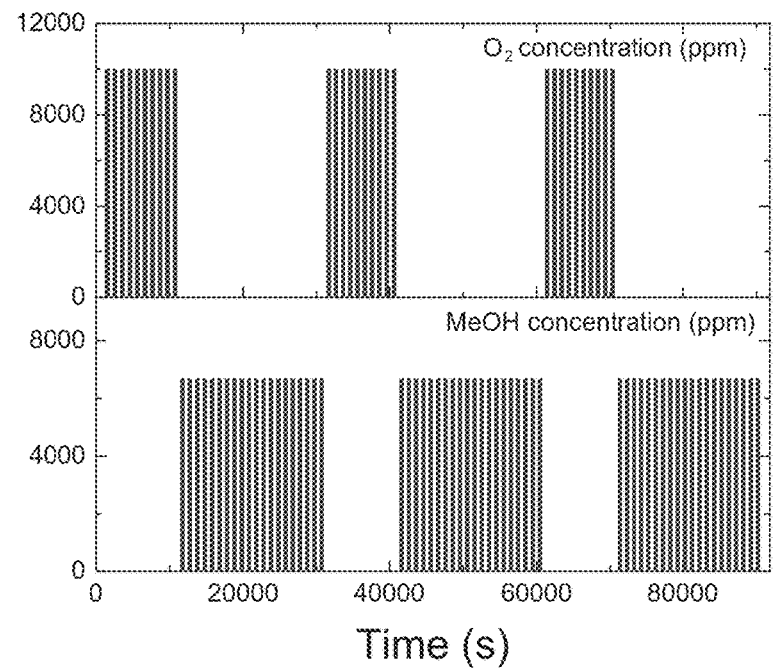
FIG. 21 is a plot of gas concentration versus time as applied to a graphene varactor in accordance with various embodiments herein.
Figure 22:
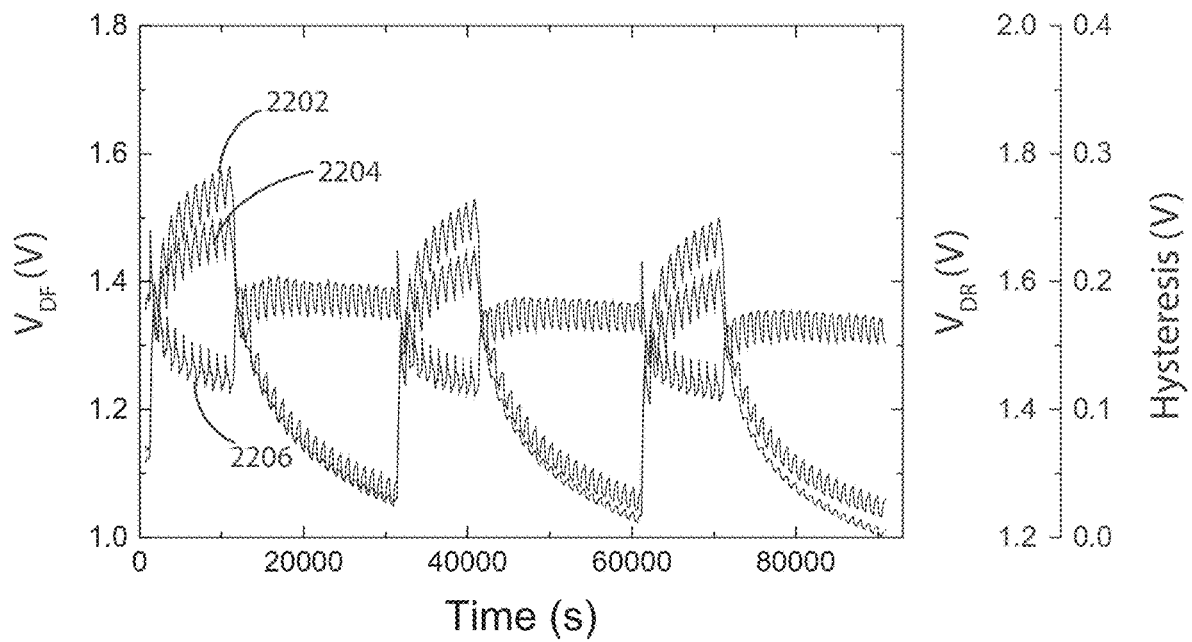
FIG. 22 is a graph showing forward Dirac voltage, reverse Dirac voltage, and hysteresis versus time for a graphene varactor in accordance with various embodiments herein.

Referring now to FIG. 21, a plot of analyte concentration of the oxygen (top panel) and methanol (bottom panel) delivered to the flow chamber as a function of time is shown. The graphene varactors were repeatedly exposed to $O_2$ (10,000 ppm) and for methanol (6684 ppm, 4% saturation) and cycled as in Example 2. Plots presented in FIG. 22 show the resulting extrapolated $V_{DF}$ 2202, $V_{DR}$ 2204, and hysteresis 2206 responses of a bare graphene varactor exposed to the oxygen and methanol.

Both water and methanol produced the same trends as ethanol regarding both the drift and reversible signals as described in Example 2. That is, drift from methanol or water binding shifts $V_{DR}$ negative and simultaneously increases the hysteresis.

Example 4: Electrical Response of Manganese (III) Tetraphenylporphyrin Chloride Functionalized Graphene Varactors in the Presence of Ethanol and Oxygen Following the same experimental parameters of Example 2, the electrical response of various graphene varactors functionalized with manganese (III) tetraphenylporphyrin chloride (Mn(III)TPPCl) were evaluated in the presence of ethanol and oxygen to monitor the effects of functionalization on the $V_{DF}$, $V_{DR}$, and hysteresis values.

The chemical sensor elements having graphene varactors functionalized with Mn(III)TPPCl were baked-out in a high vacuum ($10^{-6}$ Torr) at 120° C. for 12-18 hours to remove any possible adsorbates from the graphene surface. To eliminate the effect of residual air in the system, the gas flow channels and flow chamber of the gas measurement system were pre-purged with 400 standard cubic centimeters per minute (sccm) $N_2$ flow for 10 min.

Figure 23:
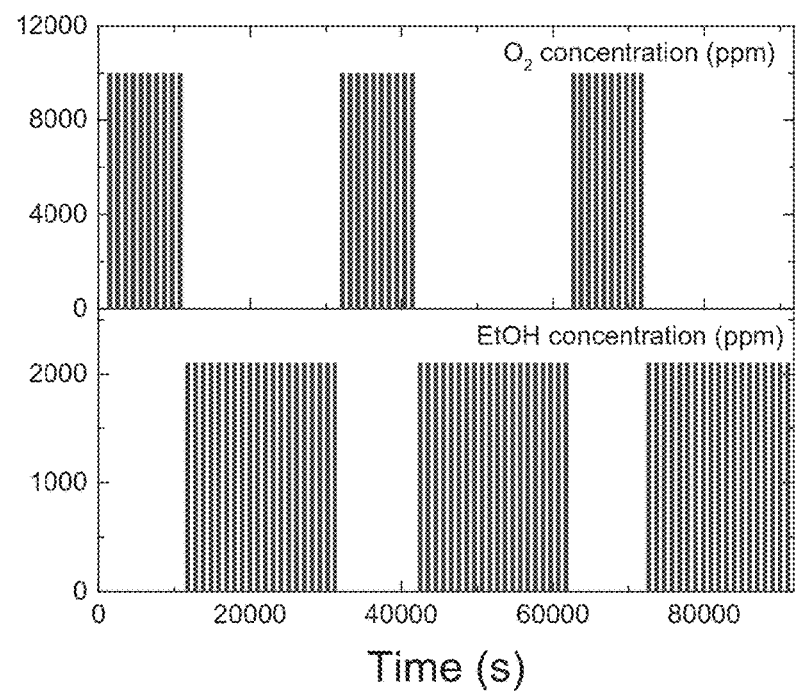
FIG. 23 is a plot of gas concentration over time as applied to a graphene varactor in accordance with various embodiments herein.
Figure 24:
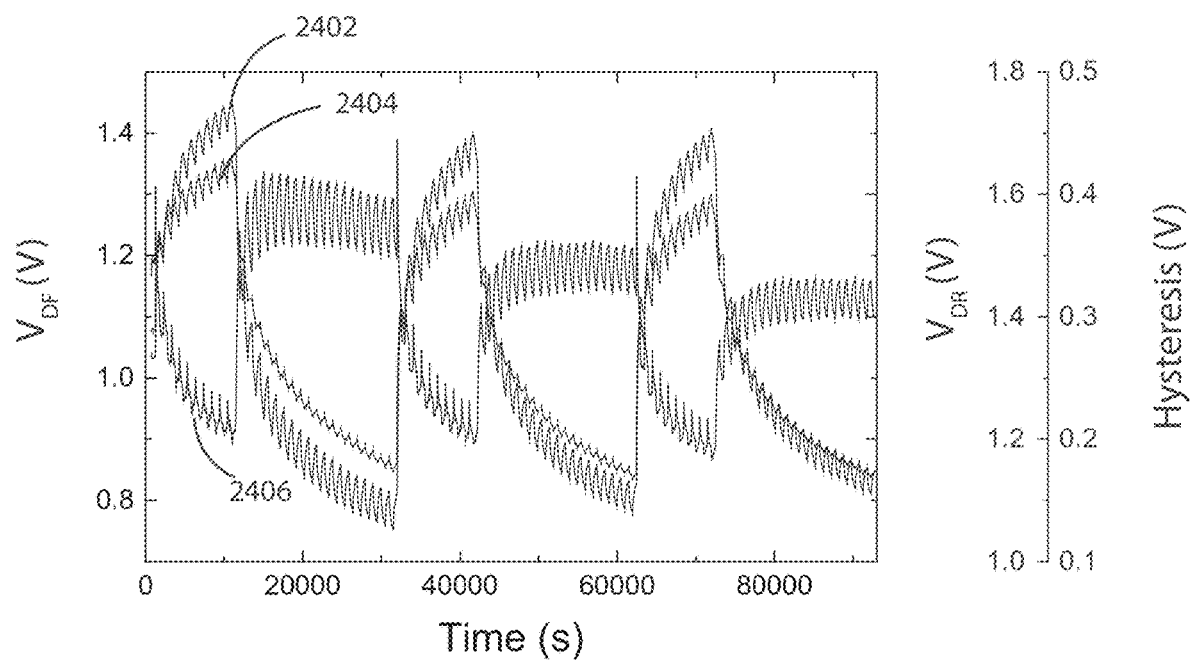
FIG. 24 is a graph showing forward Dirac voltage, reverse Dirac voltage, and hysteresis versus time for a graphene varactor in accordance with various embodiments herein.

Referring now to FIG. 23, a plot of analyte concentration of the oxygen top panel, ethanol bottom panel, delivered to the flow chamber as a function of time is shown. The Mn(III)TPPCl-functionalized graphene varactors were repeatedly exposed to $O_2$ (10,000 ppm) and ethanol (2105 ppm, 4% saturation diluted in $N_2$), and cycled as in Example 2. Plots presented in FIG. 24 show the resulting extrapolated $V_{DF}$ 2402, $V_{DR}$ 2404, and hysteresis 2406 responses of a Mn(III)TPPCl-functionalized varactor exposed to the oxygen and methanol.

The MnTPPCl-functionalized graphene shares the same overall trends with respect to ethanol binding as bare graphene, with one difference. In particular, the magnitude of the drift signal on the functionalized sample is generally the same as bare graphene, but the reversible signal from ethanol shows an evident improvement compared to the bare graphene.

Example 5: Temperature-Dependent Response of Graphene Varactors

Temperature-dependent response of various graphene varactors was measured to determine the effects of temperature on $V_{DF}$, $V_{DR}$, and hysteresis. Bare graphene varactors were baked-out in a high vacuum ($10^{-6}$ Torr) at 120° C. for 12-18 hours to remove any possible adsorbates from the graphene surface. A baked-out graphene varactor was consecutively exposed to 10,000 ppm oxygen for two cycles and then to 1251 ppm $H_2O$ (4% relative humidity) for three cycles. Each sensing cycle was followed by a $N_2$ return cycle to observe the reversible signal. The exposure sequence was repeated at several temperature set points within a range including 20° C. to 80° C.

Figure 25:
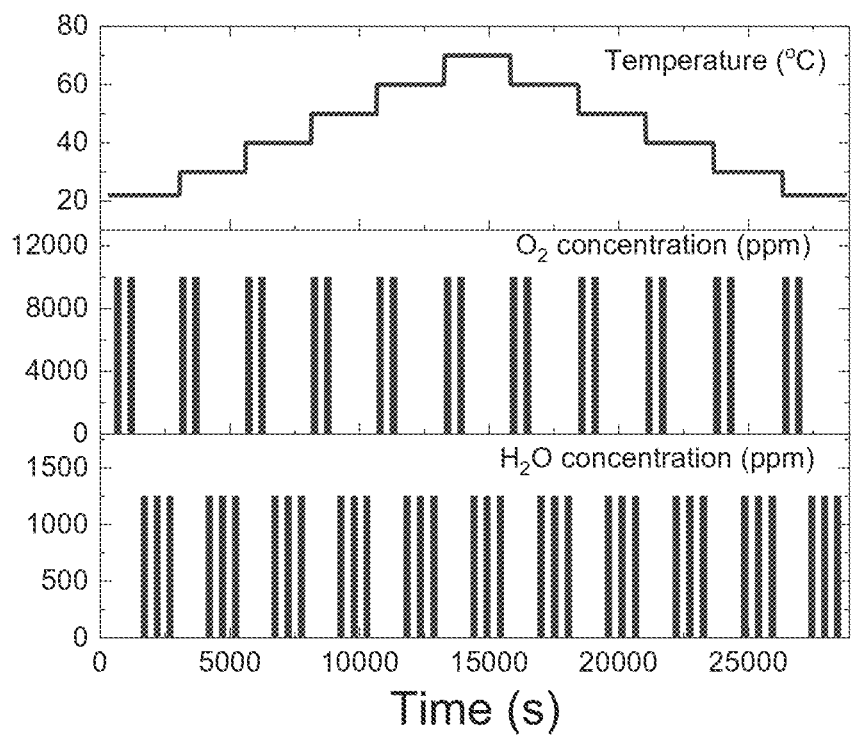
FIG. 25 is a plot of temperature and gas concentration versus time as applied to a graphene varactor in accordance with various embodiments herein.

Referring now to FIG. 25 the changes in analyte gas concentration and temperature over time are shown. The top, middle, and lower panels show the temperature set point, $O_2$ concentration, and $H_2O$ concentration vs. time, respectively. An increasing temperature ramp sequence was followed by a decreasing temperature ramp sequence to help distinguish temperature-dependent trends from long-term changes in the chemical sensor element. All C-Vg curves were measured between −2V and 2V, and the total flow rate was kept at 1000 sccm.

Figure 26:
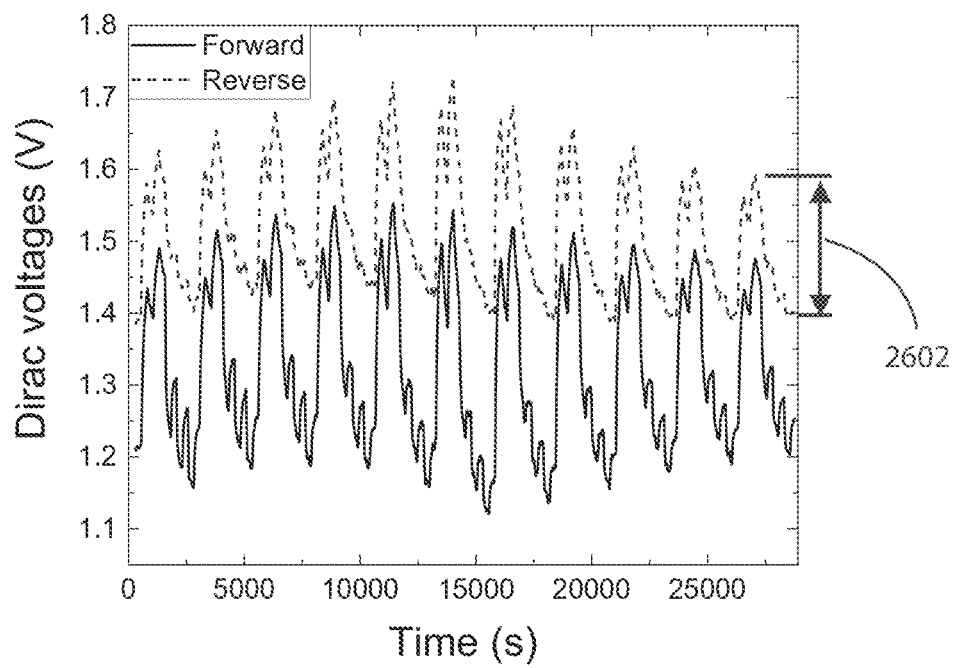
FIG. 26 is a graph showing forward and reverse Dirac voltages versus time for a graphene varactor in accordance with various embodiments herein.
Figure 28:
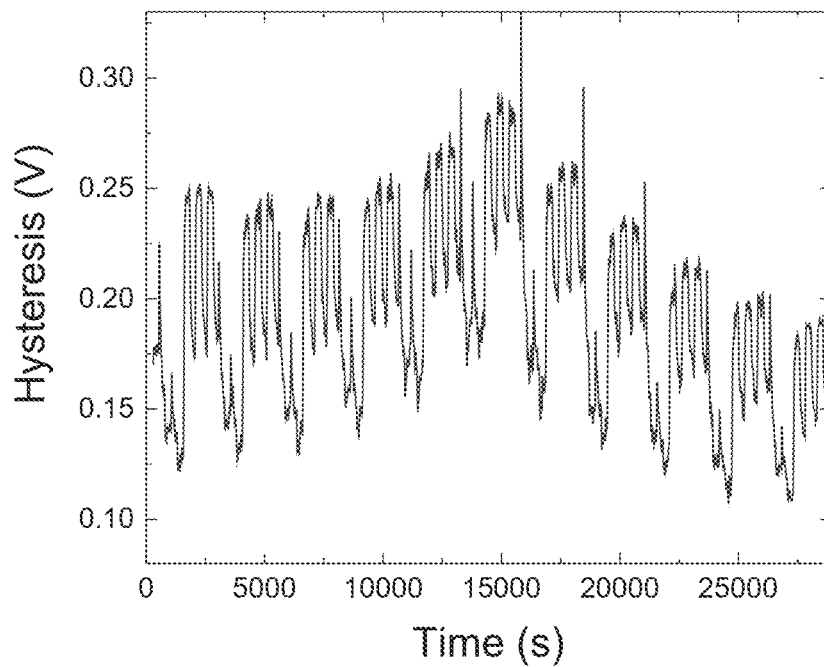
FIG. 28 is a graph showing hysteresis versus time for a graphene varactor in accordance with various embodiments herein.

FIG. 26 shows the extracted $V_{DF}$ (solid line) and $V_{DR}$ (dotted line) values from the measurement. Sequential exposure of the graphene varactor to $O_2$ and $H_2O$ caused both $V_{DF}$ and $V_{DR}$ to drift as indicated at arrow 2602. FIG. 28 illustrates the change in the extent of hysteresis with time, where an increasing trend was observed with an increase in temperature. Without being bound by any particular theory, it is believed that as the temperature gets higher, conditions favor the charging or discharging of oxide traps within the metal-oxide dielectric layer to contribute to hysteresis. This trend provides evidence that the device temperature reaches a setpoint upon the first $O_2$ exposure cycle and remains stable afterwards.

Figure 27:
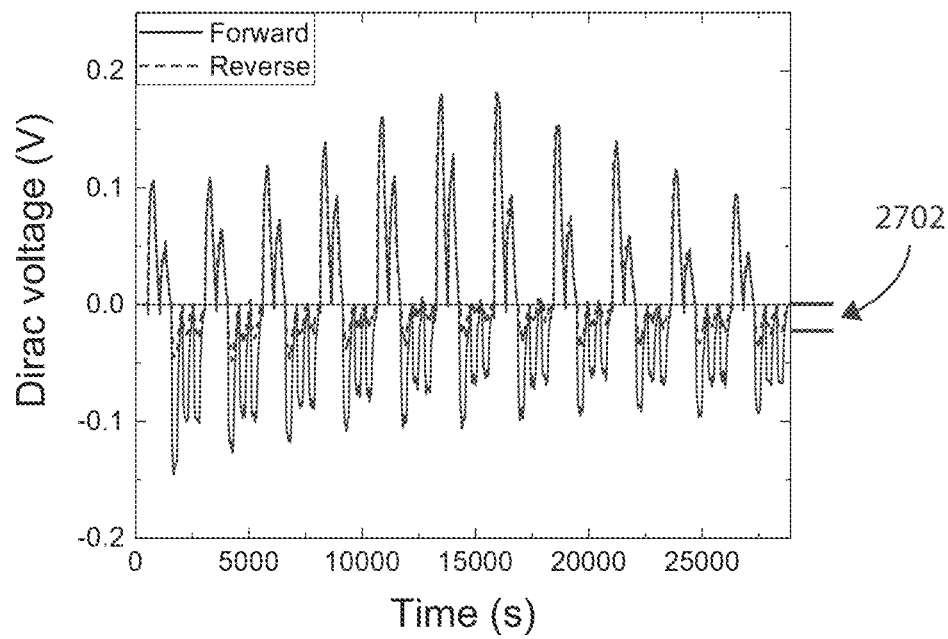
FIG. 27 is a graph showing background subtracted forward and reverse Dirac voltages versus time for a graphene varactor in accordance with various embodiments herein.

FIG. 27 shows plots of the $V_{DF}$ and $V_{DR}$ after background subtraction, in which any deviation of the two curves from zero is represents the reversible signal as shown at 2702 The plot of the $V_{DR}$ after background subtraction indicate that with a rising temperature, the $O_2$ reversible response increases. The $H_2O$ reversible signal measured by $V_{DF}$ after background subtraction, however, decreases dramatically, accompanied by a continuous lowering in hysteresis. In each temperature stage, the first $O_2$ or $H_2O$ exposure cycle produced an unusually large signal, which is attributed to being an artifact that is due to the imperfect background fitting. The dependence of methanol, ethanol, and methyl ethyl ketone (MEK) signals on temperature were also analyzed using the same experiment setup (data not shown), and which showed similar trends in $V_{DF}$ and $V_{DR}$ values as $H_2O$ in that they showed a decrease in $V_{DR}$ and hysteresis.

From the data in FIG. 27, the energy terms of the various gas interactions were extracted according to the following equations:

$$S_{phys} \propto \exp\left(\frac{E_d}{k_B T}\right) \text{ and } S_{chem} \propto \exp\left(\frac{-E_a}{k_B T}\right) \qquad \text{eq. [1]}$$

where $S_{phys}$, and $S_{chem}$ are the magnitude of physisorption and chemisorption induced signals, respectively. $E_d$ and $E_a$ are the desorption energy for physisorption and activation energy for chemisorption, respectively, and $k_B$ is the Boltzmann constant.

Figure 29:
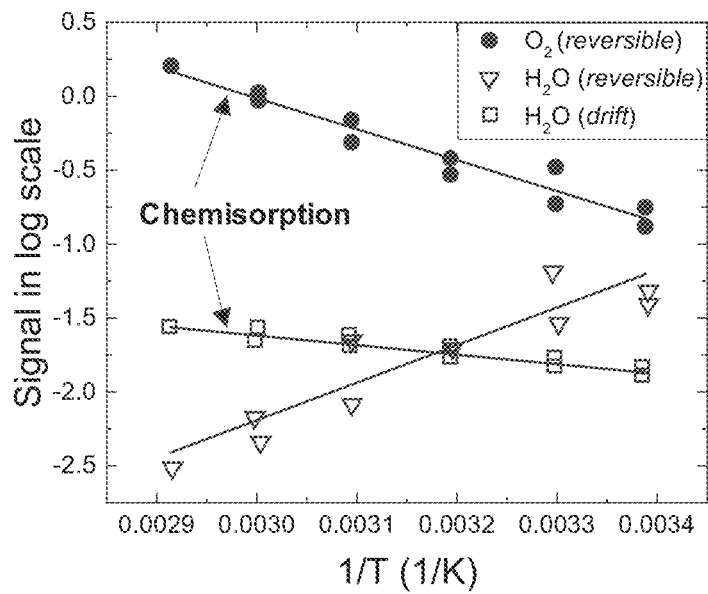
FIG. 29 is a graph of Dirac voltage signal magnitude versus temperature as applied to a graphene varactor in accordance with various embodiments herein.
Figure 30:
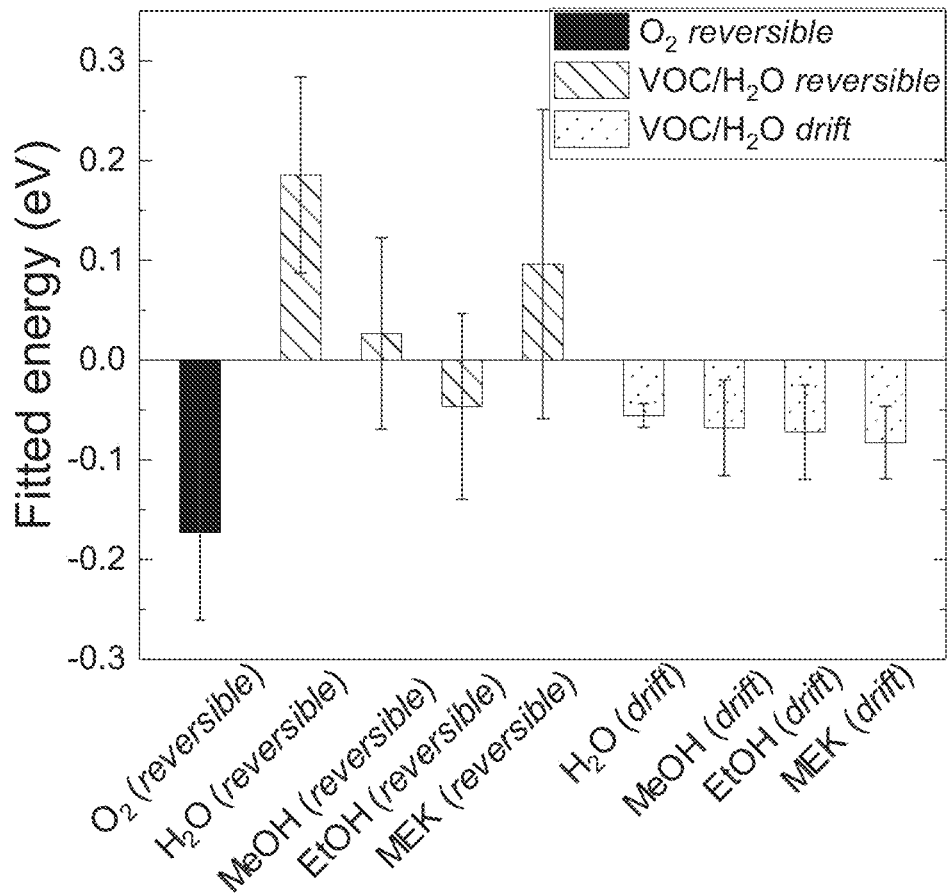
FIG. 30 is a graph of extrapolated activation energy as a function of temperature dependence measurements in accordance with various embodiments herein.

For the reversible $O_2$ and $H_2O$ signals, all the $V_{DR}$ data points of the last sensing cycle were summed at each temperature. The drift signal from $H_2O$ was calculated by comparing $V_{DR}$ values at the beginning and ending of the three consecutive exposures, the magnitude of which is represented in FIG. 26 by arrow 2602. All signal magnitudes were plotted on a log scale vs. 1/T (where T is temperature) as shown in FIG. 29. The reversible signal was calculated by averaging the last three data points of the last exposure in FIG. 27 as indicated by arrow 2702. Solid lines show the fitting results, and the slope from linear fitting can be translated to an energy term, as shown by equation 1 (eq. [1]). A negative sign of the fitted energy term suggests the signal arises from chemisorption-like interaction. A positive sign of the fitted energy term suggests the signal arises from physisorption-like interaction. As summarized in FIG. 30, the extrapolated activation energies from VOC and $H_2O$ drift signals are all negative. For reversible signals, $H_2O$ interaction has positive energy terms (desorption energies), while the results for ethanol, methanol, and MEK are close to zero with large error bars due to a long-term decrease in hysteresis.

Comparing $H_2O$, methanol and ethanol, which all have hydroxyl groups, the resulting desorption energy declined with increasing molecule size. The only exception was the $O_2$ reversible signal which has negative energy term. The difference in the sign of the activation energies associated to reversible signals suggest that $O_2$ interaction is chemisorption-like while interactions of VOCs and $H_2O$ with graphene are physisorption-like.

Example 6: Voltage-Dependent Response of Graphene Varactors

Figure 31:
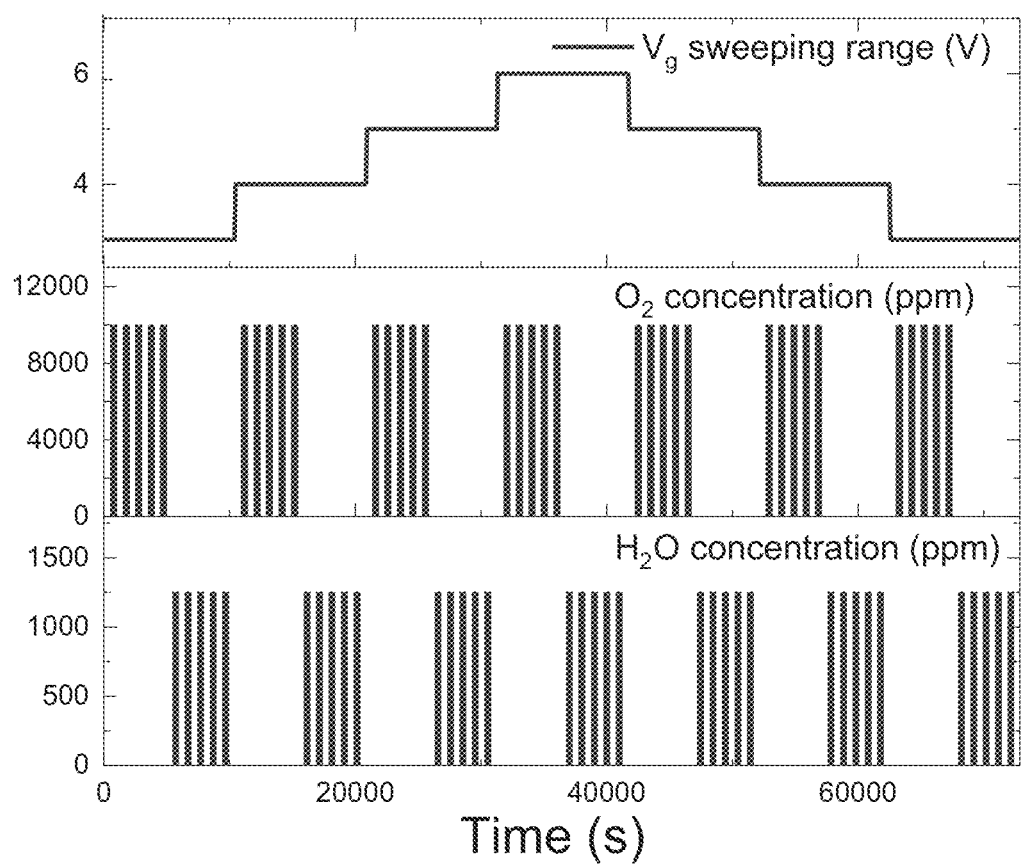
FIG. 31 is a plot of gate voltage sweeping range and gas concentration versus time as applied to a graphene varactor in accordance with various embodiments herein.

The effect of both the drift and reversible signal in the system as a function of $V_g$ sweeping range was investigated in the presence of oxygen and water. As illustrated in FIG. 31 (middle and bottom panels), the device was sequentially exposed to $O_2$ and $H_2O$ with a nitrogen return purge to separate the two sets of signals. This flow sequence was repeated at different $V_g$ sweeping ranges (top panel in FIG. 31). The $V_g$ sweeping window was always centered at 0V, and the step size was adjusted to maintain constant exposure time per cycle in order to minimize measurement-induced drift. The total flow rate was kept at constant value of 1000 sccm.

Figure 32:
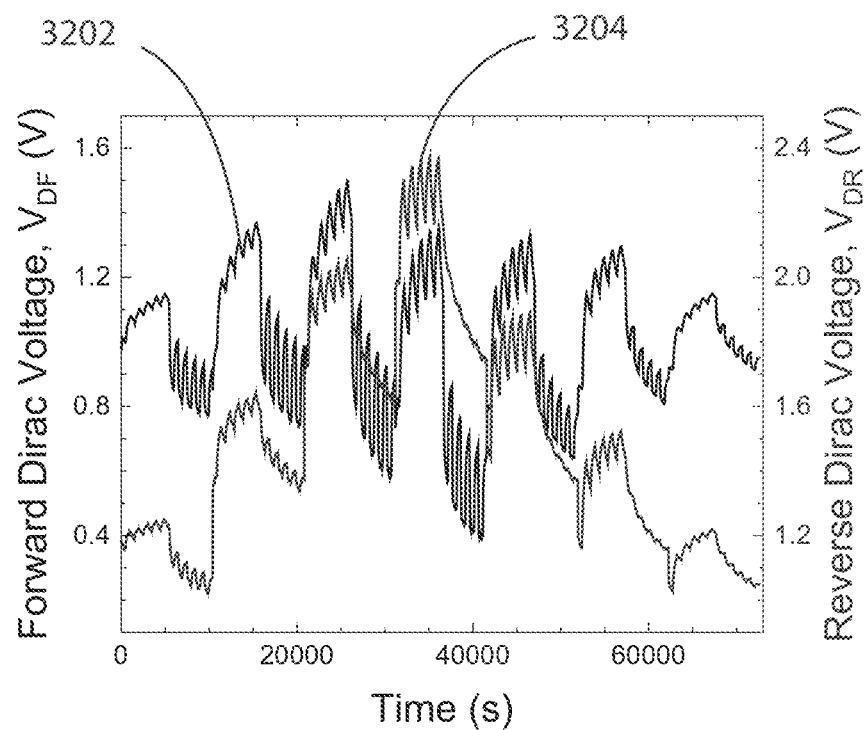
FIG. 32 is a graph showing forward and reverse Dirac voltages versus time for a graphene varactor in accordance with various embodiments herein.
Figure 33:
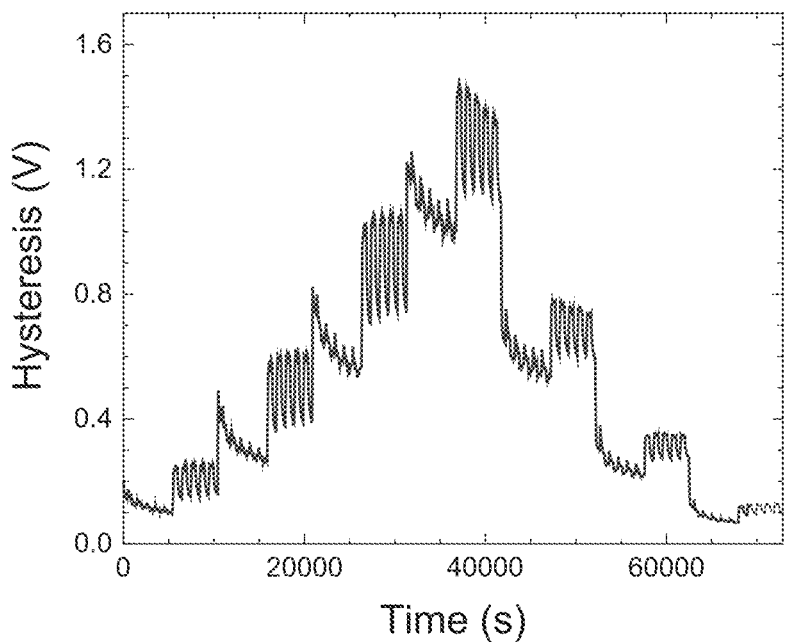
FIG. 33 is a graph showing hysteresis versus time for a graphene varactor in accordance with various embodiments herein.

The resulting $V_{DF}$ and $V_{DR}$ data is shown in FIG. 32. Notably, the drift signal and the $O_2$ reversible signal measured by $V_{DF}$ 3202 and $V_{DR}$ 3204 were both increased with the larger sweeping range. However, for the $H_2O$ reversible response, expanding the $V_g$ sweeping range caused the $V_{DF}$ signal to increase, but $V_{DR}$ signal to fall. The change of hysteresis is tracked in FIG. 33. The increase in hysteresis with $V_g$ sweeping range can be attributed to the charging and discharging of oxide traps in the dielectric layer leading to an increase in hysteresis.

Figure 34:
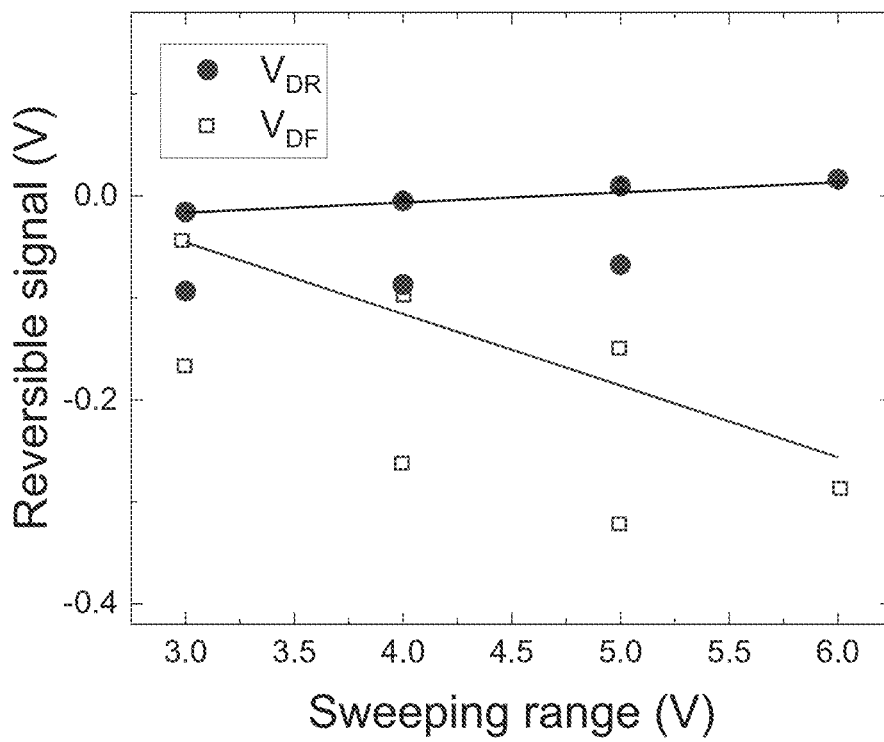
FIG. 34 is a plot of a change in forward and reverse Dirac voltages versus sweeping range in accordance with various embodiments herein.
Figure 35:
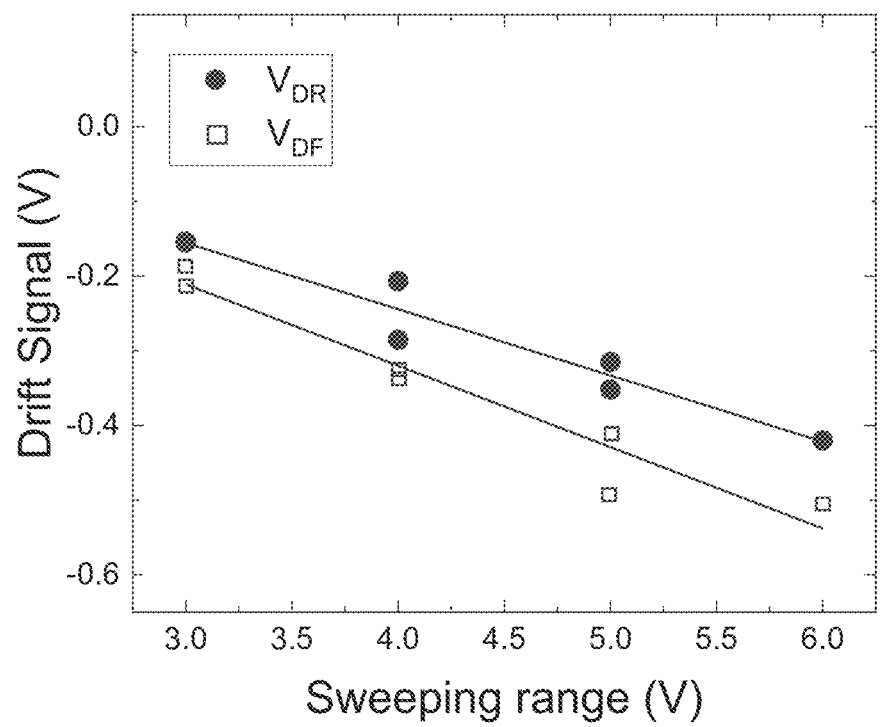
FIG. 35 is a plot of a change in forward and reverse Dirac voltages versus sweeping range in accordance with various embodiments herein.

FIGS. 34 and 35 show the calculated reversible and drift signal strengths obtained from the H2O exposure data in FIG. 32, respectively, which shows that for the reversible response, the $V_{DF}$ and $V_{DR}$ signals have the opposite dependence on $V_g$ sweeping range, while for drift response, both $V_{DF}$ and $V_{DR}$ signals are enhanced. These results show that reversible and drift signals from VOCs and $H_2O$ have different dependence on the $V_g$ sweeping range. In some cases, the $V_{DR}$ signal of the reversible response changes its sign when the $V_g$ sweeping amplitude is sufficiently large.

For the $O_2$ reversible signal (FIG. 32), an increase in magnitude was observed in both $V_{DF}$ and $V_{DR}$, which is indicative of a chemisorption mechanism. Thus, the $O_2$ drift is associated with an accumulated response from multiple exposures but can be interrupted by a nitrogen purge. The analysis was repeated using ethanol, methanol, and MEK (data not shown), where similar trends were observed. Similar trends were also observed on sensors with pyr-$CH_2OH$ functionalized graphene, and on samples after a vacuum bake-out (data not shown). The results show that reversible and drift signals from VOCs and $H_2O$ have a different dependence on $V_g$ sweeping range.

The analysis shows that for a small $V_g$ sweep range, the charge modulation in graphene is small, and so the centroid movement of the molecular charge is also small. For a large $V_g$ sweep range, the charge modulation in graphene is large, causing a larger redistribution of the molecular charge.

Example 7: Concentration-Dependent Response of Graphene Varactors

Figure 36:
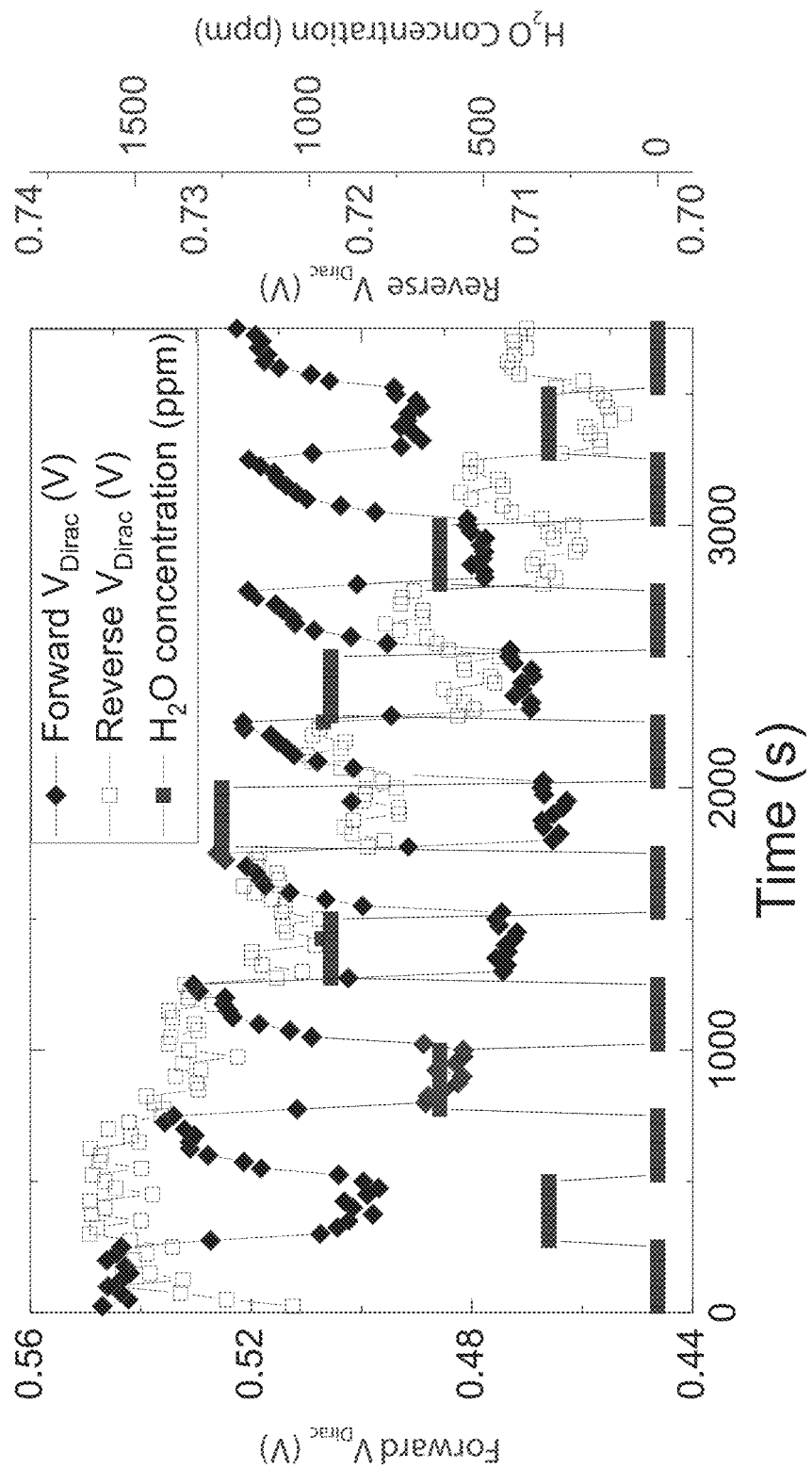
FIG. 36 is a plot of gas concentration, forward Dirac voltages, and reverse Dirac voltages versus time as applied to a graphene varactor in accordance with various embodiments herein.
Figure 37:
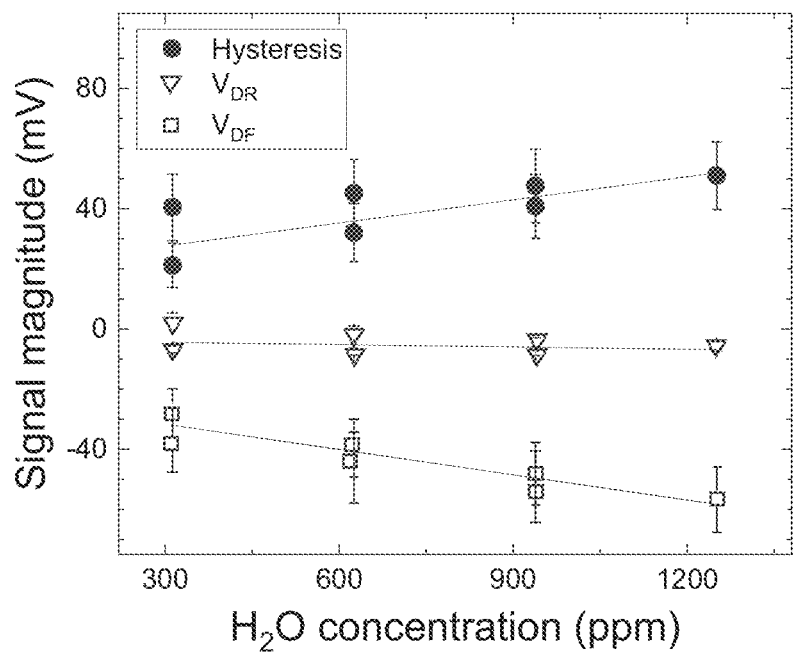
FIG. 37 is a graph of a change in forward Dirac voltages, reverse Dirac voltages, and hysteresis versus gas concentration in accordance with various embodiments herein.
Figure 38:
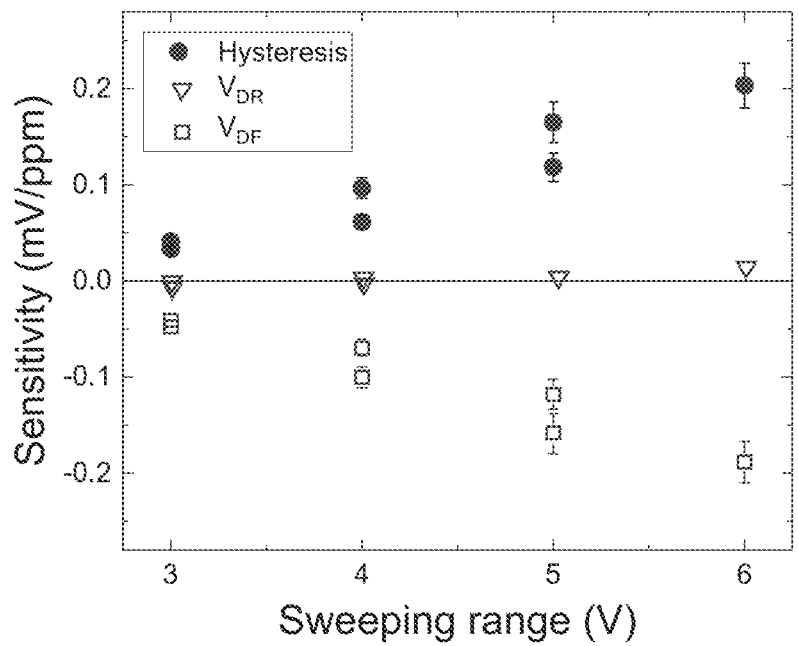
FIG. 38 is a graph showing forward Dirac voltages, reverse Dirac voltages, and hysteresis versus gate sweeping range in accordance with various embodiments herein.

The effects of $H_2O$ concentration were investigated. A bare graphene varactor was exposed to an $H_2O/N_2$ mixture with varying concentration of $H_2O$. A $V_g$ sweep range from −2V to 2V was applied to a bare graphene varactor. FIG. 36 shows that the $H_2O$ changes as a function of time in the chamber, while the total flow rate remained constant at 1000 sccm. The data shows that the device produces larger $V_{DF}$ and $V_{DR}$ signals when exposed to higher concentrations of analyte. The signal magnitudes measured from $V_{DF}$, $V_{DR}$, and hysteresis from each exposure are calculated by averaging the last three data points after background subtraction (FIG. 37). Then the sensitivity in mV/ppm was extrapolated by linear fitting as indicated by the solid lines. This measurement was repeated with different $V_g$ sweep ranges including 3 V, 4 V, 5 V, 6 V, 5 V, 4 V, and 3 V. The resultant sensitivities as functions of $V_g$ sweep range are presented in FIG. 38. The results show that the absolute magnitude of the $V_{DF}$ and hysteresis sensitivities increase with increasing sweeping range, while the $V_{DR}$ sensitivity changes sign over this range.

Example 8: Gas Characterization Using Hysteresis and Forward Dirac Point

The utility of hysteresis effects in characterizing fluid samples was also investigated. Four arrays of 120 discrete graphene varactors, comprised of 37 different surface chemistries, were first baked-out in a high vacuum ($10^{-6}$ Torr) at 100° C. for 12-18 hours to remove any possible adsorbates from the graphene surface. To eliminate the effect of residual air in the system, the gas flow channels and flow chamber of the gas measurement system were pre-purged with 400 standard cubic centimeters per minute (sccm) $N_2$ flow for 3 min.

The arrays were first exposed to 1000 sccm $N_2$ flow for 30 seconds while several forward and reverse C-$V_g$ curves were measured. A sweep range of −1.5 V to 1.5 V with a step of 50 mV was used. The arrays were then exposed to a gas sample for 40 seconds while several more forward and reverse C-$V_g$ curves were measured. The gas samples tested were 2-butanone (1026, 10,263, 51,316, and 102,631 ppm in $N_2$ background), hexanal (148, 1482, 7408, and 14,815 ppm in $N_2$ background), ethanol (587, 5872, 29,361, and 58,722 ppm in $N_2$ background), and $N_2$. Changes in the C-$V_g$ curves were observed in response to the different gases, and $V_{DF}$ and hysteresis signals were extracted for analysis.

Figure 39:
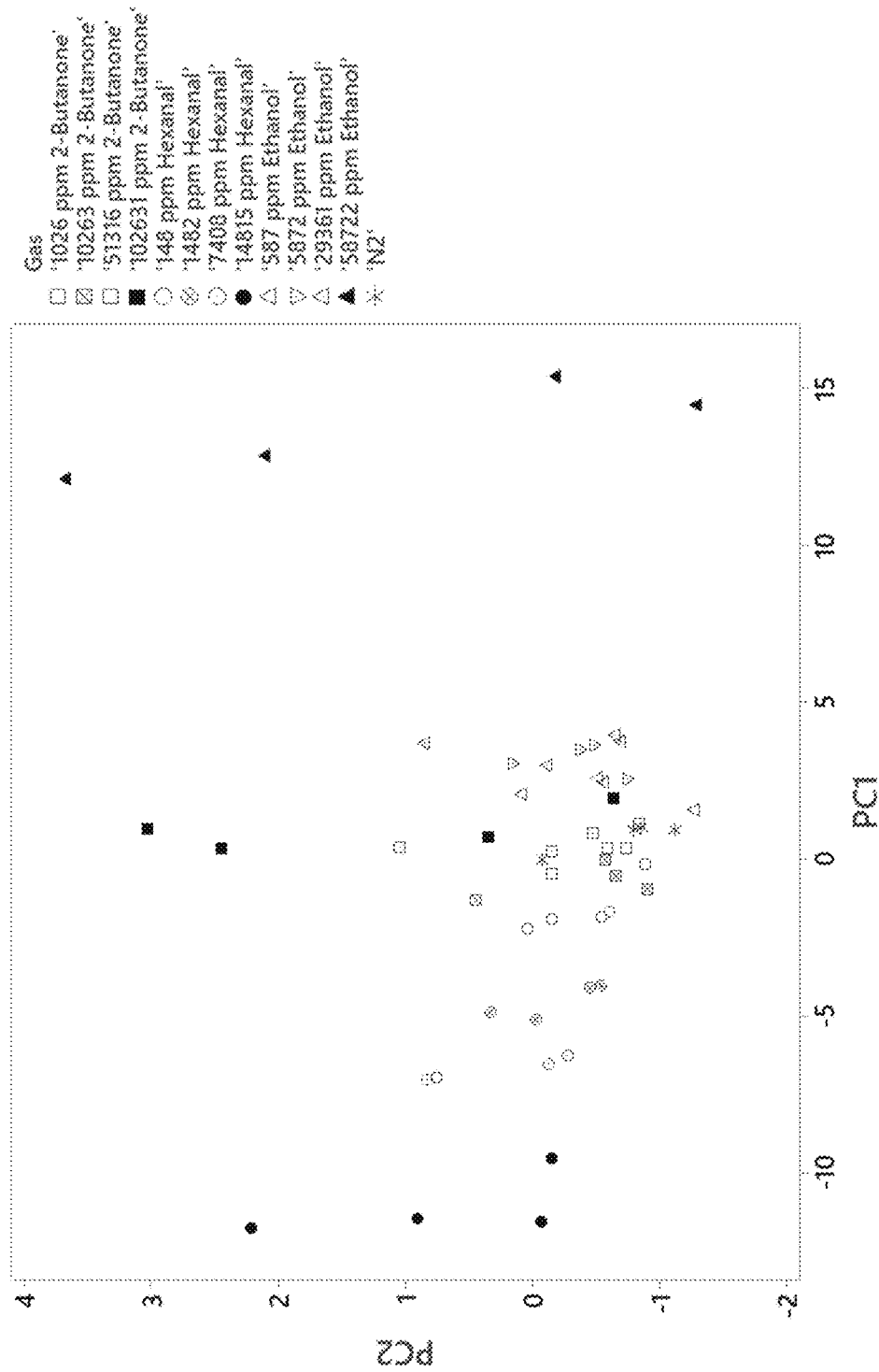
FIG. 39 is a graph from principal component analysis of forward Dirac voltage responses in accordance with various embodiments herein.

Principal component analysis (PCA) was used for dimensionality reduction to determine if signals from the different gas samples were unique. Signals from $V_{DF}$ and hysteresis were analyzed separately and in combination. FIG. 39 is a plot of principal component 1 (PC1) versus PC2 when only $V_{DF}$ signals are included in the feature set. Each point represents $V_{DF}$ signals from all 120 discrete varactors in a sensor array. Four arrays were tested against each gas concentration. Some hexanal and ethanol concentrations are clearly distinguishable but most gas samples overlap significantly, reducing the accuracy of gas classification.

Figure 40:
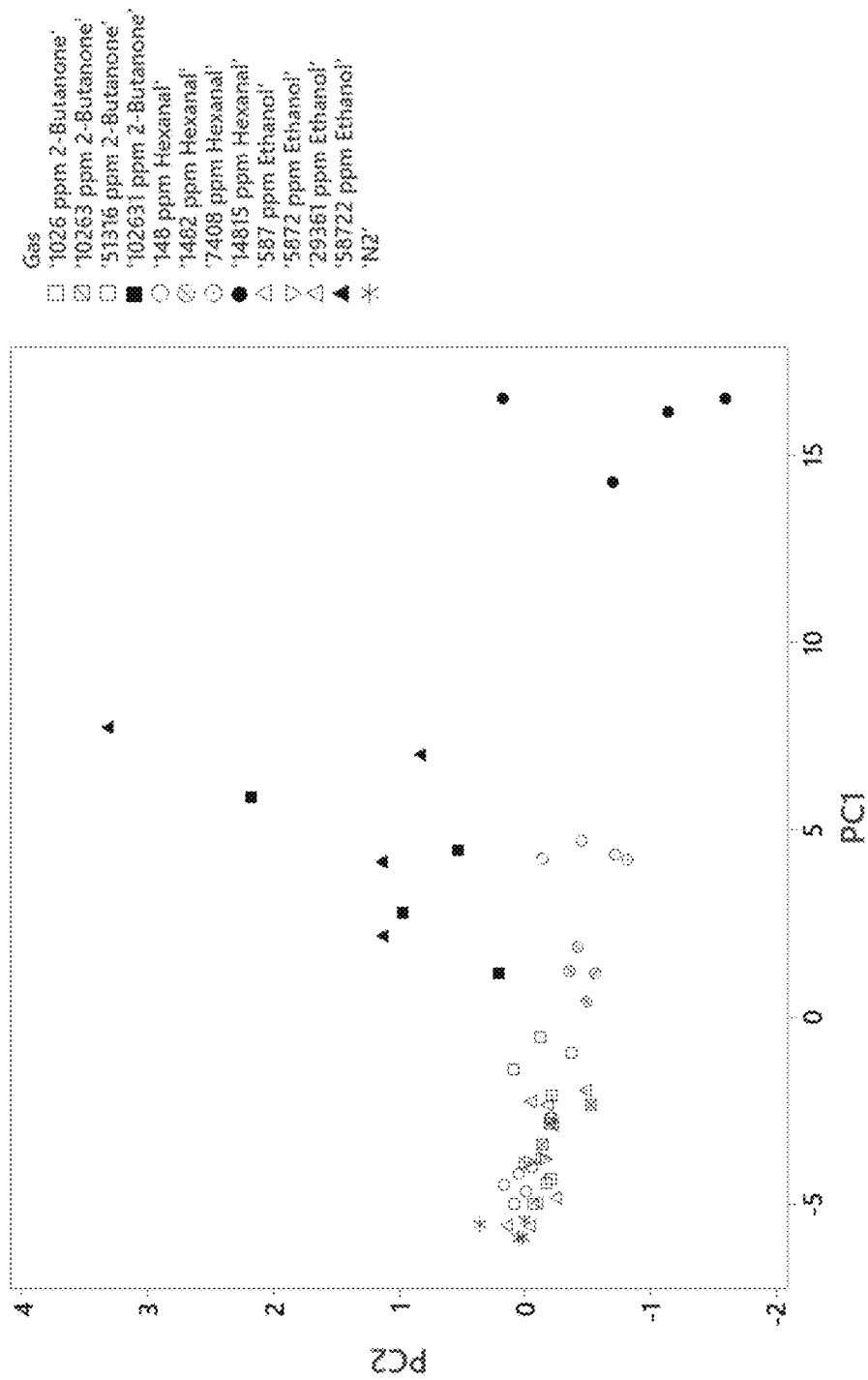
FIG. 40 is a graph from principal component analysis of hysteresis responses in accordance with various embodiments herein.

FIG. 40 is a plot of PC1 versus PC2 when only hysteresis signals are included in the feature set. Each point represents hysteresis signals from all 120 discrete varactors in a sensor array. Four arrays were tested against each gas concentration. Some hexanal concentrations are clearly distinguishable but most gas samples overlap significantly, reducing the accuracy of gas classification.

Figure 41:
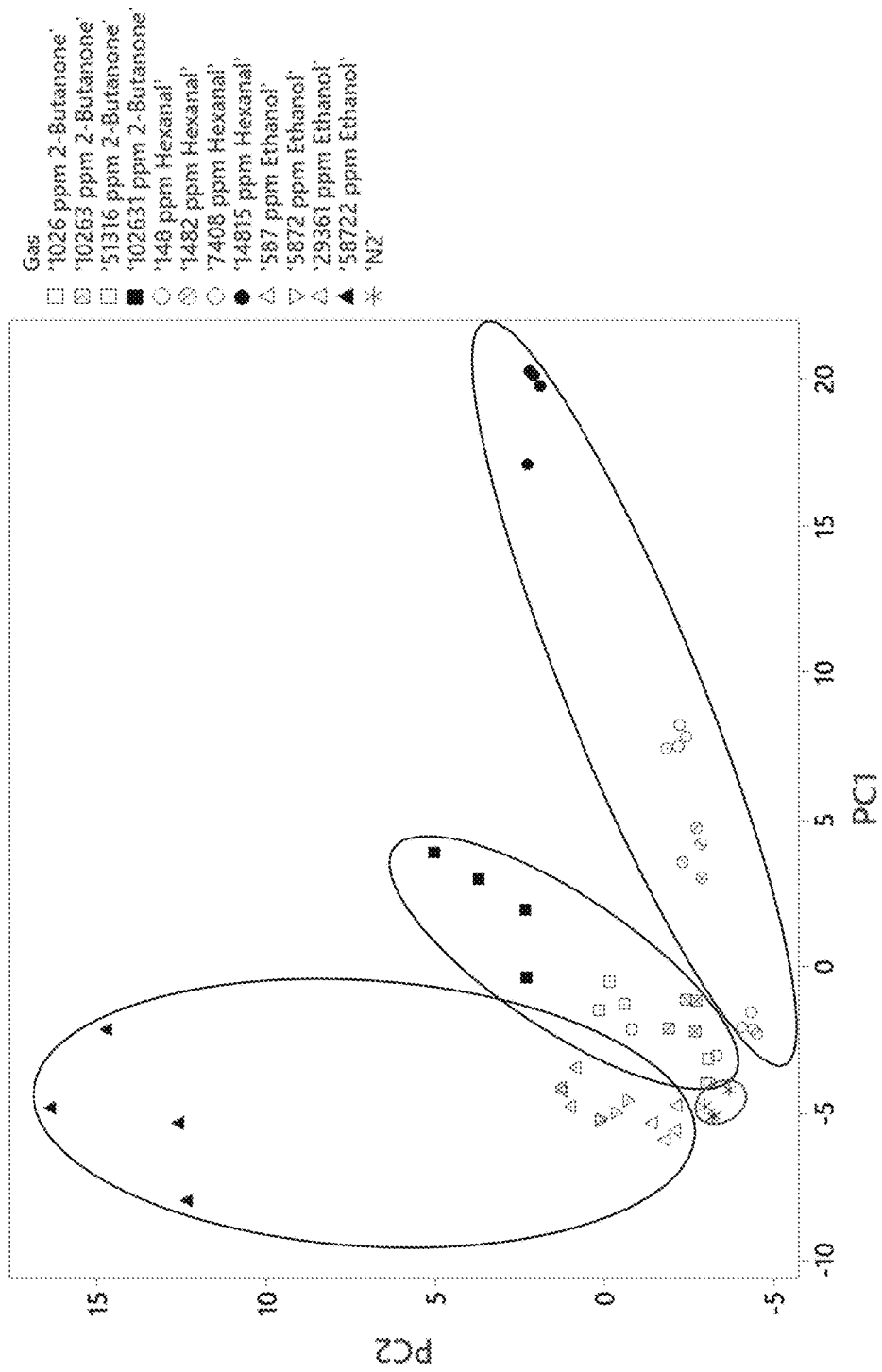
FIG. 41 is a graph from principal component analysis of combined forward Dirac voltage and hysteresis responses in accordance with various embodiments herein.

FIG. 41 is a plot of PC1 versus PC2 when both $V_{DF}$ and hysteresis signals are included in the feature set. Each point represents $V_{DF}$ and hysteresis signals from all 120 discrete varactors in a sensor array. Four arrays were tested against each gas concentration. Gas classification is significantly improved as no overlap is observed between any of the gas samples. The data provide evidence that using hysteresis effects in combination with $V_{DF}$ improves gas classification.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

As used herein, the recitation of numerical ranges by endpoints shall include all numbers subsumed within that range (e.g., 2 to 8 includes 2.1, 2.8, 5.3, 7, etc.).

The headings used herein are provided for consistency with suggestions under 37 CFR 1.77 or otherwise to provide organizational cues. These headings shall not be viewed to limit or characterize the invention(s) set out in any claims that may issue from this disclosure. As an example, although the headings refer to a "Field," such claims should not be limited by the language chosen under this heading to describe the so-called technical field. Further, a description of a technology in the "Background" is not an admission that technology is prior art to any invention(s) in this disclosure. Neither is the "Summary" to be considered as a characterization of the invention(s) set forth in issued claims.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A system for analyzing a fluid sample comprising:
 a controller circuit; and
 a chemical sensor element, the chemical sensor element comprising
  one or more discrete binding detectors, the one or more discrete binding detectors comprising one or more graphene varactors;
  measurement circuitry, the measurement circuitry comprising
   an electrical voltage generator, wherein the electrical voltage generator is configured to generate an applied voltage at a plurality of voltage values to be applied to the one or more graphene varactors, the voltage values falling within a range from a lower bound to an upper bound; and
   a measurement circuit comprising a capacitance sensor, wherein the capacitance sensor is configured to measure capacitance of the discrete binding detectors resulting from the applied voltage;
 wherein the system for analyzing the fluid sample is configured to measure hysteresis effects related to capacitance versus voltage values obtained from the one or more graphene varactors; and
 wherein the system is configured to measure analyte presence in the fluid sample by evaluating hysteresis change in one or more parameters of capacitance-voltage data.

2. The system of claim 1, wherein the applied voltage comprises voltage values starting at one of the lower or upper bounds and moving to the other bound as part of a sweep across different voltage values falling within the range from the lower bound to the upper bound; and
 wherein the hysteresis effects reflect differences in measurable values relating to capacitance of the graphene varactors resulting from a sweep in a first direction between the lower bound and upper bound versus a sweep in a second direction between the lower bound and the upper bound, wherein the second direction is opposite the first direction.

3. The system of claim 2, wherein a sweep in the first direction is followed by a pause and then sweep in the second direction.

4. The system of claim 1, wherein the applied voltage is represented as a sum of an AC voltage component superimposed on a DC bias voltage component.

5. The system of claim 2, wherein a sweep in the first direction followed by a sweep in the second direction constitutes a hysteresis measurement cycle, wherein the upper voltage bound and the lower voltage bound remain static between successive cycles.

6. The system of claim 2, wherein a sweep in the first direction followed by a sweep in the second direction constitutes a hysteresis measurement cycle, wherein the upper voltage bound and the lower voltage bound change between successive cycles.

7. The system of claim 2, wherein the system is configured to utilize determined hysteresis effects as a data input in a pattern matching operation, wherein results of the pattern matching operation characterizes the fluid test sample and/or a patient providing the fluid test sample.

8. The system of claim 2, wherein the system is configured to calculate a first Dirac point voltage for a sweep of the discrete binding detectors in the first direction and a second Dirac point voltage for a successive sweep of the discrete binding detectors in the second direction.

9. The system of claim 1, wherein the controller circuit is configured to calculate an average hysteresis change value of a measured property over a plurality of hysteresis measurement cycles.

10. The system of claim 1, wherein the system is configured to determine an identity of one or more analytes present in a fluid sample by evaluating hysteresis effects on one or more properties of the one or more discrete binding detectors.

11. The system of claim 1, further comprising a temperature controller configured to control a temperature of the one or more graphene varactors.

12. A method for evaluating a fluid sample comprising:
contacting a chemical sensor element comprising one or more discrete binding detectors with the fluid sample, each discrete binding detector comprising a graphene varactor;
applying a voltage to the graphene varactors as part of a series of hysteresis measurement cycles over a time period, wherein each hysteresis measurement cycle includes applying the voltage to the graphene varactors as part of a sweep across a range of voltages in a first direction and then in a second direction that is opposite the first direction;
measuring capacitance of each of the discrete binding detectors resulting from the applied voltage;
determining hysteresis effects on measured capacitance values over the time period; and
determining an identity of one or more analytes present in the fluid sample by evaluating hysteresis effects on one or more properties of the one or more discrete binding detectors.

13. The method of claim 12, further comprising distinguishing a first unique fluid mixture from a second unique fluid mixture based on the measured hysteresis effects exhibited by each of the first and second unique fluid mixtures.

14. The method of claim 12, wherein applying a voltage comprises applying a voltage to the graphene varactors at multiple discrete voltages across a range of voltages by stepping through the range of voltages in increments from 5 mV to 100 mV.

15. The method of claim 12, further comprising characterizing the fluid sample at least in part based on determined hysteresis effects on one or more parameters.

16. The method of claim 12, further comprising identifying a disease state of an individual providing the fluid sample based at least in part on determined hysteresis effects.

17. The method of claim 12, further comprising identifying a disease state of an individual by matching data gathered from analyzing the fluid sample, including data regarding hysteresis effects, against predetermined data patterns corresponding to disease states.

18. The method of claim 12, further comprising
determining one or more parameters of capacitance-voltage data of each of the discrete binding detectors resulting from the applied voltage and;
classifying discrete analytes within the fluid sample based on the determined hysteresis effects and the one or more parameters of capacitance-voltage data in combination.

19. The method of claim 18, wherein determining the one or more parameters of capacitance-voltage data comprises determining a forward Dirac point voltage for each of the discrete binding detectors resulting from the applied voltage.

* * * * *